(12) United States Patent
Zhang et al.

(10) Patent No.: US 9,918,041 B1
(45) Date of Patent: Mar. 13, 2018

(54) MOTION ADAPTIVE DE-INTERLACING AND ADVANCED FILM MODE DETECTION

(71) Applicant: Marvell International Ltd., Hamilton (BM)

(72) Inventors: Chang Q. Zhang, San Jose, CA (US); Dam Le Quang, Ho Chi Minh (VN)

(73) Assignees: SYNAPTICS INCORPORATED, San Jose, CA (US); SYNAPTICS LLC, Zug (CH)

(*) Notice: Subject to any disclaimer, the term of this patent is extended or adjusted under 35 U.S.C. 154(b) by 0 days.

(21) Appl. No.: 15/135,931

(22) Filed: Apr. 22, 2016

Related U.S. Application Data

(60) Provisional application No. 62/152,590, filed on Apr. 24, 2015, provisional application No. 62/152,600, filed on Apr. 24, 2015.

(51) Int. Cl.
   *H04N 7/01* (2006.01)

(52) U.S. Cl.
   CPC .......... *H04N 7/012* (2013.01); *H04N 7/0137* (2013.01); *H04N 7/0147* (2013.01)

(58) Field of Classification Search
   CPC ..... H04N 7/012; H04N 7/0147; H04N 7/0137
   USPC .......................... 348/452, 451, 448, 441, 911
   See application file for complete search history.

(56) References Cited

U.S. PATENT DOCUMENTS

| | | | | |
|---|---|---|---|---|
| 7,952,644 | B2 * | 5/2011 | Lu | ........................ H04N 7/012 348/451 |
| 8,305,490 | B2 * | 11/2012 | Peng | ..................... H04N 7/012 348/452 |
| 8,619,187 | B2 | 12/2013 | Garge et al. | |

* cited by examiner

*Primary Examiner* — Jefferey F Harold
*Assistant Examiner* — Jean W Desir
(74) *Attorney, Agent, or Firm* — Paradice and Li LLP

(57) ABSTRACT

A system including a motion adaptive de-interlacer, a film mode detector, and a combiner. The motion adaptive de-interlacer is configured to determine a first output by de-interlacing a plurality of interlaced frames based on at least a first motion indicator indicating motion between fields of the plurality of interlaced frames. The film mode detector is configured to determine a second output based on a film mode detected based on at least a second motion indicator indicating motion between fields of the plurality of interlaced frames. The film mode detector is further configured to output a control signal based on the second motion indicator and the film mode. The combiner is configured to combine the first output and the second output based on the control signal.

38 Claims, 52 Drawing Sheets

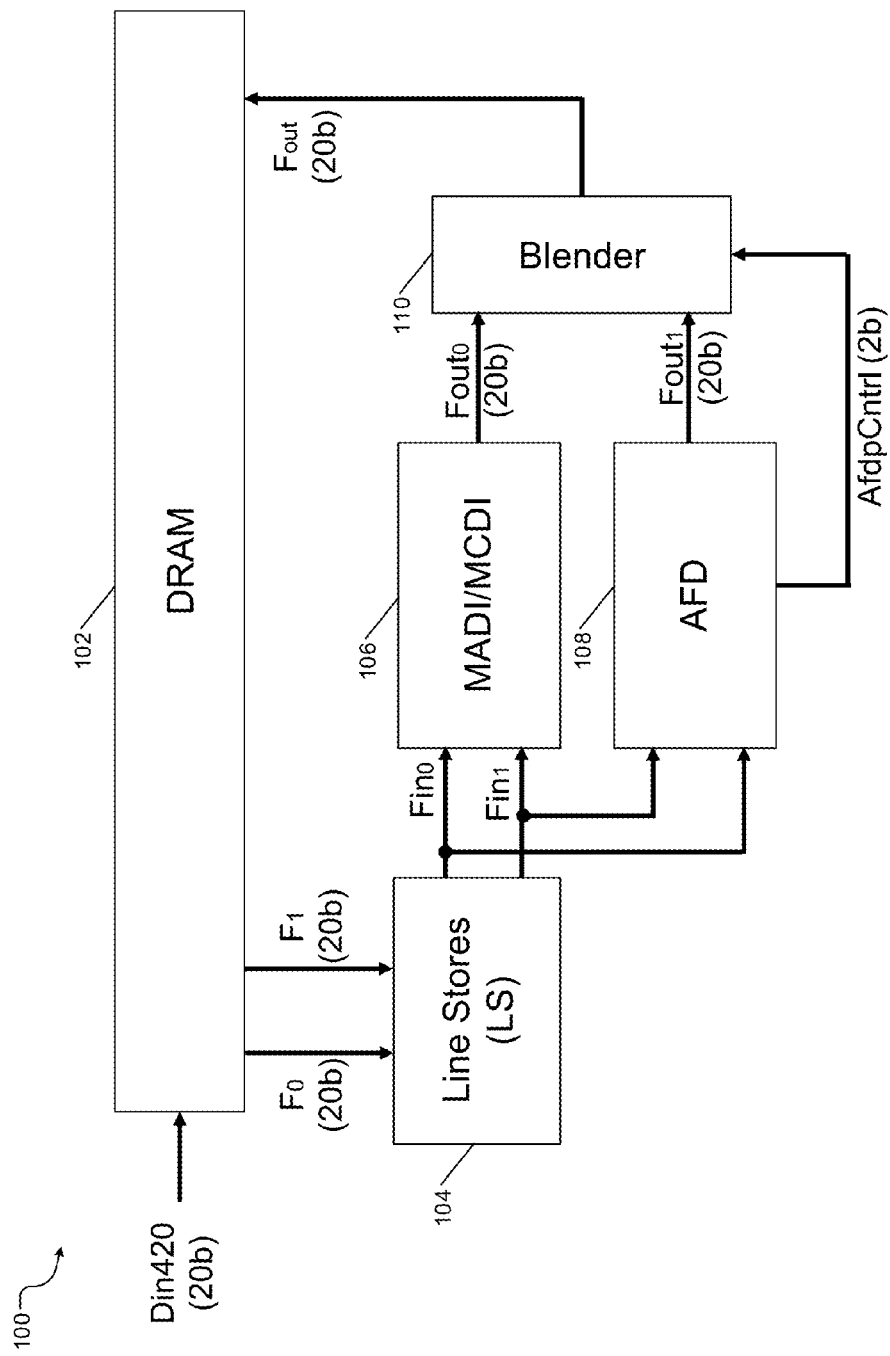

```
(HVMAX Selector)
d0 =din[1] – din[0];
d1 =din[1] – din[2];
If((abs(d1)>abs(d0))
{
    sgn  =sign (d1);
    dir  =1;
    abs  =abs(d1);
}
else
{
    sgn  =sign(d0);
    dir  =0;
    abs  =abs(d0);
}
```

```
(MAX Selector)
If(abs1>abs0)
{
    sgn  =sgn1;
    dir  =dir1;
    abs  =abs1;
}
else
{
    sgn  =sgn0;
    dir  =dir0;
    abs  =abs0;
}
```

```
(Static OSD Selector)
p-sgn  =(sgn0==sgn1);
p-dir  =(dir0==dir1);
p-osd  =(osd0==osd1);
if(p-static&&p-sgn&&p-dir&&p-osd)
{
    posd  =1;
}
else
{
    posd  =0;
}
```

FIG. 12B

Selection logic:
if(sosd)
　　Lasd_mdv    =NCF*gain1;
else if(lasd)
　　Lasd_mdv    =NCF*gain0;
else
　　Lasd_mdv    ="Don't Care"

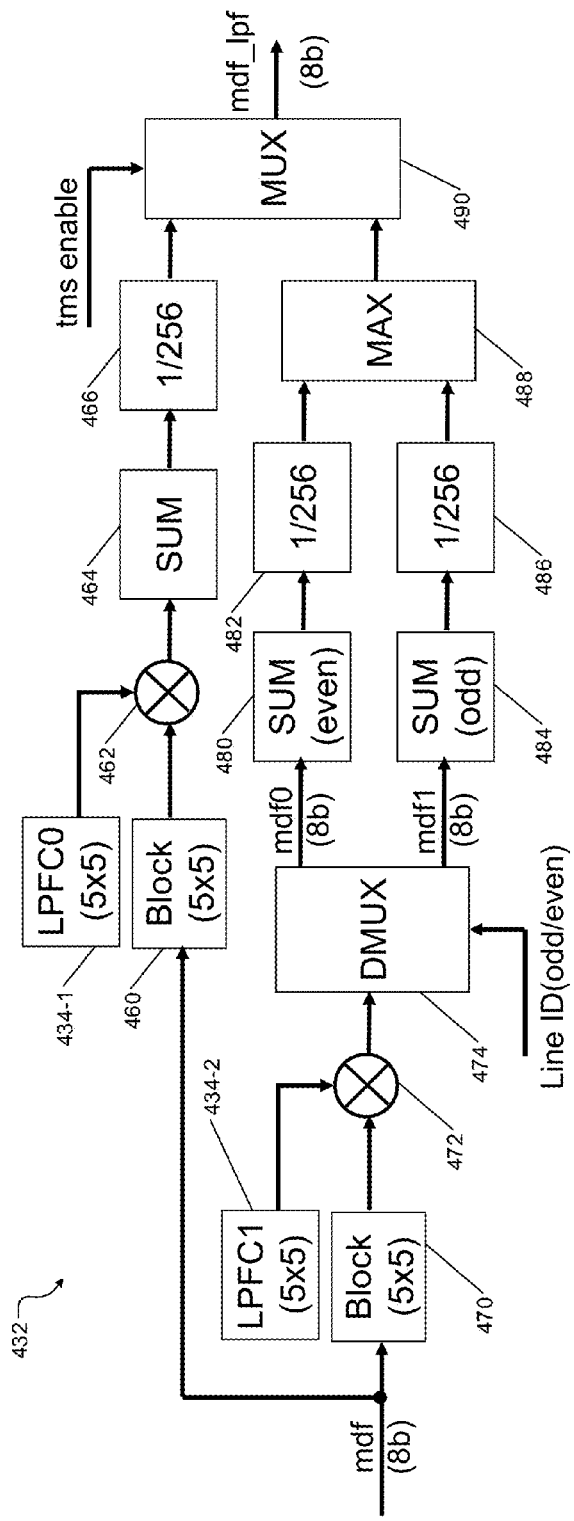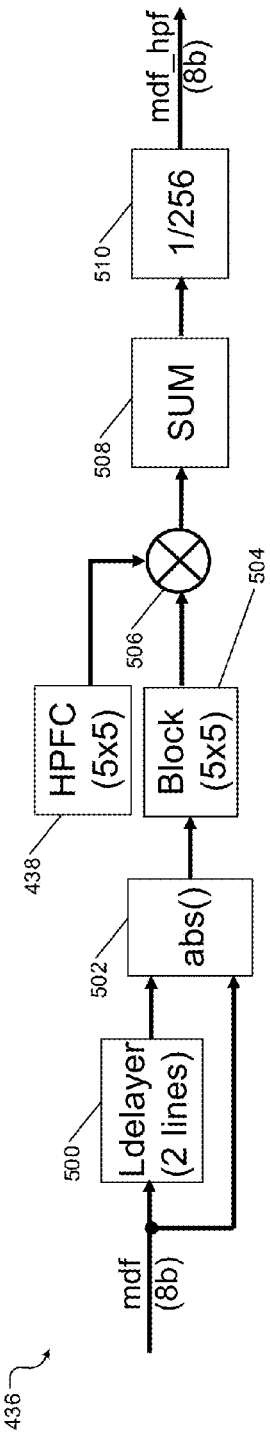
FIG. 16B
FIG. 16C

```
for (m=-2; m<3; m++)
{
    l=(j + m);
    l=Clamp (l, 0, (pDiHwOpt->Height-1));
    for (n=-2; n<3; n++)
    {
        k           =(i + n);
        k           =Clamp (k, 0, (pDiHwOpt->Width-1));
        din[m+2][n+2] =(U16) abs(TDIImage0->Pixels[0][l][k]/4-TDIImage1->Pixels[0][l][k]/4);
    }
}
//sub-band processing
sub_sum         =0;
for (n=0; n<5; n++)
    sub_sum    =sub_sum + (abs(din[0][n]+din[4][n]-2*din[2][n])/2 + abs(din[1][n]-din[3][n]))/2;
sub_sum         =(sub_sum+4)/8;
if(sub_sum>BIT8)
    sub_sum    =BIT8;
```

FIG. 16F

```
//used when TMS is off
tap5x5LPFC[5][5] =
{ 1,  4,  6,  4, 1,
  4, 16, 24, 16, 4,
  6, 24, 36, 24, 6,
  4, 16, 24, 16, 4,
  1,  4,  6,  4, 1}

//used when TMS is on
tap5x5LPFC[5][5] =
{ 2,  8, 12,  8, 2,
  4, 16, 24, 16, 4,
  4, 16, 24, 16, 4,
  4, 16, 24, 16, 4,
  2,  8, 12,  8, 2}
```

```
//tap1x5HPFC[5] =
{ 0.5, 0.5, -1, 0.5, 0.5}
```

FIG. 16D

```
y_sum0=0;  y_sum1=0;
for (m=-2; m<3; m++)
{
    l=(j + m);  l=Clamp (l, 0, (pDiHwOpt->Height-1));
    for (n=-2; n<3; n++)
    {
        k=(i + n);  k=Clamp (k, 0, (pDiHwOpt->Width-1));
        y_mdv =abs(TDIImage0->Pixels[0][l][k]/4-TDIImage1->Pixels[0][l][k]/4);    //motion value per pixel
        if(abs(m)%2==1)                                  //old lines
        {
            if(pDiHwReg->MdvFilterSel[0])                //motion stretch off
                y_sum0=y_sum0 + y_mdv*tap5x5FiltCoef[2-abs(m)][2-abs(n)];
            else
                y_sum0=y_sum0 + y_mdv*tap5x5FiltCoef0[2-abs(m)][2-abs(n)];
        }
        else                                             //even lines
        {
            if(pDiHwReg->MdvFilterSel[0])
                y_sum1=y_sum1 + y_mdv*tap5x5FiltCoef[2-abs(m)][2-abs(n)];
            else
                y_sum1=y_sum1 + y_mdv*tap5x5FiltCoef0[2-abs(m)][2-abs(n)];
        }
    }
if(pDiHwReg->MdvFilterSel[0])
    y_sum=y_sum0 + y_sum1;
else                                                     //implement motion stretch
{
    if(y_sum0>y_sum1)
        y_sum   =2*y_sum0;
    else
        y_sum   =2*y_sum1;
}
y_sum  =(y_sum+1)/256;                                   //final motion filter output
```

FIG. 16E

```
If(sosd)
    ymdv    =lasd_mdv;
else if ((lamd>0)&&(lasd==0))
    ymdv    =lamd_mdv
else if ((lasd>0)&&(lamd==0))
    ymdv    =lasd_mdv;
else
    ymdv    =mdf_mdv;
```

FIG. 18

Selection logic:
if(h0&&h1) line ="vertical"
else if( v0&&v1 ) line="horizontal"
else line ="undecided"

Gradient (tap3) logic:
  q0    =abs(din[0] - din[2]);
  q1    =abs(din[1] - din[3]);
  q2    =abs(din[2] - din[4]);

FIG. 17B

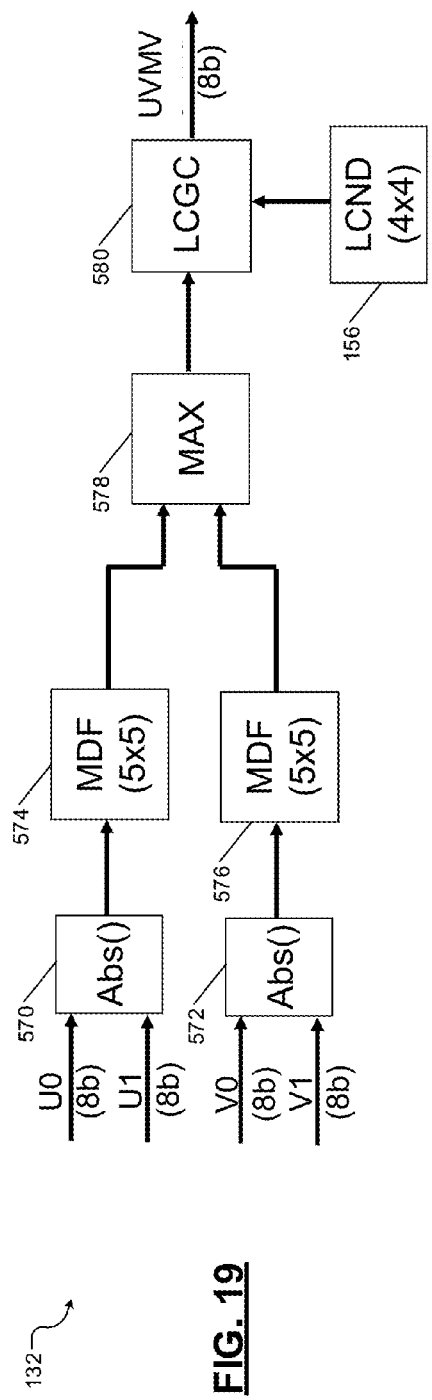

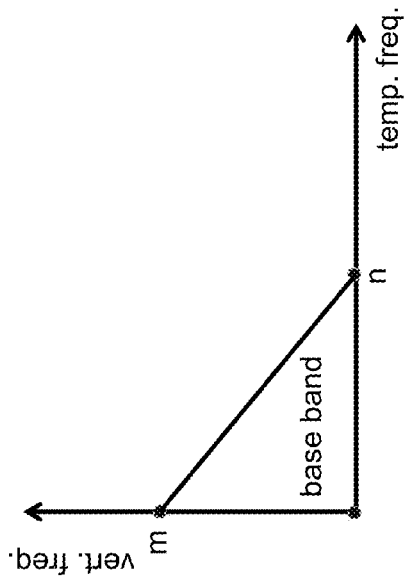
FIG. 23
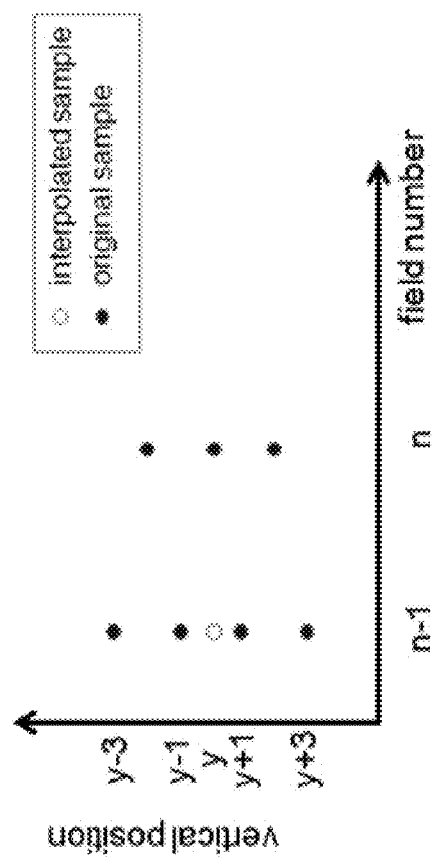
FIG. 24A
FIG. 24B

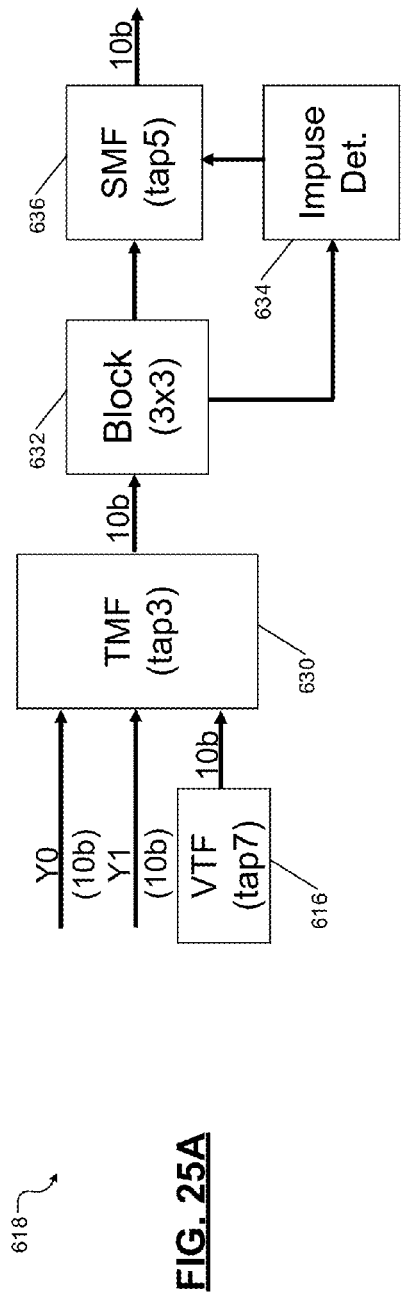
FIG. 25A
```
if((d0>thr)&&(d1>thr)
&&(d2>thr)&&(d3>thr))
{ impulse = 1;}
else
{ impulse =0;}
```
d0 = abs(c-a);
d1 = abs(c-b);
d2 = abs(c-d);
d3 = abs(c-e);
(Impulse Detector)
FIG. 25B
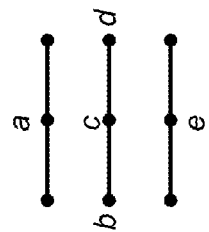
```
if(impulse==1)
  out=median5(a, b, c, d, e);
else
  out=c;
```
(SMF)
FIG. 25C

```
max_min = (max – min);
sad_thr  = max + thr_gain*max_min;
```

FIG. 29

| Min. Output (g) | Definition of angle certainty (uncertainty) |
|---|---|
| 0 | Vertical angle certainty (type I local minima) |
| 1 | Rising angle certainty (type I local minima) |
| 2 | Falling angle certainty (type I local minima) |
| 3 | Rising and falling angle uncertainty (type II local minima) |
| 4 | Vertical and falling angle uncertainty (type II local minima) |
| 5 | Vertical and rising angle uncertainty (type II local minima) |
| 6 | All region angle uncertainty (type III local minima) |

FIG. 30

```
case 3:                    //type II local minima: rising and falling angles are uncertainty
if(abs(sdi_e[1]-sdi_e[2])<NoiseThr)    //their sad values are too close to be resolved if(edge==1)                                //horizontal edge weight on lowest angle values
    {
        h[3]       =-12;
        h[4]       =12;
        k0         =SMedian5(h);    //output of angle value from median filter
    }
    else if(edge==2)                           //vertical edge weight on vertical angle value
    {
        h[4]       =0;
        k0         =SMedian5(h);
    }
    else if(edge==3)                           //rising edge weight on 45 degree rising angle
    {
        h[4]       =2;
        k0         =SMedian5(h);
    }
    else if(edge==4)                           //falling edge weight on 45 degree falling angle
    {
        h[4]       =-2;
        k0         =SMedian5(h);
    }
    else                                       //any other cases, weight on vertical angle
    {
        h[4]       =0;
        k0         =SMedian5(h);
    }
```

FIG. 31B rise_sad =abs(b0-a1) + abs(b1-a2) + abs(b2-a3)
+ abs(c0-b1) + abs(c1-b2) + abs(c2-b3)
+ abs(d0-c1) + abs(d1-c2) + abs(d2-c3);

fall_sad =abs(a0-b1) + abs(a1-b2) + abs(a2-b3)
+ abs(b0-c1) + abs(b1-c2) + abs(b2-c3)
+ abs(c0-d1) + abs(c1-d2) + abs(c2-d3);

If((rise_sad<fall_sad)&&(abs(rise-sad-fall_sad)>thr))
  edge    =rising_edge;
else if(fall_sad<rise_sad)&& )&&(abs(rise-sad-fall_sad)>thr))
  edge    =falling_edge;

```
switch(hsgrm)
{
case 0:
    confidence              =LOW;           //from histogram quantizer
    if((edge==1)                            //lowest confidence level by default
    {                                       //low-angle
        if((abs_angle>(int) (3+pD)HwReg->SdiAbsAngConfThr))  //if angle is low and edge is horizontal line
            confidence      =MID_LOW;       //upgrade the confidence level
    }
    else if((edge==2)
    {                                       //high-angle
    }
    if((abs_angle<(int) (3-pD)HwReg->SdiAbsAngConfThr))  //if angle is high and edge is vertical line
            confidence      =MID_LOW;       //upgrade the confidence level
    }
    else if((edge==3)
    {                                       //rising angle
        if(angle<6)
            confidence      =MID_LOW;       //if angle is rising and edge is rising
    }                                       //upgrade the confidence level
    else if((edge==4)
    {                                       //falling angle
        if(angle>6)
            confidence      =MID_LOW;       //if angle is falling and edge is falling
    }                                       //upgrade the confidence level
    break;
............
```

FIG. 34

| Global Indicators | # of bits | Functions |
|---|---|---|
| GHF | 1 | Global high frequency indicator. The ID will guide the motion threshold values so that motion values will likely fall into the VTF range or below. SDI artifacts will be minimized. |
| GRPD | 2 | Global repeated pattern detection. The indicator will guide the angle detection and angle adaptive SDI so that the false angle artifacts are minimized. |
| GOSD | 2 | Global OSD indicator. The ID will guide the motion detection favored to more static or more motion, depending on weather the OSD is static one or scrolling text. |
| GMDV_MIN | 2 | Global noise level indicator for motion detection |
| GMDV | 2 | Global motion indicator. The ID will guide to disable LAMD and LCNC, or to force NCF to be in place. |
| GLAMD | 2 | Global large area motion detection. The indicator will guide to disable LAMD or user-defined LAMD, to change the offset setting for LCNC, and to change the threshold setting for SOSD detection. |

FIG. 39

| Film Material | A | B | C | D |
|---|---|---|---|---|

| Interlaced Format (60 Hz) | Ae | Ao | Ae | Bo | Be | Co | Ce | Co | De | Do |
|---|---|---|---|---|---|---|---|---|---|---|

| Progressive Format (30 Hz) | AA | AB | BC | CC | DD |
|---|---|---|---|---|---|

FIG. 41

```
If( (j%2)==0)        //even line
{
   VDI0(j) = Fin(j);
   VDI1(j) = (Fin(j-1) + Fin(j+1))/2;
}
else                 //Odd line
{
   VDI1(j) = Fin(j);
   VDI0(j) = (Fin(j-1) + Fin(j+1))/2;
}
Where j is the line index.
```

| Progressive Format (30 Hz) | AeAo | BeBo | CeCo | DeDo | EeEo |
|---|---|---|---|---|---|
| Still0 | 1 | 1 | 1 | 1 | 1 |
| Still1 | 0 | 0 | 0 | 0 | 0 |

FIG. 52B

| Fmd_phase | Line ID | Still1 | Fmdout |
|---|---|---|---|
| 0 | 0 | n/a | Fin0 |
| 0 | 1 | n/a | Fin1 |
| 1 | 0 | n/a | Fin1 |
| 1 | 1 | 1 | Fin1 |
| 1 | 1 | 0 | Fin0 |
| 2 | 0 | n/a | Fin1 |
| 2 | 1 | n/a | Fin0 |
| 3 | n/a | n/a | Fin1 |

FIG. 56

| Fmd_phase | Line ID | Still0 | Still1 | mdr_sel | fmd_lock | mdr |
|---|---|---|---|---|---|---|
| 0 | n/a | n/a | n/a | n/a | 0 | mdr |
| 0 | n/a | n/a | n/a | 1 | 1 | 3 |
| 0 | n/a | n/a | n/a | 2 | 1 | 3 |
| 0 | n/a | n/a | 1 | 0 | 1 | 0 |
| 1 | n/a | n/a | 0 | 0 | 1 | mdr+1 |
| 1 | n/a | n/a | n/a | 1 | 0 | 3 |
| 1 | 0 | n/a | n/a | 2 | 1 | mdr |
| 1 | 1 | n/a | 1 | 0 | 1 | 3 |
| 1 | 1 | n/a | 0 | 0 | 1 | 0 |
| 1 | 1 | 1 | n/a | 1 | 1 | 0 |
| 2 | n/a | 0 | n/a | 2 | 1 | mdr+0 |
| 2 | n/a | n/a | n/a | 0 | 0 | 3 |
| 2 | 0 | n/a | n/a | 1 | 1 | 3 |
| 2 | 1 | n/a | n/a | 2 | 1 | mdr+1 |
| 2 | 1 | n/a | n/a | 0 | 1 | 3 |
| 3 | n/a | n/a | n/a | 1 | 0 | 0 |
| 3 | 0 | n/a | n/a | 2 | 1 | mdr+0 |
| 3 | 1 | n/a | 1 | 0 | 1 | 3 |
| 3 | 1 | n/a | 0 | 0 | 1 | 0 |
| 3 | 1 | n/a | n/a | 0 | 1 | mdr |

FIG. 57

MOTION ADAPTIVE DE-INTERLACING AND ADVANCED FILM MODE DETECTION

CROSS-REFERENCE TO RELATED APPLICATIONS

This application claims the benefit of U.S. Provisional Application No. 62/152,590, filed Apr. 24, 2015 and U.S. Provisional Application No. 62/152,600, filed on Apr. 24, 2015. The entire disclosures of the applications referenced above are incorporated herein by reference.

FIELD

The present disclosure relates generally to video signal processing and more particularly to motion adaptive de-interlacing and advanced film mode detection.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

De-interlacing addresses a legacy problem: interlaced video required by old cathode ray tube (CRT)-based analog televisions must be converted to be shown on today's digital televisions. An interlaced video is a succession of 50/60 fields per second, where each field carries only half of the rows that are displayed in each frame of video. Much of today's video content is available in the interlaced format and requires de-interlacing since newer liquid crystal display (LCD) and plasma based displays require progressive video input.

In interlaced video, one frame of video is broken into two fields, one of which contains even lines and the other odd lines. To display interlaced video on newer LCD or plasma display, the display must be de-interlaced. The newer displays are progressive in that each frame comprises a set of pixels (e.g., 1920×1080). Two fields contain pixels of one frame. Each field records pixels that are separated in time. Assuming there are 30 frames per second (fps) or 60 fields per second, field 0 is at time t, and field 1 is at time t+1/60. Since the fields are recorded at slightly different time intervals, the two fields cannot be combined to create a progressive frame for any video that has motion. De-interlacing is complex due to the need to estimate and compensate for the potential motion in that one-sixtieth of a second.

Fundamentally, de-interlacing is a process of converting a stream of interlaced frames into a stream of progressive frames. Two basic de-interlacing methods are called bob and weave. In bob de-interlacing, each field becomes its own frame of video, so an interlaced National Television System Committee (NTSC) clip at 29.97-fps stream becomes a 59.94-fps progressive. Since each field has only half of the scan lines of a full frame, interpolation must be used to form the missing scan lines. Bob de-interlacing can also be called spatial line doubling, in which the lines in each field are doubled. The new line generated can be a copy of the previous line (scan-line duplication) or an average of the lines above and below (scan-line interpolation). Bob de-interlacing provides a good result when the image intensity varies smoothly, but it can soften the image since it reduces the vertical resolution.

Weave de-interlacing involves weaving two fields that are separated in time into one frame. Weave de-interlacing provides good results if there is no motion in the one-sixtieth of a second that separates the two fields (for NTSC video). Sometimes, when pairs of interlaced fields have been created from original progressive frames, the results of the weave algorithm are perfect. If there is motion, however, artifacts called mouse teeth appear.

Both bob and weave de-interlacing can affect the image quality, especially when there is motion. Bob de-interlacing can soften the image while weave de-interlacing can create jagged images or mouse teeth artifacts. Bob and weave de-interlacing can be combined to improve the quality of de-interlacing, where motion between successive frames of video is detected and computed. This combination technique, which uses the weave technique for static regions and the bob technique for regions that exhibit motion, is called motion-adaptive de-interlacing. The key to motion-adaptive de-interlacing is obtaining accurate motion detection and motion value calculation, usually by comparing pixels from one frame to the next.

Interlaced video can have complexities other than transmission of odd and even fields. For example, motion picture photography is progressive and is based on 24 fps while NTSC format is 60 fields per second. So conversion of motion picture photography into interlaced video can create complex cadences. To convert motion picture photography to interlaced video, each progressive frame is converted into two fields. So 24 fps converts to 48 fields per second. To increase the 48 fields to the required 60, a 3:2 pulldown technique or cadence is used to generate three fields from one film frame and two fields from the other film frame. In addition, sometimes every twelfth field is dropped to accelerate the film and fit it within a given time slot. This loss is barely noticed by an average viewer but results in a 3:2:3:2:2 cadence (or simply 3:2 pulldown), which includes the following sequence: Frame 1: 3 fields, Frame 2: 2 fields, Frame 3: 3 fields, Frame 4: 2 fields, Frame 5: 2 fields. The sequence is repeated.

In countries that use the Phase Alternating Line (PAL) or Sequential Couleur Avec Memoire (SECAM) video standards, films destined for television are photographed at 25 fps. Theatrical features originally photographed at 24 fps are shown at 25 fps. To convert 24 fps material to 25 fps, a 2:2:2:2:2:2:2:2:2:2:2:3 (Euro) pulldown (or simply 2:2 pulldown) is used, where a pulldown field is inserted every 12 frames, thus effectively spreading 12 frames of film over 25 fields (or 12.5 frames). The 2:2 pulldown is also used to transfer shows and films photographed at 30 frames per second to NTSC video, which has 60 Hz scanning rate. Additionally, professional camcorders and various types of video processing use different types of cadences. Accordingly, de-interlacers must compare incoming fields and detect the cadence. If esoteric cadences are not detected, video data may be unnecessarily discarded. In some instances, one part of a frame may have 3:2 cadence while another part may be straight interlaced (e.g., a film is inserted in an interlaced video). To detect and correctly de-interlace such a source would require de-interlacers to implement a per-pixel cadence detection.

SUMMARY

A system comprises a motion adaptive de-interlacer, a film mode detector, and a combiner. The motion adaptive de-interlacer is configured to receive a plurality of interlaced frames, each of the plurality of frames including a plurality of fields; generate a first motion indicator indicating motion between fields of the plurality of interlaced frames; and generate a first output by de-interlacing the plurality of frames based on the first motion indicator. The film mode detector is configured to receive the plurality of interlaced frames; generate a second motion indicator indicating motion between fields of the plurality of interlaced frames; detect a film mode of the plurality of interlaced frames based on the second motion indicator; generate a second output by de-interlacing the plurality of interlaced frames based on the second motion indicator and the film mode; and generate a control signal based on the second motion indicator and the film mode. The combiner is configured to combine the first output and the second output based on the control signal.

In other features, the motion adaptive de-interlacer is further configured to generate the first motion indicator based on a frame-based processing of the plurality of interlaced frames; and the film mode detector is further to generate the second motion indicator based on a field-based processing of the plurality of interlaced frames.

In other features, the combiner is further configured to generate a plurality of progressive frames for rendering on a non-interlaced display by combining the first and second outputs and one or more of the plurality of interlaced frames.

In other features, the motion adaptive de-interlacer comprises a motion detector, a de-interlacer, and an image feature analyzer. The motion detector is configured to receive the plurality of interlaced frames and to generate the first motion indicator. The de-interlacer is configured to receive the plurality of interlaced frames and to generate the first output by de-interlacing the plurality of frames based on the first motion indicator. The image feature analyzer is configured to analyze content of each of the plurality of frames and to control the motion detector and the de-interlacer based on the analyzed content.

In other features, the motion detector further comprises a Y channel motion detector and a UV channel motion detector. The Y channel motion detector is configured to detect motion in Y channel components of the plurality of frames and to generate a Y motion vector. The UV channel motion detector is configured to detect motion in UV channel components of the plurality of frames and to generate a UV motion vector. The motion detector is further configured to generate the first motion indicator based on the Y motion vector and the UV motion vector.

In other features, the motion detector further comprises a first blender, a second blender, a first quantizer, and a second quantizer. The first blender is configured to blend the Y motion vector and the UV motion vector based on a first control input and to generate a first blended output. The second blender is configured to blend the Y motion vector and the UV motion vector based on a second control input and to generate a second blended output. The first quantizer is configured to quantize the first blended output. The second quantizer is configured to quantize the second blended output. The motion detector is further configured to generate the first motion indicator based on the first and second quantized outputs.

In other features, the Y channel motion detector comprises a plurality of detectors, a plurality of filters, and a selector. The plurality of detectors is configured to detect motion information for the Y channel components of the plurality of frames. The plurality of filters is configured to process the Y channel components of the plurality of frames. The selector is configured to select one of the plurality of filters based on the motion information detected by one or more of the plurality of detectors. The Y channel motion detector is further configured to generate the Y motion vector based on an output of the selected one of the plurality of filters.

In other features, the plurality of detectors comprises a first detector, a second detector, and a third detector. The first detector is configured to detect motion in a group of pixels in the Y channel components and to generate a first motion information indicating whether the motion in the group of pixels is in horizontal direction, vertical direction, or in horizontal and vertical directions. The second detector is configured to detect static pixels in a group of pixels in the Y channel components and to generate a second motion information indicating detection of static pixels in the group of pixels. The third detector to detect static on screen display in a group of pixels in the Y channel components and is configured to generate a third motion information indicating detection of static on screen display in the group of pixels.

In other features, the plurality of filters comprises a first filter and a second filter. The first filter is configured to stretch the motion detected in a group of pixels in the Y channel components in horizontal direction, vertical direction, or in horizontal and vertical directions based on the first motion information. The second filter is configured to cancel noise from a group of pixels in the Y channel components based on one or more of the second motion information and the third motion information.

In other features, the first filter is further configured to apply different weight and gain values to the pixels in the horizontal direction, vertical direction, or in horizontal and vertical directions. The second filter is further configured to cancel the noise by processing the pixels using an absolute sum of values technique instead of using sum of absolute values technique and by applying different gain for the second motion information than for the third motion information.

In other features, the first detector comprises a horizontal motion detector, a vertical motion detector, and a two dimensional motion detector. The horizontal motion detector is configured to detect horizontal motion in the group of pixels and to generate a horizontal motion value by comparing motion values of pixels on opposite sides of a pixel along a horizontal axis. The vertical motion detector is configured to detect vertical motion in the group of pixels and to generate a vertical motion value by comparing motion values of pixels on opposite sides of a pixel along a vertical axis. The two dimensional motion detector is configured to detect motion in horizontal and vertical directions and to generate a two dimensional motion value based on a first sum of motion values of pixels in horizontal direction and a second sum of motion values of pixels in vertical direction. The first detector is further configured to generate the first motion information based on one of the horizontal motion value, the vertical motion value, and the two dimensional motion value.

In other features, the second detector is further configured to detect a number of static pixels by comparing motion values of pixels in the group of pixels to a first motion value threshold and to generate the second motion information by comparing a total number of pixels static pixels to a second threshold.

In other features, the third detector is further configured to detect motion values including absolute value, direction, and sign for horizontal and vertical sets of pixels in the Y channel components of each of the plurality of frames and to generate the third motion information based on the motion values.

In other features, the plurality of detectors comprises a fourth detector and a gain controller. The fourth detector is configured to detect texture of a group of pixels in the Y channel components and to generate a fourth motion information indicating the texture of the group of pixels. The gain controller is configured to adjust an output of the selector based on the fourth motion information. The Y channel motion detector is further configured to generate the Y motion vector based on an output of the gain controller.

In other features, the fourth detector is further configured to generate the fourth motion information based on a horizontal gradient value generated by adding pixel delays and a vertical gradient value generated by adding line delays.

In other features, the Y channel motion detector comprises a motion detection filter comprising a low pass filter, a temporal stretch filter, a high pass filter, a motion line detector, and a gain controller. The low pass filter is configured to filter the Y channel components and to generate a first filtered output. The temporal stretch filter is configured to separate pixels corresponding to odd and even lines from the Y channel components, process motion values of pixels corresponding to the odd and even lines, and generate a second filtered output. The high pass filter is configured to filter the Y channel components and to generate a third filtered output. The motion line detector is configured to detect motion in the pixels along a horizontal or vertical line. The gain controller is configured to apply a first gain to the first or second filtered output in response to the motion being along the vertical line, to apply a second gain to the third output in response to the motion being along the horizontal line, and to generate a scaled motion value. The Y channel motion detector is further configured to generate the Y motion vector based on the scaled motion value.

In other features, the motion line detector is further configured to generate horizontal and vertical gradient values by processing horizontal and vertical pixels in the Y channel components; scale the horizontal and vertical gradient values by applying different gains to the horizontal and vertical gradient values; compare the horizontal and vertical gradient values, the scaled horizontal and vertical gradient values, and horizontal and vertical threshold values to each other; and detect the motion along the horizontal or vertical line based on the comparisons.

In other features, the Y channel motion detector further comprises a detector and a gain adjuster. The detector is configured to detect texture of a group of pixels in the Y channel components and to generate a motion information indicating the texture of the group of pixels. The gain adjuster is configured to adjust the scaled motion value based on the motion information. The Y channel motion detector is further configured to generate the Y motion vector based on an output of the gain adjuster.

In other features, the UV channel motion detector comprises a first motion detection filter, a second motion detection filter, a detector, and a gain adjuster. The first motion detection filter is configured to detect a first motion value associated with a U portion of the UV channel components. The second motion detection filter is configured to detect a second motion value associated with a V portion of the UV channel components. The detector is configured to detect texture of a group of pixels in the UV channel components and to generate a motion information indicating the texture of the group of pixels. The gain adjuster is configured to adjust one of the first and second motion values based on the motion information. The UV channel motion detector is further configured to generate the UV motion vector based on an output of the gain adjuster.

In other features, each of the first and second motion detection filters comprises a low pass filter, a temporal stretch filter, and a gain controller. The low pass filter is configured to filter the UV channel components and to generate a first filtered output. The temporal stretch filter is configured to separate pixels corresponding to odd and even lines from the UV channel components, process motion values of pixels corresponding to the odd and even lines, and generate a second filtered output. The gain controller is configured to apply a gain to the first or second filtered output and to generate a scaled motion value. The scaled motion values of the first and second motion detection filters respectively correspond to the first and second motion values of the first and second motion detection filters.

In other features, the first and second quantizers are configured to adjust the first and second blended outputs based on a noise level indication received from the image feature analyzer.

In other features, the de-interlacer comprises a Y channel de-interlacer and a UV channel de-interlacer. The Y channel de-interlacer is configured to de-interlace Y channel components of the plurality of interlaced frames based on the first motion indicator. The UV channel de-interlacer is configured to de-interlace UV channel components of the plurality of interlaced frames based on the first motion indicator. The de-interlacer is further configured to generate the first output based on outputs of the Y and UV channel de-interlacers.

In other features, the Y channel de-interlacer comprises a temporal de-interlacer, an average generator, a spatial de-interlacer, a vertical temporal filter, a three dimensional median filter, a blender, a multiplexer, and a selector. The temporal de-interlacer is configured to temporally de-interlace a pair of interlaced fields of the Y channel components using Weave method and to generate a first temporal output. The average generator is configured to generate an average of the Y channel components and to generate a second averaged output. The spatial de-interlacer is configured to spatially de-interlace the first temporal output using angle adaptive single field spatial de-interlacing and to generate a third output. The vertical temporal filter is configured to filter high-frequency harmonics from the first temporal output and to generate a fourth output. The three dimensional median filter is configured to filter leakage from the fourth output using temporal and spatial filters and to generate a fifth output. The blender is configured to blend the third and fourth outputs and to generate a sixth output. The multiplexer is configured to select the first temporal output or the second averaged output based on a noise control signal and to generate a seventh output. The selector is configured to select one of the third, fourth, fifth, sixth, and seventh outputs as an output of the Y channel de-interlacer based on the first motion indicator.

In other features, the three dimensional median filter is further configured to remove feathering and flicker due to leakage in the fourth output. The three dimensional median filter comprises a temporal median filter, an impulse detector, and a spatial median filter. The temporal median filter is configured to filter the Y channel components and the fourth output and to generate an eighth output. The impulse detector is configured to detect noise in the eighth output. The spatial median filter is configured to filter the eighth output and to generate a ninth output based on the noise detected in the eighth output.

In other features, the spatial de-interlacer comprises an angle detector, an angle stretch filter, an adaptive vertical interpolator, a vertical interpolator, an interpolation median filter, an edge detector, and a confidence level estimator. The angle detector is configured to detect angles in vertical, rising, and falling angle regions of a field and to generate a raw angle value. The angle stretch filter is configured to smooth the raw angle value and to generate a filtered angle value. The adaptive vertical interpolator is configured to interpolate pixels of the field based on the filtered angle value and to generate a first interpolated output. The vertical interpolator is configured to interpolate the pixels of the field and to generate a second interpolated output. The interpolation median filter is configured to filter interpolation artifacts from the first interpolated output. The edge detector is configured to detect horizontal, vertical, rising, and falling edges by processing the pixels of the field. The confidence level estimator is configured to estimate a confidence level of the raw angle value based on the horizontal, vertical, rising, and falling edges. The spatial de-interlacer is configured to generate the third output based on the first and second interpolated outputs and based on the confidence level and the first motion indicator.

In other features, the UV channel de-interlacer is further configured to de-interlace the UV channel components of the plurality of interlaced frames using vertical interpolation.

In other features, the image feature analyzer is further configured to generate a high frequency indicator used by the motion detector to set one or more thresholds to detect motion and by the de-interlacer to minimize interpolation artifacts. The image feature analyzer is further configured to detect a repeated pattern and generate a repeated pattern indicator used by the de-interlacer in angle detection. The image feature analyzer is further configured to generate an on screen display indicator used by the motion detector to reliably detect motion or static pixels based on whether the on screen display is static or scrolling text as indicated by the on screen display indicator. The image feature analyzer is further configured to generate a noise level indicator used by the motion detector to detect motion. The image feature analyzer is further configured to generate a plurality of frame-based motion indicators used by the motion detector to detect motion.

In other features, the film mode detector comprises a vertical interpolator, a static line detector, a low contrast detector, and a horizontal motion estimator. The vertical interpolator is configured to interpolate the plurality of interlaced frames and to generate a plurality of interpolated fields. The static line detector a horizontal motion estimator to compare motion in the plurality of interpolated fields, determine whether a field is repeated, and generate a plurality of static line indicators. The low contrast detector a horizontal motion estimator to detect a low contrast region in the plurality of interpolated fields and to generate a low contrast indicator. The horizontal motion estimator a horizontal motion estimator to estimate motion in the plurality of interpolated fields, to determine whether two adjacent ones of the plurality of interpolated fields belong to a single frame based on the plurality of static line indicators and the low contrast indicator, and to generate the second motion indicator including a plurality of motion vectors indicating the estimated motion.

In other features, the static line detector is further configured to generate each of the plurality of static line indicators based on different pairs of the plurality of interpolated fields.

In other features, the low contrast detector is further configured to generate the low contrast indicator by processing a block of pixels in one of the plurality of interpolated fields where the plurality of motion vectors generated by the horizontal motion estimator is unreliable or nonexistent.

In other features, the horizontal motion estimator is further configured to estimate the motion by processing first and second fields of the plurality of interpolated fields to generate a first motion vector of the plurality of motion vectors and by processing second and third fields of the plurality of interpolated fields to generate a second motion vector of the plurality of motion vectors.

In other features, the horizontal motion estimator comprises a first matching module, a second matching module, first and second minima modules, first and second median filters, first and second quantizers, and first and second multiplexers. The first matching module is configured to perform block matching for first and second fields of the plurality of interpolated fields and to generate first outputs. The second matching module is configured to perform block matching for second and third fields of the plurality of interpolated fields and to generate second outputs. The first and second minima modules are configured to respectively generate first and second minima values based on the first and second outputs. The first and second median filters are configured to respectively filter the first and second minima values. The first and second quantizers are configured to respectively quantize the filtered first and second minima values. The first and second multiplexers are configured to respectively receive the filtered first and second minima values and to generate the plurality of motion vectors based on the filtered first and second minima values, the plurality of static line indicators, and the low contrast indicator.

In other features, the system further comprises a plurality of histogram accumulators configured to accumulate the plurality of motion vectors for a plurality of pixel blocks, to generate static vector histograms for first and second fields and for second and third fields of the plurality of interpolated fields, and to generate motion vector histograms for the first and second fields and for the second and third fields of the plurality of interpolated fields. The film mode detector is further configured to detect the film mode and to generate the control signal based on the static and motion vector histograms.

In other features, the system further comprises a processor configured to process the plurality of motion vectors and to detect the film mode by determining whether the plurality of interlaced frames is from a source of progressive frames including film and graphics, and by detecting cadence of the plurality of interlaced frames.

In other features, the system further comprises a de-interlacer configured to generate the second output by de-interlacing the plurality of interlaced frames using Weave method based on the second motion indicator and the film mode.

In other features, the system further comprises a motion detector, a classifier, and a blender. The motion detector is configured to detect motion between fields of the plurality of interlaced frames based on the film mode. The classifier is configured to classify the plurality of motion vectors generated by the horizontal motion estimator based on the film mode. The blender is configured to blend outputs of the motion detector and the classifier based on the film mode and to generate the control signal.

In other features, the processor comprises a mixer, a still detector, a cadence detector, and a mode detector. The mixer is configured to mix the plurality of motion vectors. The still detector is configured to generate a plurality of still indicators based on an output of the mixer. The cadence detector is configured to detect the cadence based on the plurality of still indicators. The mode detector is configured to detect the film mode based on the plurality of still indicators and the cadence, and to generate a film mode lock signal and a film mode phase signal.

In other features, the system further comprises a de-interlacer configured to generate the second output by de-interlacing the plurality of interlaced frames using Weave method based on the plurality of still indicators and the film mode phase signal.

In other features, the system further comprises a motion detector, a classifier, and a blender. The motion detector is configured to detect motion between fields of the plurality of interlaced frames based on the film mode phase signal. The classifier is configured to classify the plurality of motion vectors generated by the horizontal motion estimator based on the film mode phase signal. The blender is configured to blend outputs of the motion detector and the classifier based on the film mode lock signal and to generate the control signal.

In other features, the motion detector comprises a vertical interpolator configured to interpolate the plurality of interlaced frames and to generate a plurality of interpolated fields. The motion detector is further configured to generate a plurality of motion values by processing different pairs of the plurality of interpolated fields selected based on the film mode phase signal. The classifier is further configured to generate a plurality of confidence levels for the plurality of motion vectors generated by the horizontal motion estimator and to combine the plurality of confidence levels based on the film mode phase signal. The blender is further configured to blend the plurality of motion values and the combined confidence level based on the film mode phase signal and the plurality of still indicators to generate the control signal.

In still other features, a method comprises generating a first motion indicator indicating motion between fields of a plurality of interlaced frames, each of the plurality of frames including the fields; and generating a first output by de-interlacing the plurality of frames based on the first motion indicator. The method further comprises generating a second motion indicator indicating motion between the fields of the plurality of interlaced frames; detecting a film mode of the plurality of interlaced frames based on the second motion indicator; generating a second output by de-interlacing the plurality of interlaced frames based on the second motion indicator and the film mode; and generating a control signal based on the second motion indicator and the film mode. The method further comprises combining the first output and the second output based on the control signal.

In other features, the method further comprises generating the first motion indicator based on a frame-based processing of the plurality of interlaced frames, and generating the second motion indicator based on a field-based processing of the plurality of interlaced frames.

In other features, the method further comprises generating a plurality of progressive frames for rendering on a non-interlaced display by combining the first and second outputs and one or more of the plurality of interlaced frames.

In other features, the method further comprises analyzing content of each of the plurality of frames, and controlling generation of the first and second outputs based on the analyzed content.

In other features, the method further comprises detecting motion in Y channel components of the plurality of frames and generating a Y motion vector, detecting motion in UV channel components of the plurality of frames and generating a UV motion vector, and generating the first motion indicator based on the Y motion vector and the UV motion vector.

In other features, the method further comprises blending the Y motion vector and the UV motion vector based on a first control input and generating a first blended output, blending the Y motion vector and the UV motion vector based on a second control input and generating a second blended output, quantizing the first and second blended outputs, and generating the first motion indicator based on the first and second quantized outputs.

In other features, the method further comprises detecting motion information for the Y channel components of the plurality of frames, filtering the Y channel components of the plurality of frames based on the motion information, and generating the Y motion vector based on the filtering.

In other features, the method further comprises detecting motion in a group of pixels in the Y channel components and generating a first portion of the motion information indicating whether the motion in the group of pixels is in horizontal direction, vertical direction, or in horizontal and vertical directions. The method further comprises detecting static pixels in a group of pixels in the Y channel components and generating a second portion of the motion information indicating detection of static pixels in the group of pixels. The method further comprises detecting static on screen display in a group of pixels in the Y channel components and generating a third portion of the motion information indicating detection of static on screen display in the group of pixels.

In other features, the method further comprises stretching the motion detected in a group of pixels in the Y channel components in horizontal direction, vertical direction, or in horizontal and vertical directions based on a first portion of the motion information. The method further comprises canceling noise from a group of pixels in the Y channel components based on one or more of a second portion of the motion information and a third portion of the motion information.

In other features, the method further comprises applying different weight and gain values to the pixels in the horizontal direction, vertical direction, or in horizontal and vertical directions. The method further comprises canceling the noise by processing the pixels using an absolute sum of values technique instead of using sum of absolute values technique and by applying different gain for the second portion of the motion information than for the third portion of the motion information.

In other features, the method further comprises detecting horizontal motion in the group of pixels and to generate a horizontal motion value by comparing motion values of pixels on opposite sides of a pixel along a horizontal axis. The method further comprises detecting vertical motion in the group of pixels and to generate a vertical motion value by comparing motion values of pixels on opposite sides of a pixel along a vertical axis. The method further comprises detecting motion in horizontal and vertical directions and to generate a two dimensional motion value based on a first sum of motion values of pixels in horizontal direction and a second sum of motion values of pixels in vertical direction. The method further comprises generating the first portion of the motion information based on one of the horizontal motion value, the vertical motion value, and the two dimensional motion value.

In other features, the method further comprises detecting a number of static pixels by comparing motion values of pixels in the group of pixels to a first motion value threshold, and generating the second portion of the motion information by comparing a total number of pixels static pixels to a second threshold.

In other features, the method further comprises detecting motion values including absolute value, direction, and sign for horizontal and vertical sets of pixels in the Y channel components of each of the plurality of frames; and generating the third portion of the motion information based on the motion values.

In other features, the method further comprises detecting texture of a group of pixels in the Y channel components and generating a fourth portion of the motion information indicating the texture of the group of pixels. The method further comprises adjusting one or more of the first, second, and third portions of the motion information based on the fourth portion of the motion information; and generating the Y motion vector based on the adjusted output.

In other features, the method further comprises generating the fourth portion of the motion information based on a horizontal gradient value generated by adding pixel delays and a vertical gradient value generated by adding line delays.

In other features, the method further comprises generating a first filtered output by low pass filtering the Y channel components; generating a second filtered output by separating pixels corresponding to odd and even lines from the Y channel components and by processing motion values of pixels corresponding to the odd and even lines; and generating a third filtered output by high pass filtering the Y channel components. The method further comprises detecting motion in the pixels along a horizontal or vertical line; and generating a scaled motion value by applying a first gain to the first or second filtered output in response to the motion being along the vertical line, or by applying a second gain to the third output in response to the motion being along the horizontal line. The method further comprises generating the Y motion vector based on the scaled motion value.

In other features, the method further comprises generating horizontal and vertical gradient values by processing horizontal and vertical pixels in the Y channel components, and scaling the horizontal and vertical gradient values by applying different gains to the horizontal and vertical gradient values. The method further comprises comparing the horizontal and vertical gradient values, the scaled horizontal and vertical gradient values, and horizontal and vertical threshold values to each other; and detecting the motion along the horizontal or vertical line based on the comparisons.

In other features, the method further comprises detecting texture of a group of pixels in the Y channel components and generating a motion information indicating the texture of the group of pixels, adjusting the scaled motion value based on the motion information, and generating the Y motion vector based on adjusted scaled motion value.

In other features, the method further comprises detecting a first motion value associated with a U portion of the UV channel components, detecting a second motion value associated with a V portion of the UV channel components, and detecting texture of a group of pixels in the UV channel components and generating a motion information indicating the texture of the group of pixels. The method further comprises adjusting one of the first and second motion values based on the motion information, and generating the UV motion vector based on adjusted one of the first and second motion values.

In other features, the method further comprises generating a first filtered output by low pass filtering the UV channel components, and generating a second filtered output by separating pixels corresponding to odd and even lines from the UV channel components and by processing motion values of pixels corresponding to the odd and even lines. The method further comprises generating a scaled motion value by applying a gain to the first or second filtered output. The scaled motion values of the first and second filtered outputs respectively correspond to the first and second motion values.

In other features, the method further comprises adjusting the first and second blended outputs based on a noise level indication received from the analyzed content.

In other features, the method further comprises de-interlacing Y channel components of the plurality of interlaced frames based on the first motion indicator, and de-interlacing UV channel components of the plurality of interlaced frames based on the first motion indicator, and generating the first output based on outputs of the de-interlacing Y and UV channel components.

In other features, the method further comprises generating a first temporal output by temporally de-interlacing a pair of interlaced fields of the Y channel components using Weave method. The method further comprises generating a second averaged output by averaging the Y channel components. The method further comprises generating a third output by spatially de-interlacing the first temporal output using angle adaptive single field spatial de-interlacing. The method further comprises generating a fourth output by filtering high-frequency harmonics from the first temporal output. The method further comprises generating a fifth output by spatially and temporally filtering leakage from the fourth output. The method further comprises generating a sixth output by blending the third and fourth outputs. The method further comprises generating a seventh output by selecting the first temporal output or the second averaged output based on a noise control signal. The method further comprises selecting one of the third, fourth, fifth, sixth, and seventh outputs as a de-interlaced of the Y channel components based on the first motion indicator.

In other features, the method further comprises generating an eighth output by filtering the Y channel components and the fourth output, detecting noise in the eighth output, and generating a ninth output by filtering the eighth output based on the noise detected in the eighth output to remove feathering and flicker due to leakage in the fourth output.

In other features, the method further comprises detecting angles in vertical, rising, and falling angle regions of a field and generating a raw angle value, and smoothing the raw angle value and generating a filtered angle value. The method further comprises interpolating pixels of the field based on the filtered angle value and generating a first interpolated output, and interpolating the pixels of the field and generate a second interpolated output. The method further comprises filtering interpolation artifacts from the first interpolated output. The method further comprises detecting horizontal, vertical, rising, and falling edges by processing the pixels of the field. The method further comprises estimating a confidence level of the raw angle value based on the horizontal, vertical, rising, and falling edges. The method further comprises generating the third output based on the first and second interpolated outputs and based on the confidence level and the first motion indicator.

In other features, the method further comprises de-interlacing the UV channel components of the plurality of interlaced frames using vertical interpolation.

In other features, the method further comprises generating a high frequency indicator to set one or more thresholds used to detect motion and to minimize interpolation artifacts. The method further comprises detecting a repeated pattern for angle detection. The method further comprises generating an on screen display indicator to reliably detect motion or static pixels based on whether the on screen display is static or scrolling text. The method further comprises generating a noise level indicator used to detect motion. The method further comprises generating a plurality of frame-based motion indicators used to detect motion.

In other features, the method further comprises generating a plurality of interpolated fields by interpolating the plurality of interlaced frames. The method further comprises generating a plurality of static line indicators by comparing motion in the plurality of interpolated fields and by determining whether a field is repeated. The method further comprises generating a low contrast indicator by detecting a low contrast region in the plurality of interpolated fields. The method further comprises estimating motion in the plurality of interpolated fields. The method further comprises determining whether two adjacent ones of the plurality of interpolated fields belong to a single frame based on the plurality of static line indicators and the low contrast indicator. The method further comprises generating the second motion indicator including a plurality of motion vectors indicating the estimated motion.

In other features, the method further comprises generating each of the plurality of static line indicators based on different pairs of the plurality of interpolated fields.

In other features, the method further comprises generating the low contrast indicator by processing a block of pixels in one of the plurality of interpolated fields where the plurality of motion vectors is unreliable or nonexistent.

In other features, the method further comprises estimating the motion by processing first and second fields of the plurality of interpolated fields to generate a first motion vector of the plurality of motion vectors, and by processing second and third fields of the plurality of interpolated fields to generate a second motion vector of the plurality of motion vectors.

In other features, the method further comprises performing block matching for first and second fields of the plurality of interpolated fields and generating first outputs, and performing block matching for second and third fields of the plurality of interpolated fields and generating second outputs. The method further comprises generating first and second minima values based on the first and second outputs, and filtering the first and second minima values. The method further comprises quantizing the filtered first and second minima values. The method further comprises generating the plurality of motion vectors based on the filtered first and second minima values, the plurality of static line indicators, and the low contrast indicator.

In other features, the method further comprises accumulating the plurality of motion vectors for a plurality of pixel blocks. The method further comprises generating static vector histograms for first and second fields and for second and third fields of the plurality of interpolated fields. The method further comprises generating motion vector histograms for the first and second fields and for the second and third fields of the plurality of interpolated fields. The method further comprises detecting the film mode and generating the control signal based on the static and motion vector histograms.

In other features, the method further comprises processing the plurality of motion vectors; and detecting the film mode by determining whether the plurality of interlaced frames is from a source of progressive frames including film and graphics, and by detecting cadence of the plurality of interlaced frames.

In other features, the method further comprises generating the second output by de-interlacing the plurality of interlaced frames using Weave method based on the second motion indicator and the film mode.

In other features, the method further comprises detecting motion between fields of the plurality of interlaced frames based on the film mode, classifying the plurality of motion vectors based on the film mode, and generating the control signal by blending results of the motion detecting and the classifying based on the film mode.

In other features, the method further comprises mixing the plurality of motion vectors, and generating a plurality of still indicators based on the mixing. The method further comprises detecting the cadence based on the plurality of still indicators, and detecting the film mode based on the plurality of still indicators and the cadence. The method further comprises generating a film mode lock signal and a film mode phase signal.

In other features, the method further comprises generating the second output by de-interlacing the plurality of interlaced frames using Weave method based on the plurality of still indicators and the film mode phase signal.

In other features, the method further comprises detecting motion between fields of the plurality of interlaced frames based on the film mode phase signal, classifying the plurality of motion vectors based on the film mode phase signal, and generating the control signal by blending results of the detecting motion and the classifying based on the film mode lock signal.

In other features, the method further comprises generating a plurality of interpolated fields by interpolating the plurality of interlaced frames, and generating a plurality of motion values by processing different pairs of the plurality of interpolated fields selected based on the film mode phase signal.

In other features, the method further comprises generating a plurality of confidence levels for the plurality of motion vectors, and combining the plurality of confidence levels based on the film mode phase signal.

In other features, the method further comprises generating the control signal by blending the plurality of motion values and the combined confidence level based on the film mode phase signal and the plurality of still indicators.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

FIG. 1 is a functional block diagram of a de-interlacing system.

FIG. 12B shows the logic for the static on-screen display detector (SOSD) of FIG. 12A.

FIG. 16B is a functional block diagram of a low-pass filter (LPF) used in the motion detection filter (MDF) of FIG. 16A.

FIG. 16C is a functional block diagram of a high-pass filter (HPF) used in the motion detection filter (MDF) of FIG. 16A.

FIG. 16D show the coefficients used by the low-pass filter (LPF) of FIG. 16B and the high-pass filter (HPF) of FIG. 16C.

FIGS. 16E and 16F respectively show logic to implement the low-pass filter (LPF) of FIG. 16B and the high-pass filter (HPF) of FIG. 16C in the form of a C-model.

FIG. 17B shows the logic for the motion line detector of FIG. 17A.

FIG. 18 shows the logic for a selector used in the Y channel motion detector of FIG. 5.

FIG. 19 is a functional block diagram of a UV channel motion detector used in the motion detector of FIG. 4.

FIGS. 20 and 21 respectively show logic for blenders and quantizers used in the motion detector of FIG. 4.

FIG. 23 shows the logic for a temporal de-interlacer (TDI) used in the Y channel de-interlacer of FIG. 22B.

FIG. 24A shows a frequency response of a vertical temporal filter (VTF) used in the Y channel de-interlacer of FIG. 22B.

FIG. 24B shows a 7tap vertical temporal filter (VTF) used in the Y channel de-interlacer of FIG. 22B.

FIG. 25A is a functional block diagram of a three-dimensional temporal and spatial median filter (3DMF) used in the Y channel de-interlacer of FIG. 22B.

FIGS. 25B and 25C respectively show logic for an impulse detector and a spatial median filter (SMF) used in the three-dimensional temporal and spatial median filter (3DMF) of FIG. 25A.

FIG. 29 shows the logic for a threshold comparator used in the angle detector of FIG. 28.

FIG. 30 shows a sample output of a minima module used in the angle detector of FIG. 28.

FIG. 31B shows the logic for the angle classified median filter (CMF) of FIG. 31A.

FIG. 34 shows a portion of a C-model used by the confidence level estimator of FIG. 33.

FIG. 39 shows a table of indicators generated by the image feature analyzer (IFA) of FIG. 38.

FIG. 41 shows 3:2 standard video formats both in interlaced and progressive scans.

FIGS. 52A and 52B respectively show examples of 3:2 and 2:2 pulldown still patterns.

FIGS. 56 and 57 respectively show logic for a de-interlacer and a blender used in the film mode processor (FMP) of FIG. 53.

In the drawings, reference numbers may be reused to identify similar and/or identical elements.

DESCRIPTION

Figure 2A:
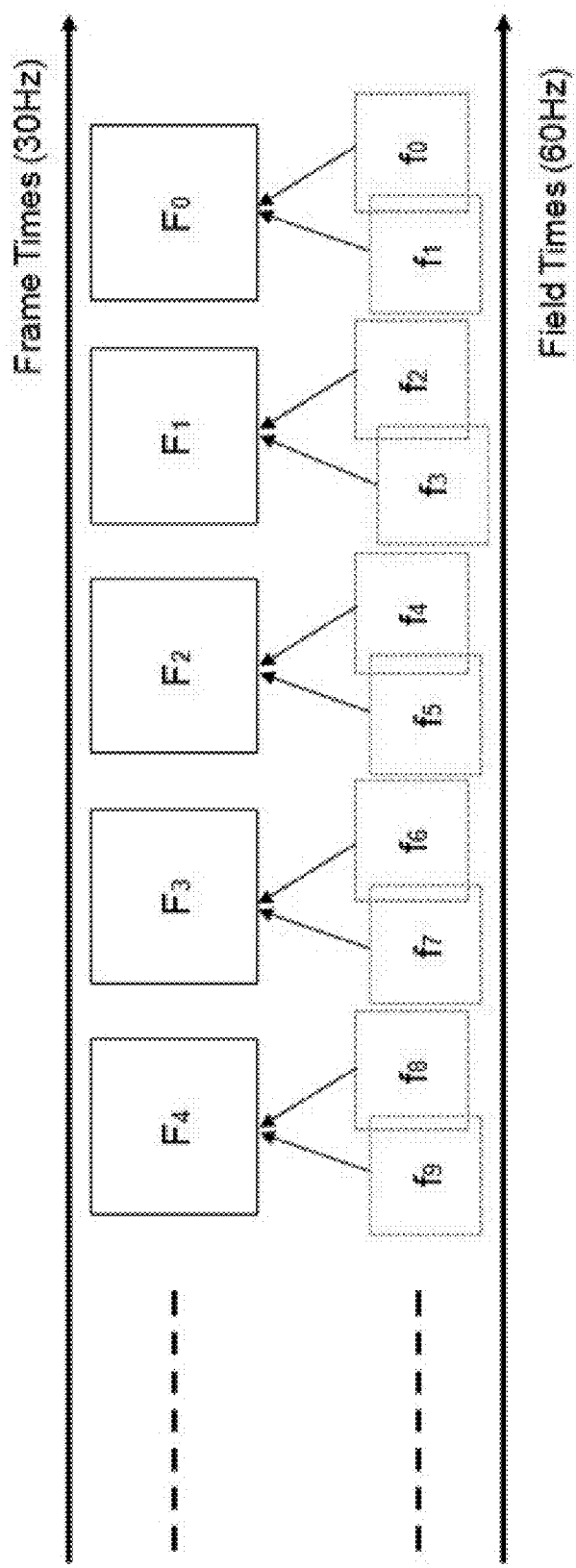
FIG. 2A shows an example of the interlaced frames.

De-interlacing is a process of converting interlaced video, such as analog television signals or 1080i format HDTV signals, into a non-interlaced form. An interlaced video frame consists of two fields taken in sequence, each sequentially scanned at odd then even lines of the image. In analog television, interlacing allowed for less transmission bandwidth and eliminated flicker that would be perceived at a similar frame rate using progressive scan. CRT-based analog displays correctly displayed interlaced video. Modern digital displays, however, comprise discrete pixels. Consequently, the two fields need to be combined into a single frame, which leads to various visual defects that the de-interlacing process attempts to minimize.

More specifically, both video and photographic films capture a series of frames (still images) in rapid succession. However, television systems read the captured image by serially scanning the image by lines (rows). In analog television, each frame is divided into two consecutive fields, one containing even lines and other containing odd lines. The fields are captured in succession at a rate twice that of the nominal frame rate. For example, PAL and SECAM systems have a rate of 25 frames/s (fps) or 50 fields/s while the NTSC system delivers 29.97 fps or 59.94 fields/s. The process of dividing frames into half-resolution fields at double the frame rate is called interlacing.

Since the interlaced signal contains the two fields of a video frame shot at two different times, the interlaced signal enhances viewer's motion perception and reduces flicker by taking advantage of the persistency of vision. This results in an effective doubling of time resolution as compared to non-interlaced footage (for frame rates equal to field rates). However, the interlaced signal requires a display that is natively capable of showing the individual fields in a sequential order, and only traditional CRT-based TV sets can display the interlaced signal.

Most modern displays such as LCD and plasma displays cannot operate in interlaced mode because they are fixed-resolution displays and only support progressive scanning. To display interlaced signal on such displays, the two interlaced fields need to be converted to one progressive frame by a process called de-interlacing. However, when the two fields taken at different points in time are combined to a full frame displayed at once, visual defects called interlace artifacts or combing occur with moving objects in the image. A good de-interlacing algorithm attempts to minimize the interlacing artifacts without sacrificing image quality, which is difficult to achieve consistently. Some de-interlacing techniques extrapolate the missing picture information but involve intelligent frame creation and require complex algorithms and substantial processing power.

De-interlacing requires the display to buffer one or more fields and recombine them into full frames. In theory this would be as simple as capturing one field and combining it with the next field to be received, producing a single frame. However, the originally recorded signal was produced as a series of fields, and any motion of the subjects during the short period between the fields is embedded into the display. When combined into a single frame, the slight differences between the two fields due to this motion results in a combing effect where alternate lines are slightly displaced from each other.

Various de-interlacing methods are used to de-interlace video, each producing different problems or artifacts. For example, field combination de-interlacers combine even and odd fields into one frame which is then displayed. Field extension de-interlacers extend each field (with only half the lines) to make a frame. Some de-interlacing systems buffer several fields and use techniques like edge detection to find motion between the fields, which is then used to interpolate the missing lines from the original field, reducing the combing effect.

In field combination de-interlacing, weaving of fields is performed by adding consecutive fields. Weaving works well when the image has not changed between the fields. However, any change between the fields can result in artifacts called combing when pixels in one frame do not line up with pixels in the other field, forming a jagged edge. Weaving retains full vertical resolution at the expense of half the temporal resolution (motion).

Blending of fields is performed by averaging consecutive fields to be displayed as one frame. Combing is avoided since the images are on top of each other. Blending, however, leaves an artifact called ghosting. The image loses vertical resolution and temporal resolution. Blending is often combined with a vertical resizing so that the output has no numerical loss in vertical resolution. There is, however, a quality loss because the image is downsized then upsized. This loss in detail makes the image look softer. Blending also loses half the temporal resolution since two motion fields are combined into one frame.

Selective blending, or smart blending or motion adaptive blending, is a combination of weaving and blending. Since areas that have not changed from frame to frame do not need any processing, the frames are woven, and only the areas that need blending are blended. Selective blending retains full vertical resolution and half the temporal resolution, and has fewer artifacts than weaving or blending due to the selective combination of both techniques.

In field extension de-interlacing, a half-seizing process displays each interlaced field on its own but suffers from false aspect ratio. A line doubling process doubles the lines of each interlaced field (consisting of only even or odd lines) to fill an entire frame. The line doubling process results in a video having a frame rate identical to the field rate. But each frame has half the vertical resolution or resolution equal to that of each field that the frame was made from. Line doubling prevents combing artifacts but causes a noticeable reduction in picture quality since each frame displayed is doubled and only at the original half field resolution. This is noticeable mostly on stationary objects since they appear to bob up and down. These techniques are therefore also called bob de-interlacing and linear de-interlacing. Line doubling retains horizontal and temporal resolution at the expense of vertical resolution and bobbing artifacts on stationary and slower moving objects. A variant of line doubling method discards one field out of each frame, halving temporal resolution. Picture quality can be improved by combining field combination methods (weaving and blending) and frame extension methods (bob or line doubling) to create a high quality progressive video sequence.

The present disclosure relates to motion adaptive de-interlacing (MADI) using frame-based input and output instead of using field-based input and output. The MADI according to the present disclosure results in improved bandwidth and line memory savings. The MADI according to the present disclosure also improves motion detection, angle detection, joint vertical and temporal filtering, and global image feature analyzer and adaptation. The MADI according to the present disclosure also provides improved noise reduction and cross-color suppression.

The present disclosure also relates to advanced film mode detection (AFD). The AFD includes video detection and processing techniques that convert a film or graphic content from a traditional interlaced format to progressive format. Traditional detection and processing techniques use motion detection between two consecutive fields or frames. Then a high/low motion pattern called cadence is used to validate the conversion. The motion detection, however, is unreliable due to field interlacing and noise, which adversely impact quality. The AFD according to the present disclosure utilizes motion estimation between two fields, which is noise resistant and therefore generates better results than the traditional techniques. In addition to detecting 3:2 or 2:2 pulldown, the AFD according to the present disclosure can also detect any other cadence. Further, the AFD according to the present disclosure provides scrolling text handling, moving logo handling, multi-window mixed content handling, mixed frame interlaced and progressive format breakdown, and so on.

In general, the motion adaptive de-interlacing (MADI) detects motion between fields of interlaced frames using frame-based processing, de-interlaces the interlaced frames based on the detected motion, and generates de-interlaced frames. The advanced film mode detection (AFD) detects motion between fields of the interlaced frames using field-based processing, detects a film mode of the interlaced frames based on the detected motion, de-interlaces the interlaced frames based on the detected motion and the detected film mode, and generates de-interlaced frames. Additionally, the AFD generates a control signal based on the detected motion and the detected film mode that is used to blend the de-interlaced frames output by the MADI and the AFD to generate final de-interlaced frames for rendering on a non-interlaced display.

In some implementations, the de-interlaced frames output by the motion adaptive de-interlacing (MADI) or the advanced film mode detection (AFD) can be independently rendered on a non-interlaced display without the blending. That is, in some implementations, the MADI can be used without the AFD, and the AFD can be used without the MADI. These and other aspects of the MADI and the AFD are described below in detail. The present disclosure is organized as follows. The motion adaptive de-interlacing (MADI) is described with references to FIGS. 1-40. The advanced film mode detection (AFD) is described with references to FIGS. 41-57.

FIG. 1 shows a system 100 for de-interlacing interlaced frames of video data according to the present disclosure. The system 100 includes a memory 102, a line buffer 104, a motion adaptive de-interlacer (MADI) 106, an advanced film mode detector (AFD) 108, and a blender 110. The memory 102 may include a DRAM. The memory 102 is connected to the line buffer 104. The line buffer 104 can be FIFO and may include SRAM. The line buffer 104 is connected to each of the MADI 106 and the AFD 108. The MADI 106 and the AFD 108 are connected to the blender 110. The blender 110 is connected to the memory 102. One or more of the MADI 106, the AFD 108, and the blender 110; and one or more components of the MADI 106, the AFD 108, and the blender 110 can be implemented as one or more modules.

The memory 102 receives interlaced video frames. For example, the interlaced video frames may have a 420 format, which includes 4 Y (luminance or luma (i.e., brightness)) components and one each of U and V (chrominance or chroma) components for every 4 pixels. Other examples of formats may include but are not limited to Din422 and Din444 formats. Throughout the present disclosure, an uppercase F denotes a frame, and a lowercase f denotes a field unless noted otherwise.

The line buffer 104 stores two consecutive interlaced frames F0 and F1 received from the memory 102. Each of the MADI 106 and the AFD 108 receives the interlaced frames denoted as Fin0 and Fin1 from the line buffer 104. The MADI 106 de-interlaces the interlaced frames Fin0 and Fin1 and generates a first de-interlaced or interpolated output frame Fout0 (also called first output). The AFD 108 de-interlaces the interlaced frames Fin0 and Fin1 and generates a second de-interlaced or interpolated output frame Fout1 (also called second output). The AFD 108 also generates a control signal that is output to the blender 110. The blender 110 blends the first output Fout0 of the MADI 106 and the second output Fout1 of the AFD 108 according to the control signal and generates a final de-interlaced output frame Fout, which is merged with an interlaced frame Fin stored in the memory 1024 to generate two progressive frames for subsequent rendering on a non-interlaced display. The operations of the MADI 106 and the AFD 108 are described in further detail below.

FIG. 2A shows an example of the interlaced frames. For example only, fields f0 and f1 can be combined or jammed using Weave's method to generate an interlaced frame F0; fields f2 and f3 can be combined or jammed using Weave's method to generate an interlaced frame F1; and so on. Jamming means combining top and bottom fields to form a progressive frame. Weave's method is a method of de-interlacing by putting top field on the even line and bottom field on the odd line in a full frame.

Figure 2B:
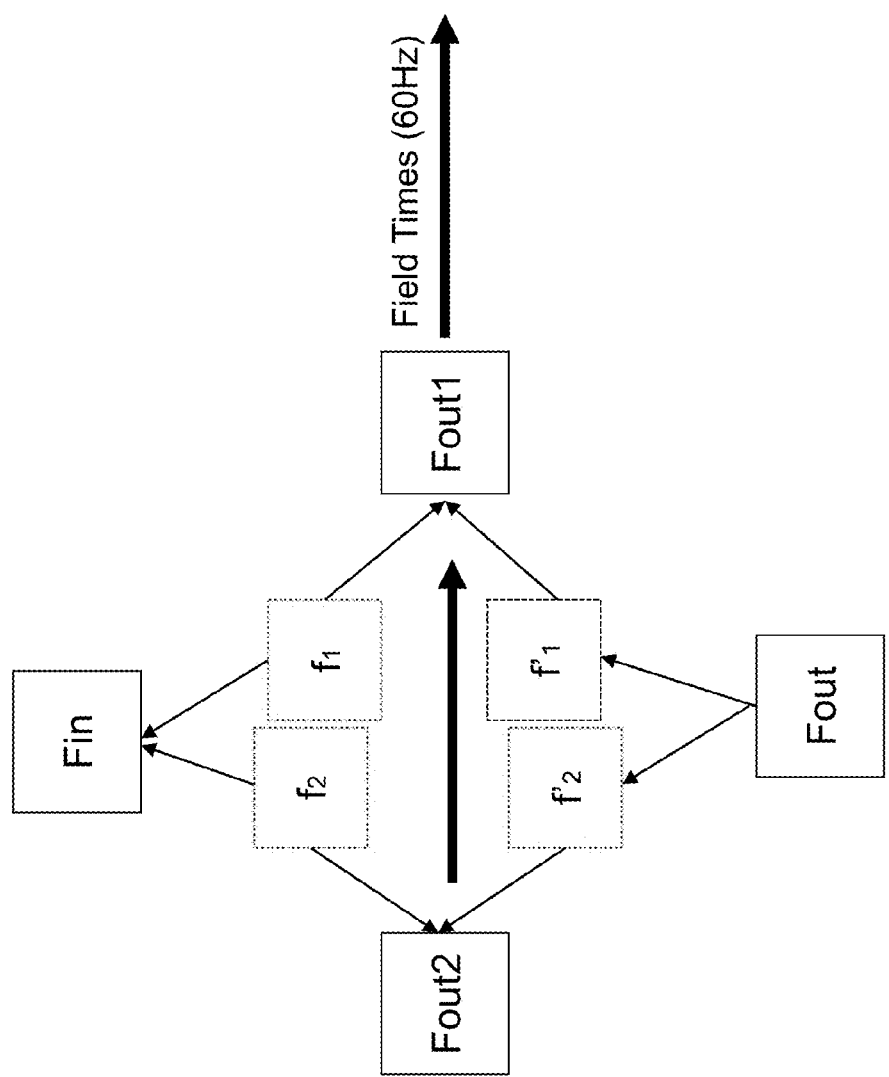
FIG. 2B shows an example of a final de-interlaced output frame merged with an interlaced frame to generate two progressive frames.

FIG. 2B shows an example of a final de-interlaced output frame Fout merged with an interlaced frame Fin to generate two progressive frames. In FIG. 2B, f2 and f1 are interlaced or original top and bottom fields, respectively. f'2 and f'1 are de-interlaced or interpolated bottom and top fields, respectively. Fin and Fout are interlaced and de-interlaced frames, respectively. Fout1 and Fout2 are merged to form progressive frame 1 and 2 including both interlaced and de-interlaced frames.

Figure 3:
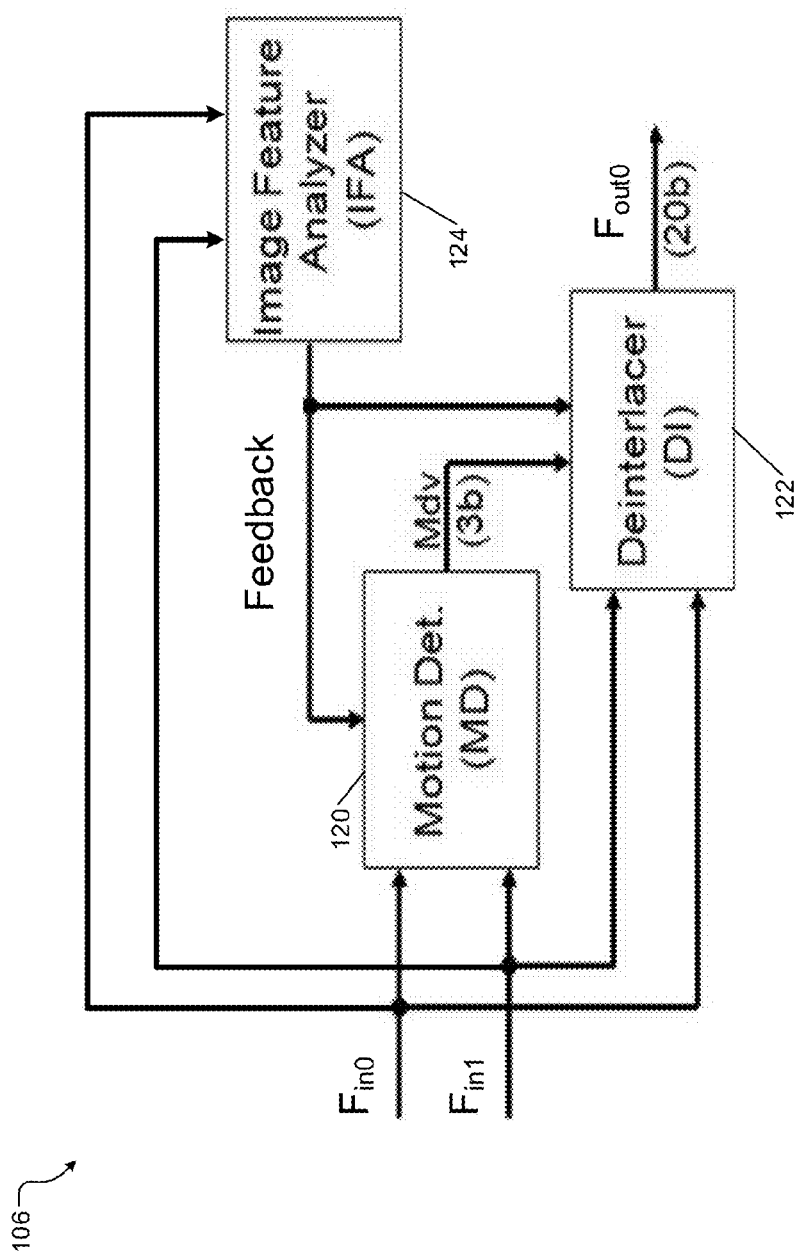
FIG. 3 is a functional block diagram of a motion adaptive de-interlacer (MADI) used in the de-interlacing system of FIG. 1.

FIG. 3 shows the motion adaptive de-interlacer (MADI) 106 in further detail. The MADI 106 includes a motion detector 120, a de-interlacer 122, and an image feature analyzer (IFA) 124. Each of the motion detector 120, the de-interlacer 122, and the IFA 124 is connected to the line buffer 104. The motion detector 120 is connected to the de-interlacer 122 and the IFA 124. The IFA 124 is connected to each of the motion detector 120 and the de-interlacer 122.

The motion detector 120 receives the interlaced frames Fin0 and Fin1 from the line buffer 104. The motion detector 120 processes the interlaced frames Fin0 and Fin1 and generates a first motion value (Mdv) (also called first motion indicator). The de-interlacer 122 receives the interlaced frames Fin0 and Fin1 from the line buffer 104. The de-interlacer 122 de-interlaces the interlaced frames Fin0 and Fin1 based on the first motion value (Mdv). The de-interlacer 122 generates the first output Fout0 including de-interlaced frames. The IFA 124 receives the interlaced frames Fin0 and Fin1 from the line buffer 104. The IFA 124 analyzes the content of each of the interlaced frames Fin0 and Fin1 and generates various indicators that are used to control operations of the motion detector 120 and the de-interlacer 122. The operations of the motion detector 120, the de-interlacer 122, and the image feature analyzer (IFA) 124 are described in further detail below.

Figure 4:
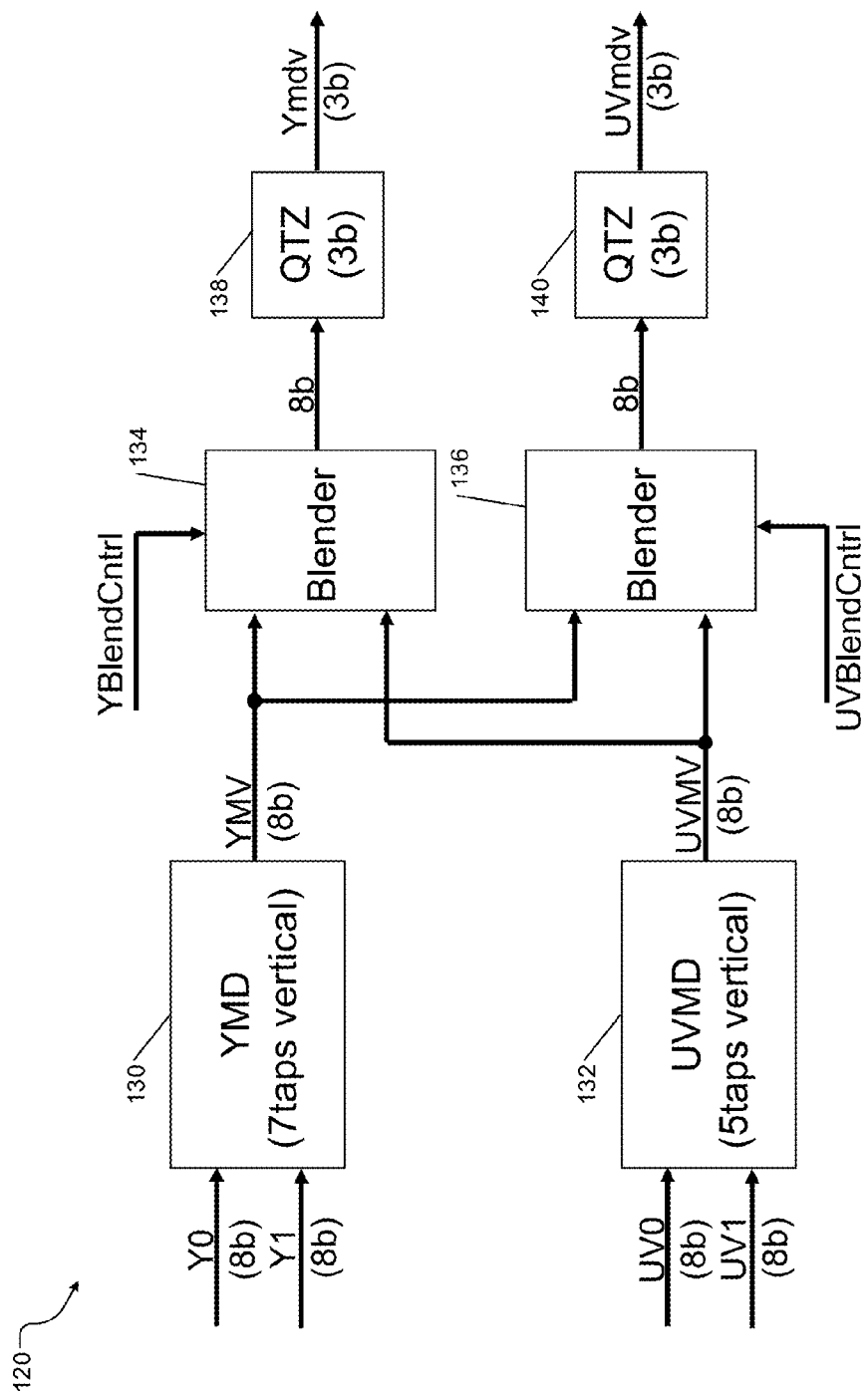
FIG. 4 is a functional block diagram of a motion detector used in the motion adaptive de-interlacer (MADI) of FIG. 3.

FIG. 4 shows an example of the motion detector 120 in further detail. For example, the motion detector 120 includes a Y channel motion detector 130, a UV channel motion detector 132, a first blender 134, a second blender 136, a first quantizer 138, and a second quantizer 140. The Y channel motion detector 130 is connected to the first blender 134 and the second blender 136. The UV channel motion detector 132 is also connected to the first blender 134 and the second blender 136. The first blender 134 and the second blender 136 are respectively connected to the first quantizer 138 and the second quantizer 140.

The Y channel motion detector 130 is connected to the line buffer 104. The Y channel motion detector 130 receives Y channel components Y0 and Y1 of the interlaced frames Fin0 and Fin1 from the line buffer 104. The Y channel motion detector 130 detects motion between pixels of the Y channel components Y0 and Y1 and generates a Y raw motion value (YRmdv). The UV channel motion detector 132 is connected to the line buffer 104. The UV channel motion detector 132 receives UV channel components UV0 and UV1 of the interlaced frames Fin0 and Fin1 from the line buffer 104. The UV channel motion detector 132 detects motion between pixels of the UV channel components UV0 and UV1 and generates a UV raw motion value (UVRmdv). Note that F0=(Y0, UV0) and F1=(Y1, UV1) in the 420 format.

Each of the first blender 134 and the second blender 136 receives the Y motion vector (YMV) and the UV motion vector (UVMV). The first blender 134 and the second blender 136 respectively receive a Y channel blending control signal and a UV channel blending control signal. The first blender 134 blends the Y motion vector (YMV) and the UV motion vector (UVMV) based on the Y channel blending control signal and generates a first output. The second blender 136 blends the Y motion vector (YMV) and the UV motion vector (UVMV) based on the UV channel blending control signal and generates a second output.

The first and second quantizers 138, 140 respectively quantize the first and second outputs of the first and second blenders 134, 136 and generate the first motion indicator of the motion detector 120. Accordingly, the first motion indicator of the motion detector 120 includes quantize values Ymdv and UVmdv of the blended Y and UV motion vectors respectively generated by the Y and UV channel motion detectors 130, 132. The Y channel motion detector 130 is described below in further detail with references to FIGS. 5-18. The UV channel motion detector 132 is described below in further detail with reference to FIG. 19.

Figure 5:
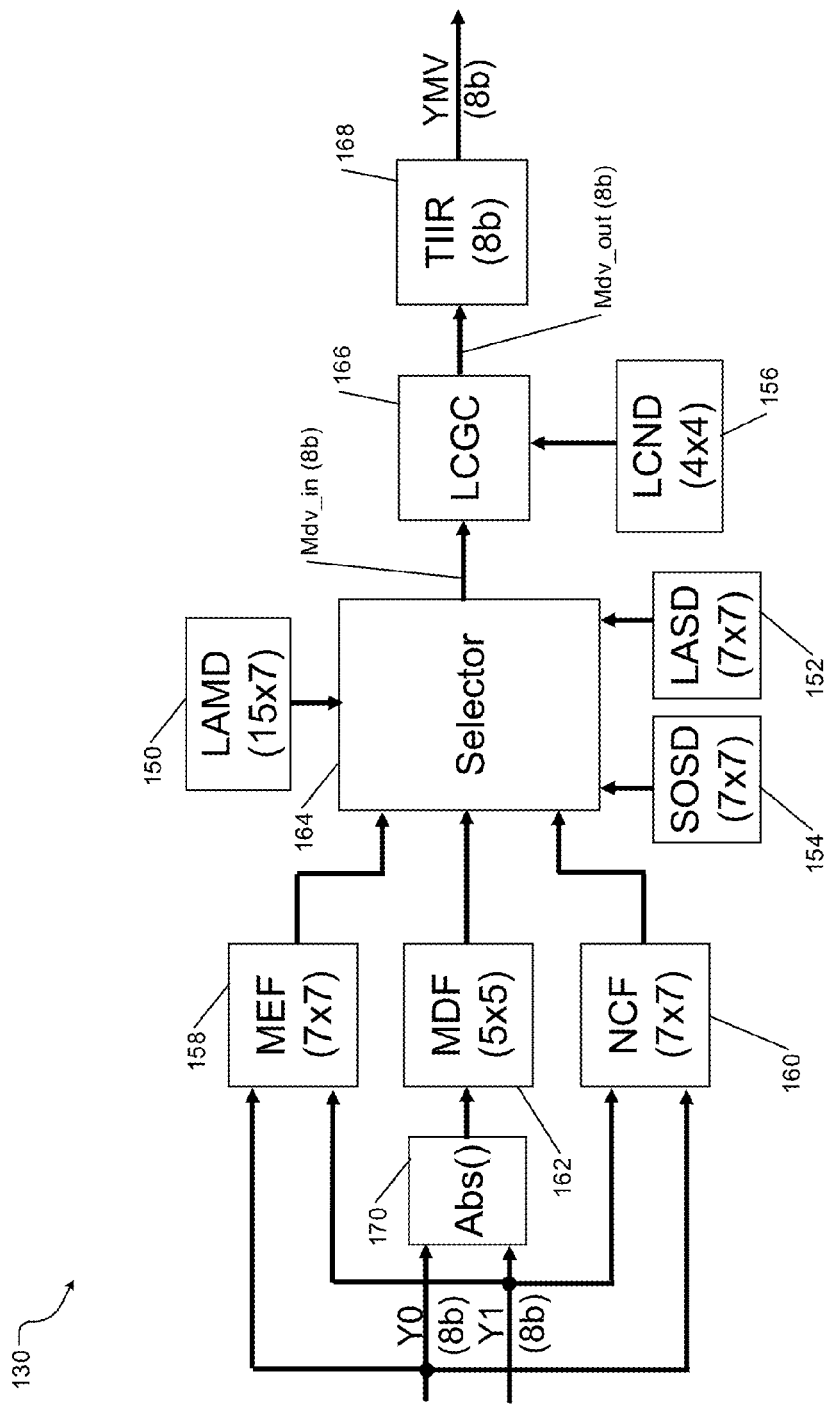
FIG. 5 is a functional block diagram of a Y channel motion detector used in the motion detector of FIG. 4.

FIG. 5 shows an example of the Y channel motion detector 130. For example, the Y channel motion detector includes a plurality of detectors and filters. For example, the plurality of detectors include a large area motion detector (LAMD) 150, a large area static detector (LASD) 152, a static on-screen display detector (SOSD) 154, and a low contrast detector (LCND) 156. For example, the plurality of filters include a motion enhanced filter (MEF) (or a first filter) 158, a noise cancellation filter (NCF) (or a second filter) 160, and a motion detector filter (MDF) 162. A selector 164 selects one of the filters based on information received from the plurality of detectors. A low contrast gain controller (LCGC) 166 adjusts an output of the selector 164 based on an output of the low contrast detector (LCND) 156. An optional temporal IIR (TIIR) filter 168 filters the output of the low contrast gain controller (LCGC) 166 to generate the Y motion vector (YMV) of the Y channel motion detector 130.

In the Y channel motion detector 130, each of the plurality of detectors, the motion enhanced filter (MEF) (or the first filter) 158, and the noise cancellation filter (NCF) (or the second filter) 160 is connected to the line buffer 104 and receives the Y channel components Y0 and Y1 from the line buffer 104. The motion detector filter (MDF) 162 is connected to the line buffer through an absolute value generator 170. The absolute value generator 170 is connected to the line buffer 104 and receives the Y channel components Y0 and Y1 from the line buffer 104. The large area motion detector (LAMD) 150, the large area static detector (LASD) 152, the static on-screen display detector (SOSD) 154, the motion enhanced filter (MEF) (or the first filter) 158, the noise cancellation filter (NCF) (or the second filter) 160, and the motion detector filter (MDF) 162 are connected to the selector 164. The low contrast gain controller (LCGC) 166 is connected to the selector 164. The low contrast detector (LCND) 156 is connected to the low contrast gain controller (LCGC) 166. The optional temporal IIR (TIIR) filter 168 is connected to the low contrast gain controller (LCGC) 166. The plurality of detectors and filters are described below in detail with references to FIGS. 6A-18.

The Y channel motion detector 130 includes a number parallel processing detectors and filters. Based on the motion information related to each pixel and its neighbors, the Y channel motion detector 130 selects the best filter to use. The filtering process used by the Y channel motion detector 130 is called adaptive filtering. The motion related to each pixel will fall into the following categories.

When many pixels centered at the reference are in motion mode, this is normally called "Large Area Motion" and the detection logic is called "Large Area Motion Detector" or LAMD 150. When many pixels centered at the reference are in static mode, this is normally called the "Large Area Static" and the detection logic is called "Large Area Static Detector" or LASD 152. When many pixels centered at the reference are in static and high-contrast mode, this is normally the case of static on-screen display OSD, and the detection logic is called "Static OSD Detector" or SOSD 154. When many pixels centered at the reference have similar contrast level, this is normally the case of low texture objects or flat regions in a frame, and the detection logic is called "Low Contrast/Texture Detector" or LCND 156.

The filtering associated with each detection method mentioned above can be summarized as follows. If an LAMD flag is set by the LAMD 150, then the "Motion Enhanced Filter" or MEF 158 is applied. If an LASD flag is set by the LASD 152, then the "Noise Cancellation Filter" or NCF 160 is applied. If a SOSD flag is set by the SOSD 154, then the "Noise Cancellation Filter" or NCF 160 is applied. If an LCND flag is set by the LCND 156, then a motion detection gain control is applied by the LCGC 166. If multiple flags are set, then a pre-defined priority logic is used, which is discussed below in detail in the description of the selector 164 with reference to FIG. 18.

Figures 6A, 6B:
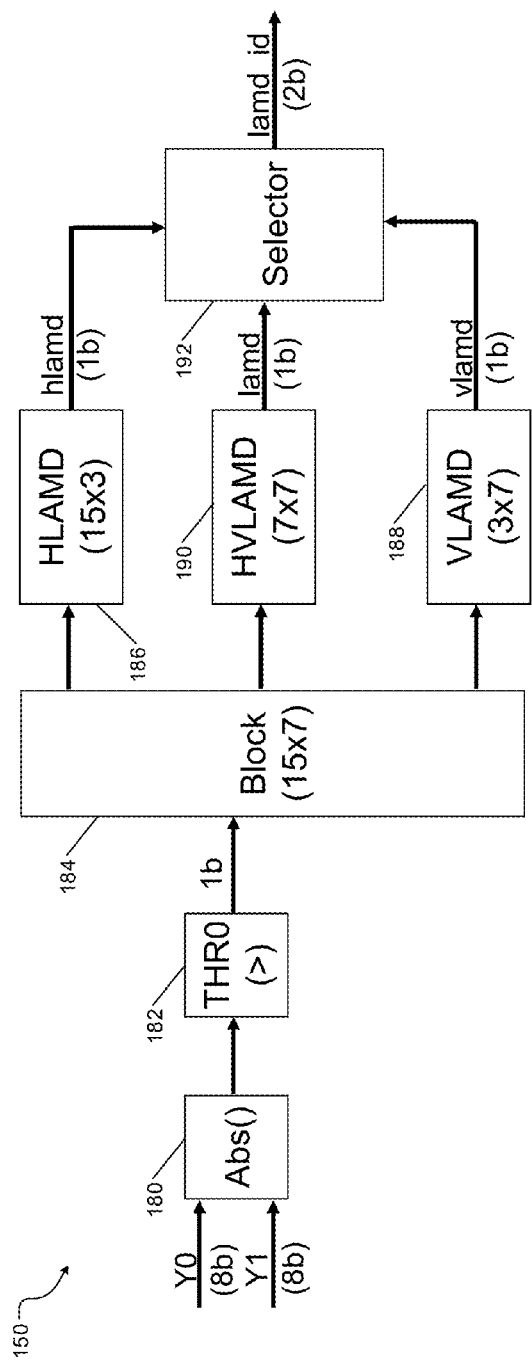
FIGS. 6A and 6B respectively show a functional block diagram of a large area motion detector (LAMD) used in the Y channel motion detector of FIG. 5 and the logic for the large area motion detector (LAMD).

FIGS. 6A and 6B show an example of the large area motion detector (LAMD) 150. In FIG. 6A, the LAMD 150 includes an absolute value generator 180, a threshold comparator 182, a buffer 184, a horizontal large area motion detector (HLAMD) 186, a vertical large area motion detector (VLAMD) 188, a horizontal and vertical large area motion detector (HVLAMD) 190, and a selector 192. The absolute value generator 180 is connected to the threshold comparator 182. The threshold comparator 182 is connected to the buffer 184. The buffer 184 is connected to each of the HLAMD 186, VLAMD 188, and HVLAMD 190. The HLAMD 186, VLAMD 188, and HVLAMD 190 are connected to the selector 192.

The absolute value generator 180 is connected to the line buffer 104, receives the Y channel components Y0 and Y1 from the line buffer 104, and generates an absolute motion value for each pixel of a large area (e.g., 15×7:H×V) of the Y channel components Y0 and Y1. Throughout the present disclosure, M×N denotes an array of horizontal pixels M by vertical pixels N, where M and N are integers greater than or equal to 1. The threshold comparator 182 compares the absolute motion value to a threshold and generates an output indicating whether the absolute motion value is greater than or equal to the threshold. The buffer 184 stores the output for every pixel. The output is in the form of a one bit flag indicating whether the pixel is in motion or static. The locations of the flags in the buffer 184 indicate whether the motion is large and the horizontal, vertical, both horizontal and vertical directions. These determinations and corresponding indications are made respectively by the HLAMD 186, VLAMD 188, and HVLAMD 190.

FIG. 6B shows the selection logic used by the selector 192. The first priority is user defined which comes from system program based on global motion detection. The second priority is for the two-dimensional or HVLAMD 190. The third priority is for VLAMD 188. The last priority is for HLAMD 186. The selector 192 selects an output of one of the HLAMD 186, VLAMD 188, and HVLAMD 190 as a first motion information according to the priority-based selection logic. The first motion information is output to the selector 164 of the Y channel motion detector 130 shown in FIG. 5.

Figure 7:
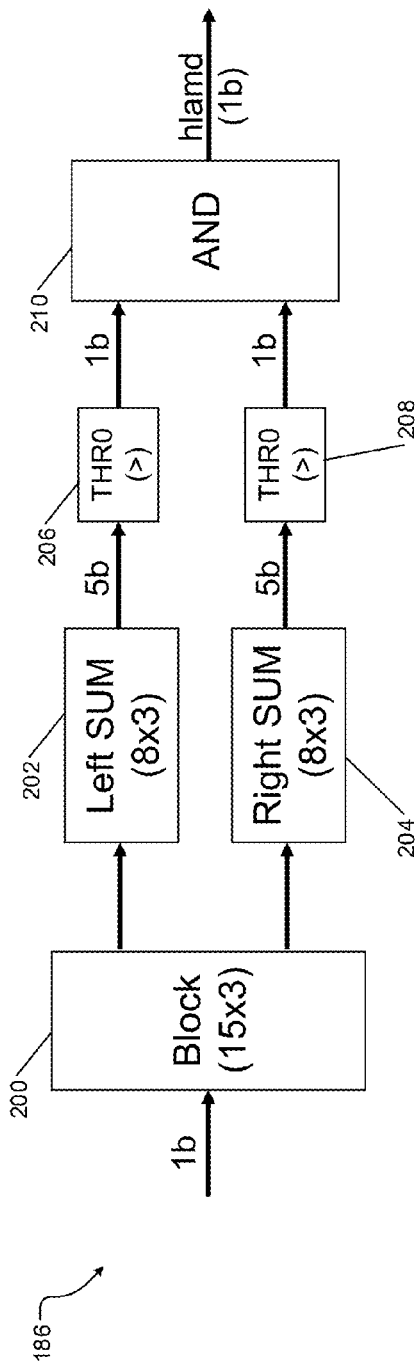
FIG. 7 is a functional block diagram of a horizontal large area motion detector (HLAMD) used in the large area motion detector (LAMD) of FIG. 6A.

FIG. 7 shows an example of the horizontal large area motion detector (HLAMD) 186. The HLAMD 186 includes a buffer 200, first and second adders 202 and 204, first and second threshold comparators 206 and 208, and an AND gate 210. The buffer 200 is connected to each of the first and second adders 202 and 204. The first and second adders 202 and 204 are respectively connected to the first and second threshold comparators 206 and 208. The first and second threshold comparators 206 and 208 are connected to the AND gate 210.

The buffer 200 receives the one bit flags for pixels in a 15×3 area. The pixels in the 15×3 area are split into left 8×3 and right 8×3 windows of pixels from a center pixel location (e.g., a seventh pixel location). The first and second adders 202 and 204 respectively add the flags (motion information) of the pixels in the left and right windows. The first and second threshold comparators 206 and 208 respectively compare the outputs of the first and second adders 202 and 204 to a threshold. The first and second threshold comparators 206 and 208 respectively generate outputs indicating whether the outputs of the first and second adders 202 and 204 are greater than or equal to the threshold. The AND gate 210 generates an output (e.g., a horizontal motion value) hlamd based on the outputs of the first and second threshold comparators 206 and 208. The horizontal motion value hlamd is output to the selector 192 shown in FIG. 6A. The HLAMD 186 detects objects moving in horizontal motion (e.g., horizontal scrolling text) and indicates the motion detected in the horizontal direction by the horizontal motion value hlamd.

Figure 8:
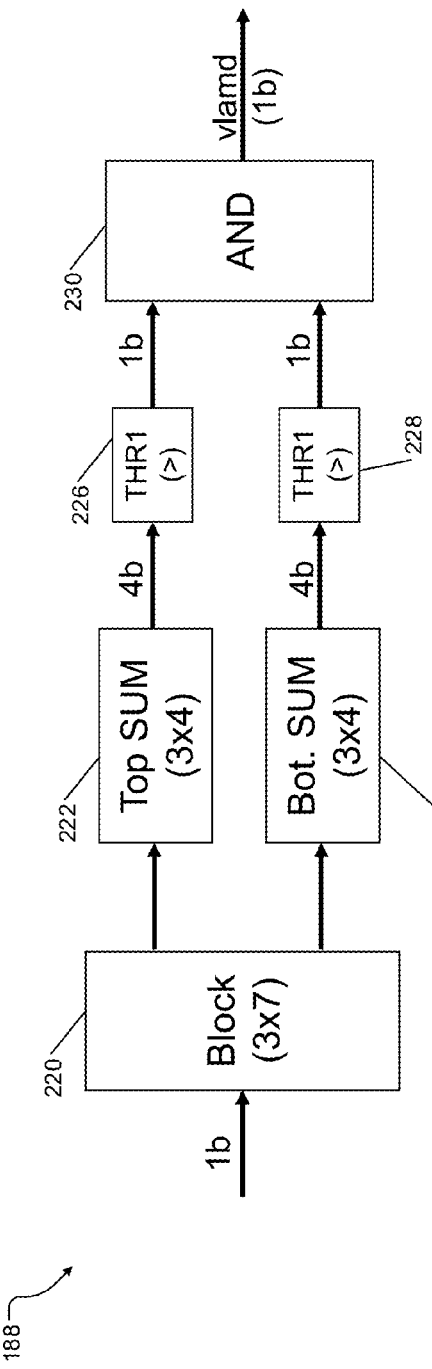
FIG. 8 is a functional block diagram of a vertical large area motion detector (VLAMD) used in the large area motion detector (LAMD) of FIG. 6A.

FIG. 8 shows an example of the vertical large area motion detector (VLAMD) 188. The VLAMD 188 includes a buffer 220, first and second adders 222 and 224, first and second threshold comparators 226 and 228, and an AND gate 230. The buffer 220 is connected to each of the first and second adders 222 and 224. The first and second adders 222 and 224 are respectively connected to the first and second threshold comparators 226 and 228. The first and second threshold comparators 226 and 228 are connected to the AND gate 230.

The buffer 220 receives the one bit flags for pixels in a 3×7 area. The pixels in the 3×7 area are split into top 3×4 and bottom 3×4 windows of pixels from a center pixel location (e.g., a fourth pixel location). The first and second adders 222 and 224 respectively add the flags (motion information) of the pixels in the top and bottom windows. The first and second threshold comparators 226 and 228 respectively compare the outputs of the first and second adders 222 and 224 to a threshold. The first and second threshold comparators 226 and 228 respectively generate outputs indicating whether the outputs of the first and second adders 222 and 224 are greater than or equal to the threshold. The AND gate 230 generates an output (e.g., a vertical motion value) vlamd based on the outputs of the first and second threshold comparators 226 and 228. The vertical motion value vlamd is output to the selector 192 shown in FIG. 6A. The VLAMD 188 detects objects moving in vertical motion and indicates the motion detected in the vertical direction by the vertical motion value vlamd.

Figure 9:
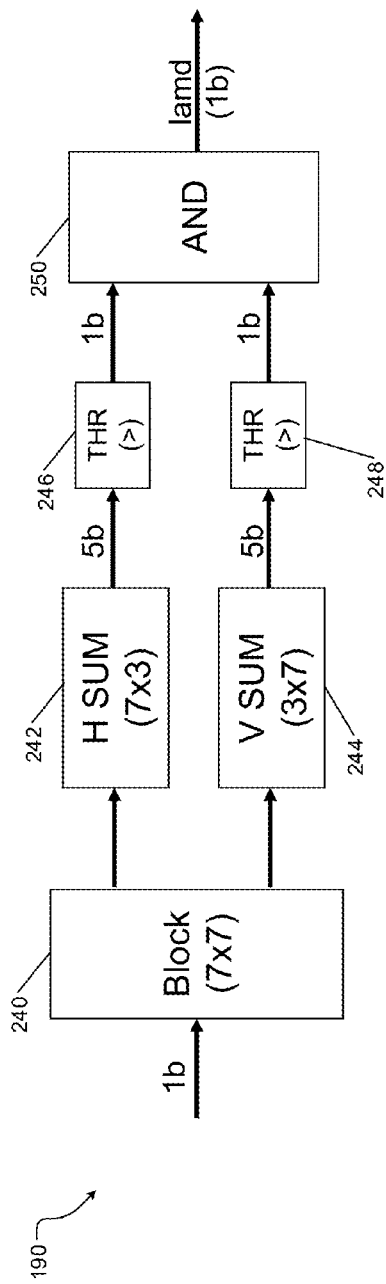
FIG. 9 is a functional block diagram of a horizontal-vertical large area motion detector (HVLAMD) used in the large area motion detector (LAMD) of FIG. 6A.

FIG. 9 shows an example of the horizontal and vertical large area motion detector (HVLAMD) 190. The HVLAMD 190 includes a buffer 240, first and second adders 242 and 244, first and second threshold comparators 246 and 248, and an AND gate 250. The buffer 240 is connected to each of the first and second adders 242 and 244. The first and second adders 242 and 244 are respectively connected to the first and second threshold comparators 246 and 248. The first and second threshold comparators 246 and 248 are connected to the AND gate 250.

The buffer 240 receives the one bit flags for pixels in a 7×7 area. The pixels in the 7×7 area are split into horizontal 7×3 and vertical 3×7 windows of pixels. The first and second adders 242 and 244 respectively add the flags (motion information) of the pixels in the horizontal and vertical windows. The first and second threshold comparators 246 and 248 respectively compare the outputs of the first and second adders 242 and 244 to a threshold. The first and second threshold comparators 246 and 248 respectively generate outputs indicating whether the outputs of the first and second adders 242 and 244 are greater than or equal to the threshold. The AND gate 250 generates an output (e.g., a two dimensional motion value) lamd based on the outputs of the first and second threshold comparators 246 and 248. The two dimensional motion value lamd is output to the selector 192 shown in FIG. 6A. The HVLAMD 190 detects objects moving in both horizontal and vertical directions and indicates the motion detected in the horizontal and vertical directions by the two dimensional motion value vlamd.

Figures 10A, 10B:
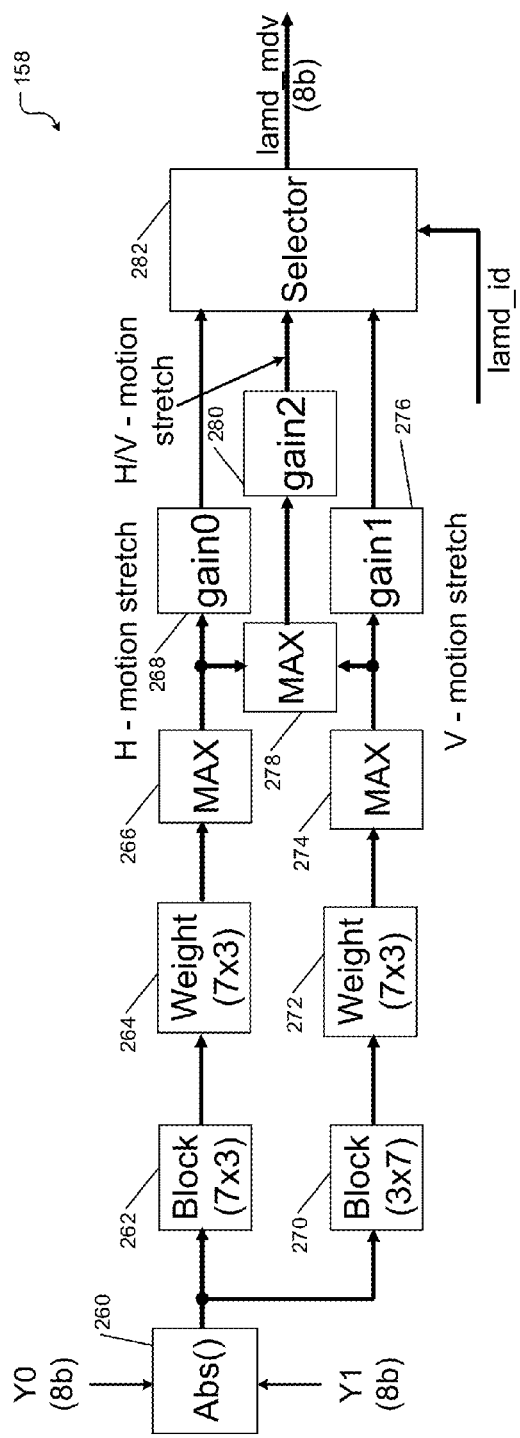
FIG. 10A is a functional block diagram of a motion enhanced filter (MEF) used in the Y channel motion detector of FIG. 5.
FIG. 10B shows the logic for the motion enhanced filter (MEF) of FIG. 10A.

FIGS. 10A and 10B show an example of the motion enhanced filter (MEF) (or the first filter) 158. The selector 164 shown in FIG. 6A selects the MEF 158 when any of the LAMD flags (outputs of any of the HLAMD 186, VLAMD 188, and HVLAMD 190) are set (i.e., when any of hlamd, vlamd, and lamd indicate detected motion).

The MEF 158 is a stretch filter that takes a maximum motion value from motion values of all pixels, and depending on the dimension and direction indicated by the LAMD flags (hlamd, vlamd, and lamd), the MEF 158 may stretch the motion value in horizontal, vertical, or both horizontal and vertical directions. The MEF 158 includes an absolute value generator 260, a first buffer 262, a first weighting module 264, a first maxima detector 266, a first gain module 268, a second buffer 270, a second weighting module 272, a second maxima detector 274, a second gain module 276, a third maxima detector 278, a third gain module 280, and a selector 282.

The absolute value generator 260 is connected to each of the first and second buffers 262 and 270. The first buffer 262 is connected to the first weighting module 264. The first weighting module 264 is connected to the first maxima detector 266. The first maxima detector 266 is connected to the first gain module 268. The first gain module 268 is connected to the selector 282. The second buffer 270 is connected to the second weighting module 272. The second weighting module 272 is connected to the second maxima detector 274. The second maxima detector 274 is connected to the second gain module 276. The second gain module 276 is connected to the selector 282. The first and second maxima detectors are also connected to the third maxima detector 278. The third maxima detector 278 is connected to the third gain module 280. The third gain module 280 is connected to the selector 282.

The absolute value generator 260 is connected to the line buffer 104, receives the Y channel components Y0 and Y1 from the line buffer 104, and generates an absolute motion value for each pixel in an area (e.g., 7×7) of the Y channel components Y0 and Y1. The first buffer 262 buffers the motion values in the horizontal direction. The first weighting module 264 applies weights to the motion values. The first maxima detector 266 detects a first maxima from the weighted motion values. The first gain module 268 applies a first gain (gain0) to the first maxima. Accordingly, the maximum motion value in the horizontal direction is stretched and is output to the selector 282. The second buffer 270 buffers the motion values in the vertical direction. The second weighting module 272 applies weights to the motion values. The second maxima detector 274 detects a second maxima from the weighted motion values. The second gain module 276 applies a second gain (gain1) to the second maxima. Accordingly, the maximum motion value in the vertical direction is stretched and is output to the selector 282.

The third maxima detector 278 detects a third maxima from the first and second maxima detected by the first and second maxima detectors 266 and 274. The third gain module 280 applies a third gain (gain2) to the third maxima. Accordingly, the maximum motion value in both the horizontal and vertical directions is stretched and is output to the selector 282.

FIG. 10B shows the selection logic used by the selector 282 to select between the outputs of the first, second, and third gain modules 268, 276, 280. The length of motion stretch for horizontal and vertical direction is programmable. The gain for each direction is independent. Examples of the weighting coefficients include {0.5, 0.5, 0.5, 0.5, 0.5, 0.5, 0.5, 1.0, 1.0, 1.0, 1.0, 1.0, 1.0, 1.0, 0.5, 0.5, 0.5, 0.5, 0.5, 0.5, 0.5}.

Figure 11:
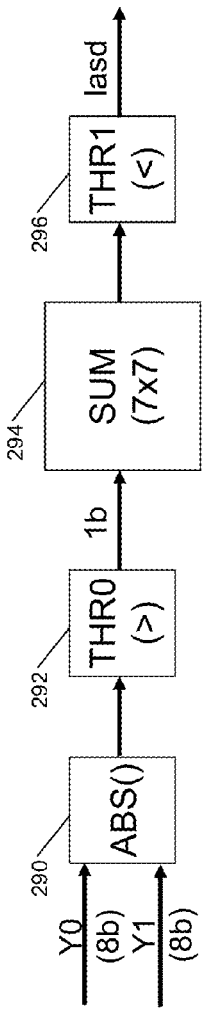
FIG. 11 is a functional block diagram of a large area static detector (LASD) used in the Y channel motion detector of FIG. 5.

FIG. 11 shows an example of the large area static detector (LASD) 152. The LASD 152 includes an absolute value generator 290, a first threshold comparator 292, a summing module 294, and a second threshold comparator 296. The absolute value generator 290 is connected to the first threshold comparator 292. The first threshold comparator 292 is connected to the summing module 294. The summing module 294 is connected to the second threshold comparator 296.

The LASD 152 uses similar motion detection logics as the LAMD 150, but the LASD 152 performs the opposite function of the LAMD 150. Instead of measuring the number of motion pixels, the LASD 152 measures the number of static pixels. The absolute motion value at each pixel is calculated and then compared with a first threshold THR0 (motion threshold) to generate a single bit motion pixel. The motion pixels are summed together and compared with a second threshold THR1 (count threshold) to generate a second motion information (lard) indicating whether the LASD 152 detected static pixels in a large area of a frame.

The absolute value generator 260 is connected to the line buffer 104, receives the Y channel components Y0 and Y1 from the line buffer 104, and generates an absolute motion value for each pixel in an area (e.g., 7×7) of the Y channel components Y0 and Y1. The first threshold comparator 292 compares the absolute motion values to a first threshold. The summing module 294 adds the number of pixels for which the absolute motion values that are greater than or equal to the first threshold. The second threshold comparator 296 compares the sum to a second threshold and generates the lasd output indicating whether the sum is less than or equal to the second threshold. Accordingly, if the total number of pixels for which the absolute motion values that are greater than or equal to the first threshold is less than or equal to the second threshold, the LASD 152 outputs lasd indicating that the LASD 152 detected static pixels instead of detecting motion in a large area of a frame.

Figure 12A:
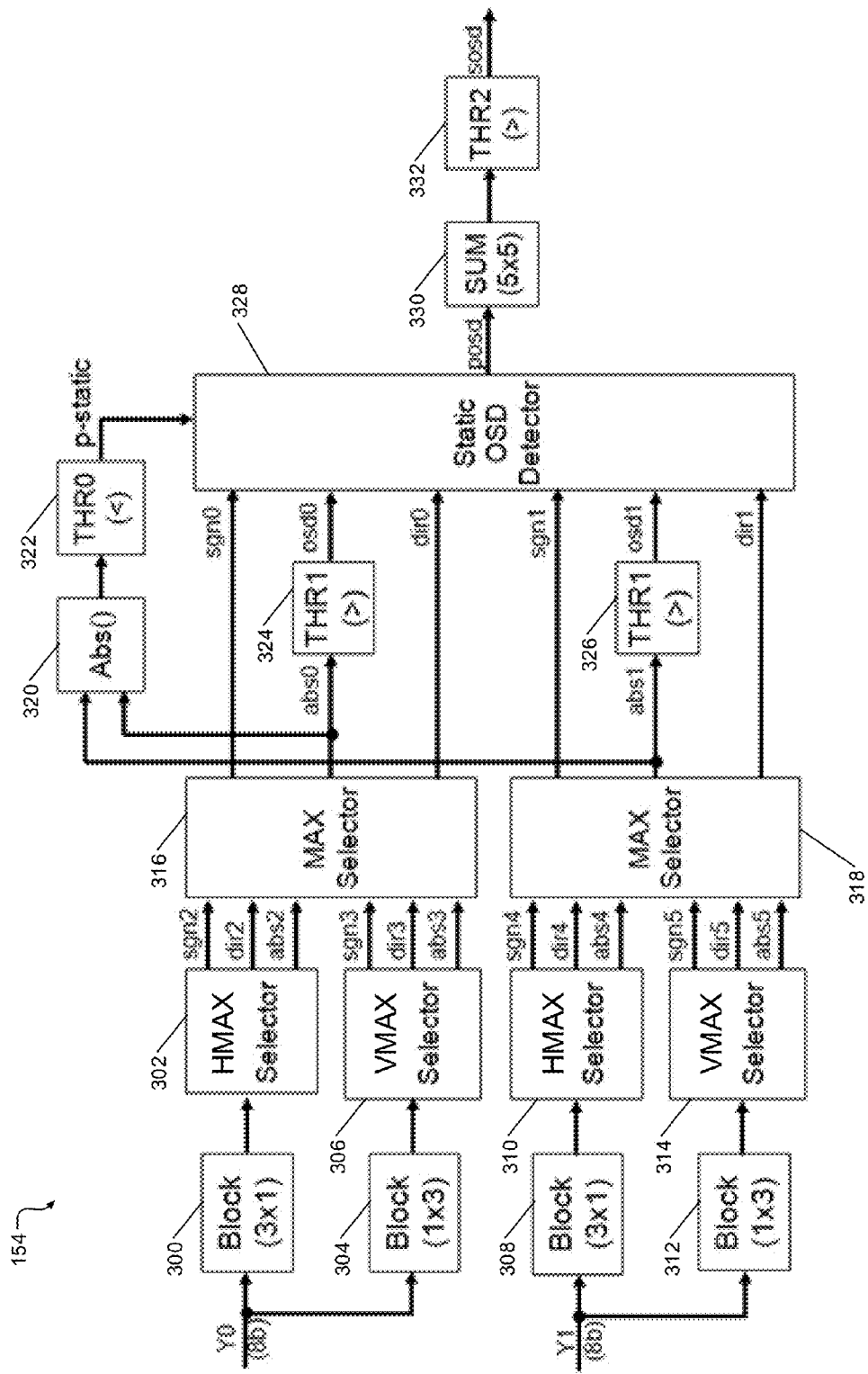
FIG. 12A is a functional block diagram of a static on-screen display detector (SOSD) used in the Y channel motion detector of FIG. 5.

FIGS. 12A and 12B show an example of the static on-screen display detector (SOSD) 154. Static OSD's are often seen on a moving background. If there is no static patch on the text, the "halo" around the characters may be annoying. The SOSD 154 patches the text. The SOSD 154 includes first through fourth buffers 300, 304, 308, 312; first through fourth maximum value selectors 302, 306, 310, 314; fifth and sixth maximum value selectors 316, 318; an absolute value generator 320; first through third threshold comparators 322, 324, 326; a detector 328; a summing module 330; and a fourth threshold comparator 332.

The first buffer 300 is connected to the first maximum value selector 302. The second buffer 304 is connected to the second maximum value selector 306. The first and second maximum value selectors 302, 306 are connected to the fifth maximum value selector 316. The third buffer 308 is connected to the third maximum value selector 310. The fourth buffer 312 is connected to the fourth maximum value selector 314. The third and fourth maximum value selectors 310, 314 are connected to the sixth maximum value selector 318.

Each of the fifth and sixth maximum value selectors 316, 318 has three outputs. The three outputs of each of the fifth and sixth maximum value selectors 316, 318 indicate sign, absolute value, and direction. The signs and direction outputs of each of the fifth and sixth maximum value selectors 316, 318 are connected to the detector 328. The absolute value outputs of each of the fifth and sixth maximum value selectors 316, 318 are connected to the absolute value generator 320. The output of the absolute value generator 320 is connected to the first threshold comparator 322. The output of the first threshold comparator 322 is connected to the detector 328. The absolute value outputs of each of the fifth and sixth maximum value selectors 316, 318 are also respectively connected to the second and third threshold comparators 324, 326. Outputs of the second and third threshold comparators 324, 326 are connected to the detector 328. The detector is connected to the summing module 330. A summing module 330 is connected to the fourth threshold comparator 332.

The first through fourth line buffers 300, 304, 308, 312 are connected to the line buffer 104 and receive the Y channel components Y0 and Y1 from the line buffer 104. The first and second buffers 300, 304 respectively receive horizontal and vertical pixels of the Y channel component Y0. The third and fourth buffers 308, 312 respectively receive horizontal and vertical pixels of the Y channel component Y1. The first and second maximum value selectors 302, 306 respectively select pixels having maximum pixel difference values (e.g., x(i)=d(i)−d(i−1), where d and i respectively represent pixel value and pixel position) in horizontal and vertical directions according to the selection logic shown in FIG. 12B. Each of the first and second maximum value selectors 302, 306 outputs sign, direction, and absolute value for the selected pixels from the Y channel component Y0. The third and fourth maximum value selectors 310, 314 respectively select pixels having maximum motion values in horizontal and vertical directions according to the selection logic shown in FIG. 12B. Each of the third and fourth maximum value selectors 310, 314 outputs sign, direction, and absolute value for the selected pixels from the Y channel component Y1.

The fifth maximum value selector 316 selects sign, direction, and absolute value from the sign, direction, and absolute value received from the first and second maximum value selectors 302, 306 according to the selection logic shown in FIG. 12B. The fifth maximum value selector 316 outputs the selected sign, direction, and absolute value. The sixth maximum value selector 318 selects sign, direction, and absolute value from the sign, direction, and absolute value received from the third and fourth maximum value selectors 310, 314 according to the selection logic shown in FIG. 12B. The sixth maximum value selector 318 outputs the selected sign, direction, and absolute value.

The absolute value generator 320 generates an absolute value based on the absolute values output by the fifth and sixth maximum value selectors 316, 318. The first threshold comparator 322 compares the output of the absolute value generator 320 to a first threshold THR0 and generates an output indicating whether the output of the absolute value generator 320 is less than or equal to the first threshold. The second and third threshold comparators 324, 326 respectively compare the absolute values output by the fifth and sixth maximum value selectors 316, 318 to a second threshold THR1 and generate outputs indicating whether the absolute values output by the fifth and sixth maximum value selectors 316, 318 are greater than or equal to the second threshold. The outputs of the second and third threshold comparators 324, 326 respectively indicate whether on-screen display is detected in the Y0 and Y1 components.

The detector 328 receives the sign and direction outputs from each of the fifth and sixth maximum value selectors 316, 318; the output of the first threshold comparator 322; and the outputs of the second and third threshold comparators 324, 326. Based on the inputs received, the detector 328 detects static on-screen display in the Y0 and Y1 components. The summing module 330 adds the output of the detector 328 for an array of pixels in the Y0 and Y1 components. The fourth threshold comparator 332 compares the sum output by the summing module 330 to a third threshold THR2 and generates a third motion information (sosd) based on the comparison. The third motion information (sosd) indicates whether the SOSD 154 detected a static on-screen display in the Y0 and Y1 components.

There are three-level selection logics shown in FIGS. 12A and 12B. The first level is called "HVMAX Selector" in which 3taps inputs are compared and the signs, directions, and absolute values are calculated. The one with maximum absolute value is selected along with its sign and direction (respectively shown as sgn2-5, dirt-5, abs2-5). The second level is called "MAX Selector" in which a pairs of (signs, directions, and absolute values) are compared and the one with maximum absolute value is selected along with its sign and direction (respectively shown as sgn0-1, dir0-1, abs0-1). The third level is called "Static OSD Detector" in which the final comparison along with the motion value at each pixel is made in order to determine whether the pixel is SOSD pixel. Total 5×5 SOSD pixels are summed together and compared with the third threshold THR2 to generate a SOSD flag. The detailed logic descriptions are as shown in FIG. 12B.

Figures 13A, 13B:
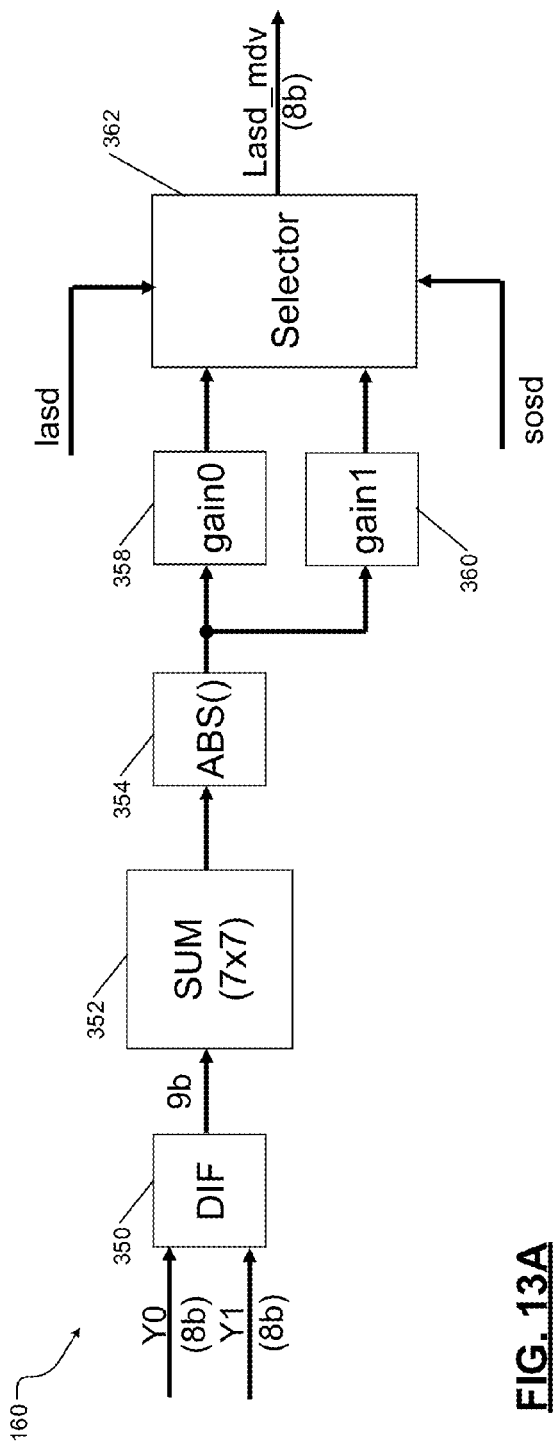
FIG. 13A is a functional block diagram of a noise cancellation filter (NCF) used in the Y channel motion detector of FIG. 5.
FIG. 13B shows the logic for the noise cancellation filter (NCF) of FIG. 13A.

FIGS. 13A and 13B show an example of the noise cancellation filter (NCF) (or a second filter) 160. Normal motion detection utilizes the sum of absolute difference (SAD) between two frames. The SAD function can perform well for true object motions. However, the SAD function can generate false motion detection in the presence of background noise, such as MPEG B-frame quantization noise. Therefore, instead of using sum of absolute difference (SAD), the motion detector of the present disclosure uses the absolute sum of difference (ASD), which performs better than the SAD function in the presence of background noise since the ASD function increase the signal to noise ratio.

The NCF 160 includes a difference module 350, a summing module 352, an absolute value generator 354, a first gain module 358, a second gain module 360, and a selector 362. The difference module 350 is connected to the summing module 352. The summing module 352 is connected to the absolute value generator 354. The absolute value generator 354 is connected to each of the first and second gain modules 358, 360. The first and second gain modules 358, 360 are connected to the selector 362.

The difference module 350 is connected to the line buffer 104 and receives the Y channel components Y0 and Y1 from the line buffer 104. The difference module 350 generates differences in motion values of pixels in the Y channel components Y0 and Y1. The summing module 352 generates a sum of the difference values output by the difference module 350. The absolute value generator 354 generates an absolute value based on the sum output by the summing module 352. The first and second gain modules 358, 360 apply different gains gain0 and gain1 to the output of the absolute value generator 354 and generate first and second outputs. The selector 362 selects the output of the first or second gain modules 358, 360 according to the second and third motion information (lard and sold) respectively received from the LASD 152 and the SOSD 154 according to a logic shown in FIG. 13B.

Figure 14:
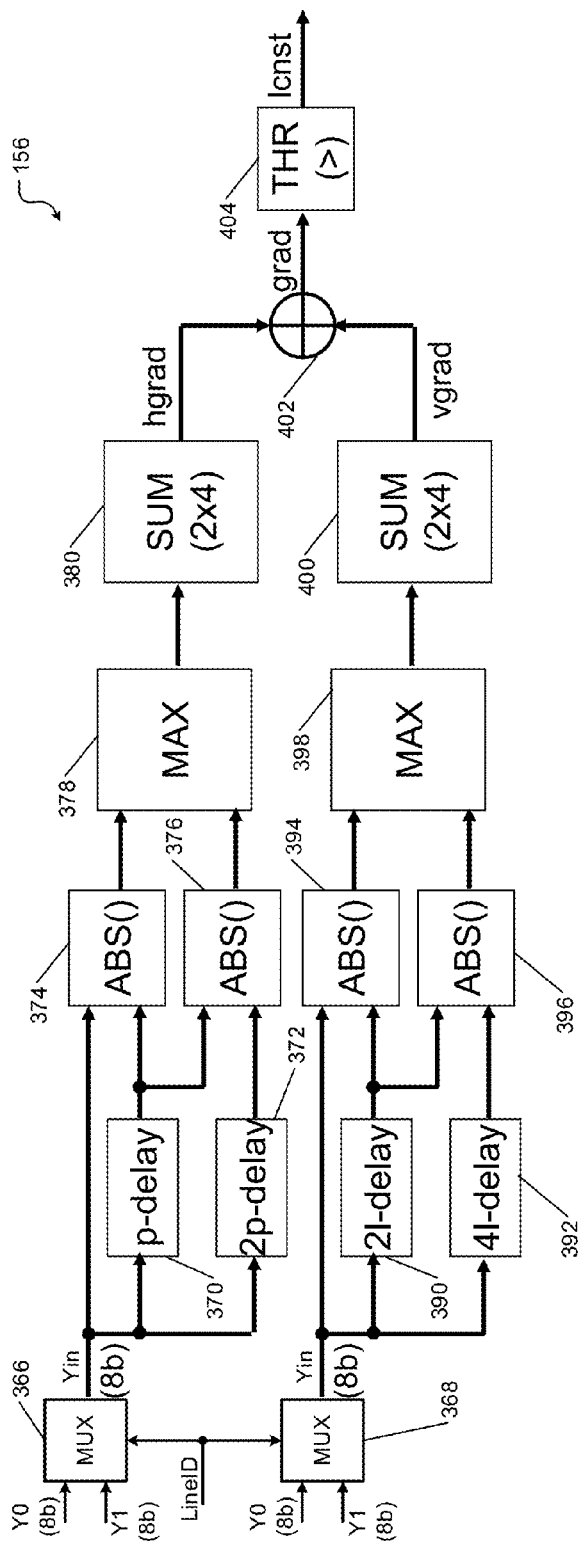
FIG. 14 is a functional block diagram of a low contrast detector (LCND) used in the Y channel motion detector of FIG. 5.

FIG. 14 shows an example of the low contrast detector (LCND) 156. The SAD value during the motion detection is normally low if a moving object is flat (i.e., has low contrast or texture) on most of the surface, which might cause some feathering. The LCND 156 determines the flat region (having low contrast or texture) and then adjusts the SAD value in motion detection (described with reference to the motion detection filter 162 shown in FIGS. 16 and 17). The description of the LCND 156 assumes that the de-interlaced fields are on previous field 1 and 2, which can be multiplexed from Y0 and Y1 using a line indicator. The vertical line delays are a multiple of two due to the de-interlaced nature of the progressive frame.

The LCND 156 includes first and second multiplexers 366, 368; first and second pixel delay modules 370, 372; first and second absolute value generators 374, 376; a first maximum value selector 378; a first summing module 380; first and second line delay modules 390, 392; third and fourth absolute value generators 394, 396; a second maximum value selector 398; a second summing module 400; a third summing module 402; and a threshold comparator 404. The first multiplexer 366 is connected to the first and second pixel delay modules 370, 372 and to the first absolute value generator 374. The first and second pixel delay modules 370, 372 are respectively connected to the first and second absolute value generators 374, 376. An output of the first pixel delay module 370 is also connected to the second absolute value generator 376. The first and second absolute value generators 374, 376 are connected to the first maximum value selector 378. The first maximum value selector 378 is connected to the first summing module 380. The first summing module 380 is connected to the third summing module 402.

The second multiplexer 368 is connected to the first and second line delay modules 390, 392 and to the third absolute value generator 394. The first and second line delay modules 390, 392 are respectively connected to the third and fourth absolute value generators 394, 396. An output of the first line delay module 390 is also connected to the fourth absolute value generator 396. The third and fourth absolute value generators 394, 396 are connected to the second maximum value selector 398. The second maximum value selector 398 is connected to the second summing module 400. The second summing module 400 is connected to the third summing module 402. The third summing module 402 is connected to the threshold comparator 404.

The first and second multiplexers 366, 368 are connected to the line buffer 104. Each of the first and second multiplexers 366, 368 receives the Y channel components Y0 and Y1 from the line buffer 104. Each of the first and second multiplexers 366, 368 multiplexes the Y channel components Y0 and Y1 based on the line indicator and generates an output Yin. The first and second pixel delay modules 370, 372 receive the output Yin of the first multiplexer 366. The first and second line delay modules 390, 392 receive the output Yin of the second multiplexer 368. The first pixel delay module 370 adds a one pixel delay. The second pixel delay module 372 adds a two pixel delay. The first line delay module 390 adds a two line delay. The second line delay module 392 adds a four line delay. The first and third absolute value generators 374, 394 are also connected to the line buffer 104. The first and third absolute value generators 374, 394 also receive the outputs Yin respectively from the first and second multiplexers 366, 368.

The first absolute value generator 374 generates a first absolute value based on the output Yin of the first multiplexer 366 and the output of the first pixel delay module 370. The second absolute value generator 376 generates a second absolute value based on the outputs of the first and second pixel delay modules 370 and 372. The third absolute value generator 394 generates a third absolute value based on the output Yin of the second multiplexer 368 and the output of the first line delay module 390. The fourth absolute value generator 396 generates a fourth absolute value based on the outputs of the first and second line delay modules 390 and 392.

The first maximum value selector 378 selects a maximum absolute value from the first and second absolute values output by the first and second absolute value generators 374, 376. The second maximum value selector 398 selects a maximum absolute value from the third and fourth absolute values output by the third and fourth absolute value generators 374, 376. The first summing module 380 adds output of the first maximum value selector 378 for an array of pixels (e.g., 2×4) and generates a horizontal gradient value for the area of pixels. The second summing module 400 adds output of the second maximum value selector 398 for an array of pixels (e.g., 2×4) and generates a vertical gradient value for the area of pixels.

The third summing module 402 generates a gradient value based on the horizontal and vertical gradient values output by the first and second summing modules 380, 400. The threshold comparator 404 compares the gradient to a threshold and generates an output lcnst (a fourth motion information) indicating detection of low contrast in the area of pixels based on whether the gradient is greater than or equal to the threshold.

Figure 15:
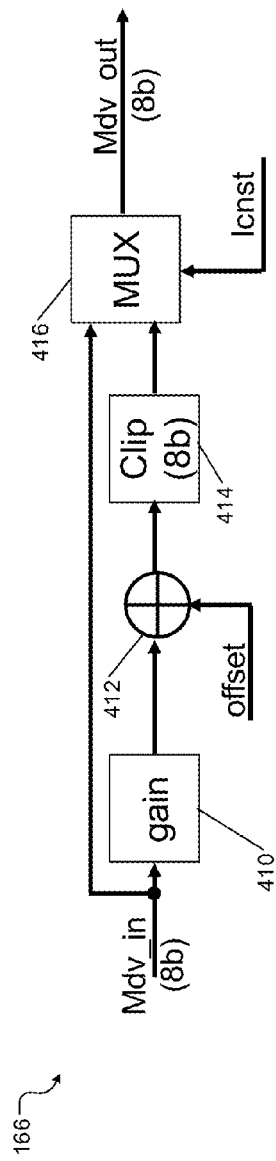
FIG. 15 is a functional block diagram of a low contrast gain controller (LCGC) used in the Y channel motion detector of FIG. 5.

FIG. 15 shows an example of the low contrast gain controller (LCGC) 166. The LCGC 166 includes a gain module 410, a summing module 412, a limiting module 414, and a multiplexer 416. The gain module 410 is connected to the summing module 412. The summing module 412 is connected to the limiting module 414. The limiting module 414 is connected to the multiplexer 416. The gain module 410 and the multiplexer 416 are also connected to the outputs of the selector 164 shown in FIG. 5. The summing module 412 also receives a user-defined offset to compensate for different responses of human vision to different displays. The multiplexer 416 is controlled by the fourth motion information lcnst received from the low contrast detector (LCND) 156 shown in FIG. 14.

The gain module 410 applies a gain to the output of the selector 164. The summing module 412 adds the offset to the output of the gain module 410. The limiting module 414 limits the gain from the output of the summing module 412. Depending on whether the low contrast detector (LCND) 156 detects low contrast, the multiplexer 416 outputs the output of the selector 164 or the output of the limiting module 414. The output of the multiplexer 416 is the Y motion vector (YMV) output by the Y channel motion detector 130 if the temporal IIR (TIIR) filter 168 is not used. The output of the multiplexer 416 is filtered by the TIIR filter 168 to generate the Y motion vector (YMV) output by the Y channel motion detector 130 if the TIIR filter 168 is used.

Figure 16A:
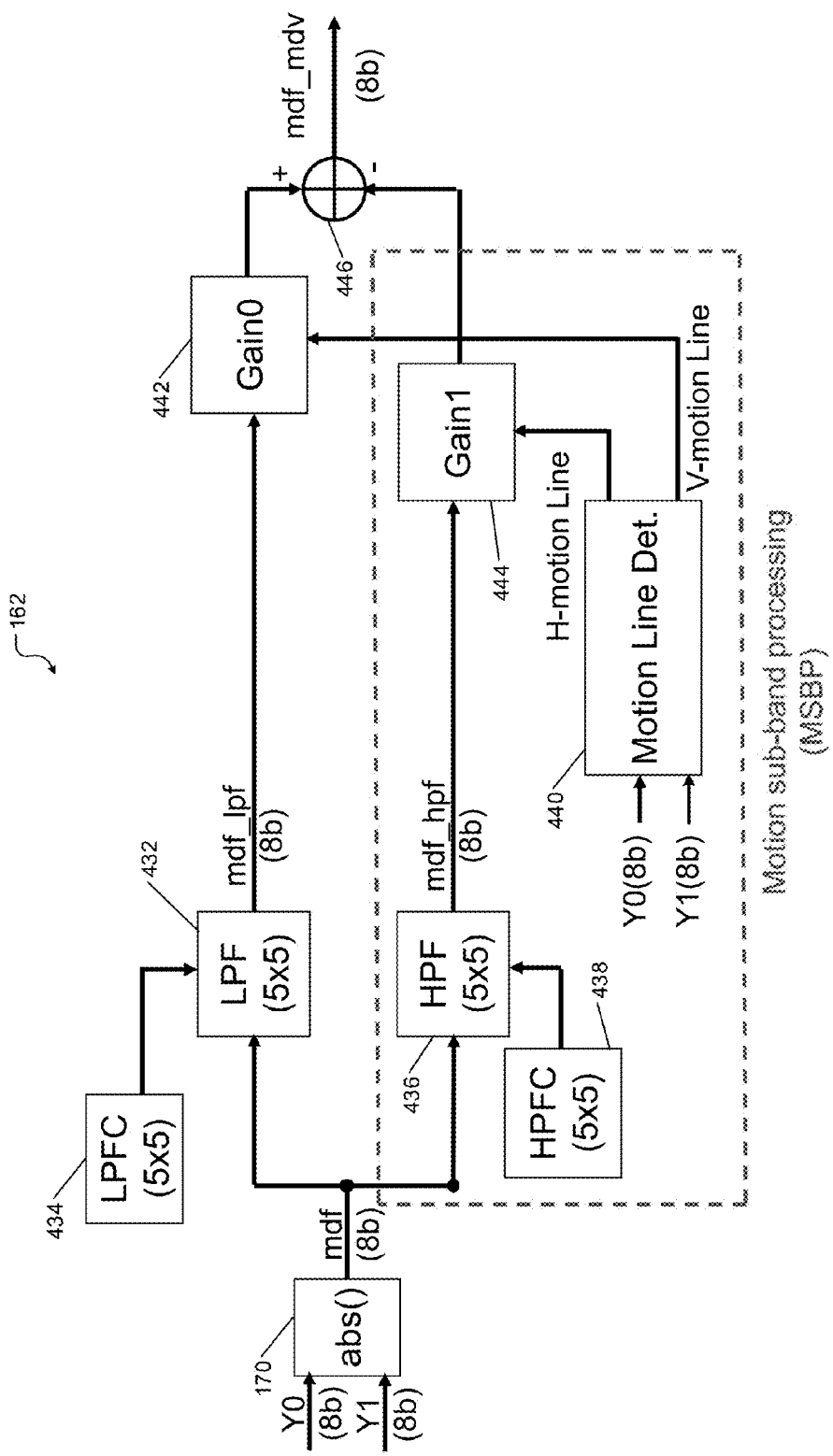
FIG. 16A is a functional block diagram of a motion detection filter (MDF) used in the Y channel motion detector of FIG. 5.
Figure 17A:
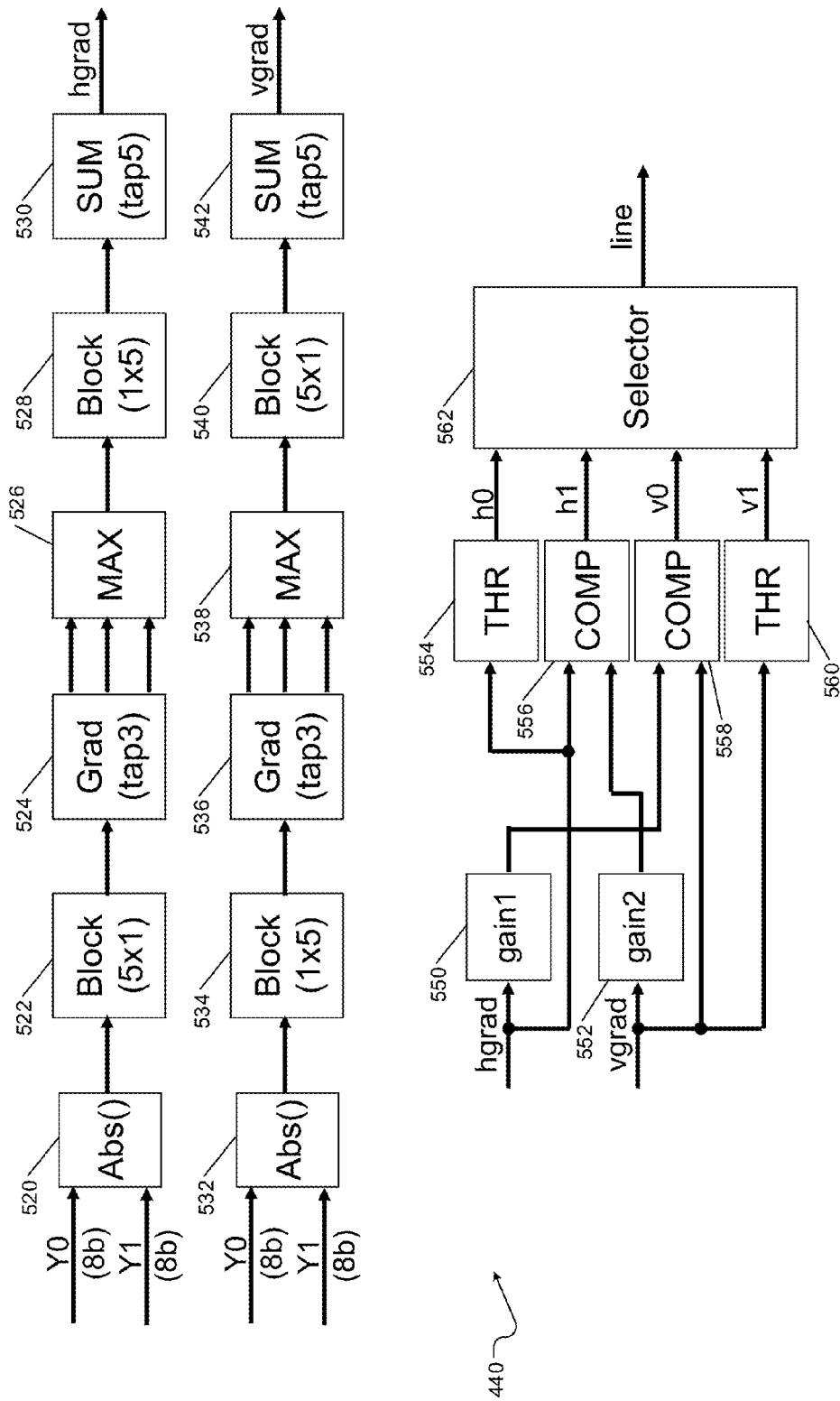
FIG. 17A is a functional block diagram of a motion line detector used in the motion detection filter (MDF) of FIG. 16A.

FIGS. 16A-17B show an example of the motion detection filter (MDF) 162. The MDF 162 uses data from two progressive frames to calculate the SAD value for an array of pixels (e.g., 5×5). In FIG. 16A, the MDF 152 includes a low pass filter featuring a 2-tap temporal motion stretching (TMS) and a vertical motion sub-band processing (MSBP) featuring a high pass filter and a motion line detector. The MSBP is designed to reduce the motion value. Therefore, it is possible to reduce the flicker in case of higher vertical motion transition. For example, a line or bar moving vertically will experience higher vertical motion transition. The processing includes a measurement of vertical HPF on the motion and some patching of line detection and gain adjustment as shown in FIG. 16A. Examples of the low and high pass filters are shown in FIGS. 16B and 16C. Examples of the low and high pass filter coefficients are shown in FIG. 16D. Examples of logic to implement the low and high pass filters are respectively shown in the form of a C-model in FIGS. 16E and 16F. An example of the motion line detector is shown in FIGS. 17A and 17B. The motion line detector generates H and V gradients and compares both values to indicate motion along horizontal or vertical line, or both. Based on the indication, the MDF 162 reduces motion along horizontal line or increases motion along vertical line. The motion line detector is used for only the Y channel and is not used for the UV channel.

In FIG. 16A, the MDF 162 includes the absolute value generator 170, a low-pass filter 432, low-pass filter coefficients 434, a high-pass filter 436, high-pass filter coefficients 438, a motion line detector 440, a first gain module 442, a second gain module 444, and a summing module 446. The absolute value generator 170 is connected to each of the low-pass filter 432 and the high-pass filter 436. The low-pass filter coefficients 434 and the high-pass filter coefficients 438 are stored in memory and are respectively output to the low-pass filter 432 and the high-pass filter 436. The low-pass filter 432 and the high-pass filter 436 are respectively connected to the first and second gain modules 442, 444. The motion line detector 440 is connected to the line buffer 104 and receives the Y channel components Y0 and Y1 from the line buffer 104. The motion line detector 440 is connected to each of the first and second gain modules 442, 444. The first and second gain modules 442, 444 are connected to the summing module 446.

The absolute value generator 170 is connected to the line buffer 104, receives the Y channel components Y0 and Y1 from the line buffer 104, and generates an absolute motion value for the Y channel components Y0 and Y1. The low-pass filter 432 filters the absolute motion value based on the low-pass filter coefficients 434. The high-pass filter 436 filters the absolute motion value based on the high-pass filter coefficients 438. The motion line detector 440 processes the absolute motion value and detects whether the motion is along a horizontal or vertical line. For horizontal motion, the second gain module 444 applies a negative gain to the output of the high-pass filter 436. For vertical motion, the first gain module 442 applies a positive gain to the output of the low-pass filter 432. The summing module 446 combines the outputs of the first and second gain modules 442, 444 to generate a scaled motion value that is output to the selector 164 shown in FIG. 5.

In FIG. 16B, the low-pass filter 432 includes first and second buffers 460, 470; first and second portions of the low-pass filter coefficients 434-1, 434-2; first and second mixers 462, 472; a demultiplexer 474; first, second, and third summing modules 464, 480, 484; first, second, and third normalizing modules 466, 482, 486; a maximum value selector 488, and a multiplexer 490. The first and second portions of the low-pass filter coefficients 434-1, 434-2 are shown in FIG. 16D and are respectively used when temporal motion stretching (TMS) is on and off.

The first and second buffers 460, 470 are connected to the first and second mixers 462, 472. The first and second portions of the low-pass filter coefficients 434-1, 434-2 are respectively connected to the first and second mixers 462, 472. The first mixer 462 is connected to the first summing module 464. The first summing module is connected to the first normalizing module 466. The first normalizing module 466 is connected to the multiplexer 490. The second mixer 472 is connected to the demultiplexer 474. A first output of the demultiplexer 474 is connected to the second summing module 480. The second summing module 480 is connected to the second normalizing module 482. The second normalizing module 482 is connected to the maximum value selector 488. A second output of the demultiplexer 474 is connected to the third summing module 484. The third summing module 484 is connected to the third normalizing module 486. The third normalizing module 486 is connected to the maximum value selector 488. The maximum value selector 488 is connected to the multiplexer 490.

The first buffer 460 receives the absolute motion value from the absolute value generator 170. The first mixer 462 applies the first portion of the low-pass filter coefficients 434-1 to the contents of the first buffer 460. The first summing module 464 generates a first sum based on an output of the first mixer 462. The first normalizing module 466 normalizes the first sum and generates a first normalized motion value.

The second buffer 470 receives the absolute motion value from the absolute value generator 170. The second mixer 472 applies the second portion of the low-pass filter coefficients 434-2 to the contents of the second buffer 470. The demultiplexer 474 demultiplexer the output of the second mixer 472 based on a control input into first and second outputs respectively including motion values for odd and even lines. The second summing module 480 generates a second sum based on the first output of the demultiplexer 474. The second normalizing module 482 normalizes the second sum and generates a second normalized motion value. The third summing module 484 generates a third sum based on the second output of the demultiplexer 474. The third normalizing module 486 normalizes the third sum and generates a third normalized motion value.

The maximum value selector 488 selects a maximum of the second and third normalized motion values and outputs the selected maximum value to the multiplexer 490. The demultiplexer 474; the second and third summing modules 480, 484; the first and second normalizing modules 482, 486; and the maximum value selector 488 perform the TMS function. The multiplexer 490 receives a control signal indicating whether TMS is enabled. Based on the control signal, the multiplexer 490 selects the output of the first normalizing module 466 when TMS is disabled or selects the output of the maximum value selector 488 when TMS is enabled. The output selected by the multiplexer 490 is input to the first gain module 442 of the MDF 162 shown in FIG. 16A.

In FIG. 16C, the high-pass filter 436 includes a line delay module 500, an absolute value generator 502, a buffer 504, the high-pass filter coefficients 438, a mixer 506, a summing module 508, and a normalizing module 510. The line delay module 500 is connected to the absolute value generator 502. The absolute value generator 502 is connected to the buffer 504. The buffer 504 and the high-pass filter coefficients 438 are connected to the mixer 506. The mixer 506 is connected to the summing module 508. The summing module 508 is connected to the normalizing module 510.

The line delay module 500 receives the absolute motion value from the absolute value generator 170 and adds a two line delay. The absolute value generator 502 generates absolute values based on the absolute motion value from the absolute value generator 170 and the delayed motion values received from the line delay module 500. The buffer 504 stores the output of the absolute value generator 502. The mixer 506 applies the high-pass filter coefficients 438 to the contents of the buffer 504. The summing module 508 generates a sum based on an output of the mixer 506. The normalizing module 510 normalizes the sum and generates a normalized motion value that is output to the second gain module 444 of the MDF 162 shown in FIG. 16A.

In FIG. 17A, the motion line detector 440 includes first and second absolute value generators 520, 532; first and second buffers 522, 534; first and second gradiant modules 524, 536; first and second maximum value selectors 526, 538; third and fourth buffers 528, 540; first and second summing modules 530, 542; first and second gain modules 550, 552; first and second threshold comparators 554, 560; first and second comparators 556, 558; and a selector 562.

The first absolute value generator 520 is connected to the first buffer 522. The first buffer 522 is connected to the first gradient module 524. The first gradient module 524 is connected to the first maximum value selector 526. The first maximum value selector 526 is connected to the third buffer 528. The third buffer 528 is connected to the first summing module 530. The first summing module 530 is connected to the first gain module 550.

The second absolute value generator 532 to is connected to the second buffer 534. The second buffer 534 is connected to the second gradient module 536. The second gradient module 536 is connected to the second maximum value selector 538. The second maximum value selector 538 is connected to the fourth buffer 540. The fourth buffer 540 is connected to the second summing module 542. The second summing module 542 is connected to the second gain module 552.

The first and second gain modules 550, 552 are respectively connected to the second and first comparators 558, 556. The first summing module 530 is connected to each of the first threshold comparator 554 and the first comparator 556. The second summing module 542 is connected to each of the second threshold comparator 560 and the second comparator 558. The first and second threshold comparators 554, 560 and the first and second comparators 556, 558 are connected to the selector 562.

Each of the first and second absolute value generators 520, 532 is connected to the line buffer 104, receives the Y channel components Y0 and Y1 from the line buffer 104, and generates an absolute motion value for the Y channel components Y0 and Y1. The first absolute value generator 520 generates absolute motion values for a horizontal set of pixels in the Y channel components Y0 and Y1. The first buffer 522 stores the absolute motion values for the horizontal set of pixels. The first gradient module 524 processes the absolute motion values for the horizontal set of pixels and generates a first plurality of outputs based on the number of taps used (e.g., 3 outputs if using 3 taps). The first maximum value selector 526 selects a first maximum value of the first plurality of outputs. The third buffer 528 buffers the first maximum values for a block of pixels. The first summing module 530 generates a first sum of the first maximum values, which represents a horizontal gradient value hgrad for the pixels in the Y channel components Y0 and Y1.

The second absolute value generator 532 generates absolute motion values for a vertical set of pixels in the Y channel components Y0 and Y1. The second buffer 534 stores the absolute motion values for the vertical set of pixels. The second gradient module 536 processes the absolute motion values for the vertical set of pixels and generates a second plurality of outputs based on the number of taps used (e.g., 3 outputs if using 3 taps). The second maximum value selector 538 selects a second maximum value of the second plurality of outputs. The fourth buffer 540 buffers the second maximum values for a block of pixels. The second summing module 542 generates a second sum of the second maximum values, which represents a vertical gradient value vgrad for the pixels in the Y channel components Y0 and Y1.

The first and second gain modules 550, 552 respectively apply first and second gains to the horizontal and vertical gradient values and generate first and second gain outputs. The first threshold comparator 554 compares the horizontal gradient value to a threshold and generates a first comparison (h0). The first comparator 556 compares the horizontal gradient value to the second gain output and generates a second comparison (h1). The second comparator 558 compares the first gain output to the vertical radiant value and generates a third comparison (v0). The second threshold comparator 560 compares the vertical gradient value to a threshold and generates a fourth comparison (v1).

The selector 562 selects one of the four comparisons using a selection logic shown in FIG. 17E3 generates an output indicating whether the motion is along horizontal or vertical line. For example, the output of the selector 562 may be 0 indicating no motion, 1 indicating motion along a horizontal line, 2 indicating motion along a vertical line, or 3 indicating undecided. The output of the selector 562 is input to the first and second gain modules 442, 444 of the MDF 162 shown in FIG. 16A.

FIG. 18 shows the selection priority and logic used by the selector 164 shown in FIG. 5. The SOSD flag (i.e., the output of the static on-screen display detector (SOSD) 154) is set to a higher priority. The large area motion detector (LAMD) 150 and the large area static detector (LASD) 152 have equal priority.

FIG. 19 shows an example of the UV channel motion detector 132 shown in FIG. 4. The UV channel motion detector 132 includes first and second absolute value generators 570, 572; first and second motion detection filters (MDFs) 574, 576; a maximum value generator 578; a low contrast gain controller (LCGC) 580, and the low contrast detector (LCND) 156 shown in FIG. 14. The first and second absolute value generators 570, 572 are respectively connected to the first and second motion detection filters 574, 576. The first and second motion detection filters 574, 576 are connected to the maximum value generator 578. The maximum value generator 578 is connected to the low contrast gain controller (LCGC) 580. The low contrast detector (LCND) 156 is connected to the low contrast gain controller (LCGC) 580.

The first and second absolute value generators 570, 572 are connected to the line buffer 104 and respectively receive the U and V channel components (U0, U1) and (V0, V1). The first and second absolute value generators 570, 572 respectively generate first and second absolute motion values for the U and V channel components (U0, U1) and (V0, V1). The first and second MDFs 574, 576 are similar to the MDF 162 shown in FIGS. 5 and 16 except that the first and second MDFs 574, 576 do not use the motion line detector 440. Accordingly, the description of the first and second MDFs 574, 576 is omitted.

The first and second MDFs 574, 576 respectively generate first and second motion values the U and V channel components (U0, U1) and (V0, V1). The maximum value selector 578 selects a maximum of the first and second motion values the U and V channel components (U0, U1) and (V0, V1). The low contrast gain controller (LCGC) 580 is similar to the low contrast gain controller (LCGC) 166 shown in FIGS. 5 and 15. The operation of the LCGC 580 is therefore omitted. The low contrast detector (LCND) 156 is shared between the Y channel motion detector 130 and the UV channel motion detector 132. The operation of the LCND 156 described with references to FIGS. 5 and 14 and is therefore omitted.

The LCND 156 generates an output lcnst indicating detection of low contrast/texture in an area of pixels. If an LCND flag is set by the LCND 156, then a motion detection gain control is applied by the LCGC 580 to a maximum of the first and second motion values selected by the maximum value selector 578. The maximum of the first and second motion values selected by the maximum value selector 578 or the output of the LCGC 580 (if the LCND flag is set by the LCND 156) is output as the UV motion vector (UVMV) by the UV channel motion detector 132.

The motion detection in the UV channel is less complex than the Y channel. The UV channel operates at half the resolution of the Y channel. The UV channel motion detector 132 may be turned off, and the Y channel motion vector may be used for the UV channel.

FIG. 20 shows an example of the logic used by the first and second blenders 134, 136 shown in FIG. 5 to blend the Y motion vector (YMV) and the UV motion vector (UVMV). In FIG. 20, the parameters yalpha and uvalpha are user defined. The parameter uvalpha is set to 0 if the UV channel motion detector 132 is not used.

FIG. 21 shows an example of the logic used by the first and second quantizers 138, 140. The quantizers 138, 140 convert 8-bits motion value into 3-bits. The quantizers 138, 140 also perform noise level adaptation for motion detection. For example, NLE is the estimated "Noise Level" provided by the system (e.g., by the IFA 124 shown in FIG. 3 and described below with references to FIGS. 38-40).

Figures 22A, 22B:
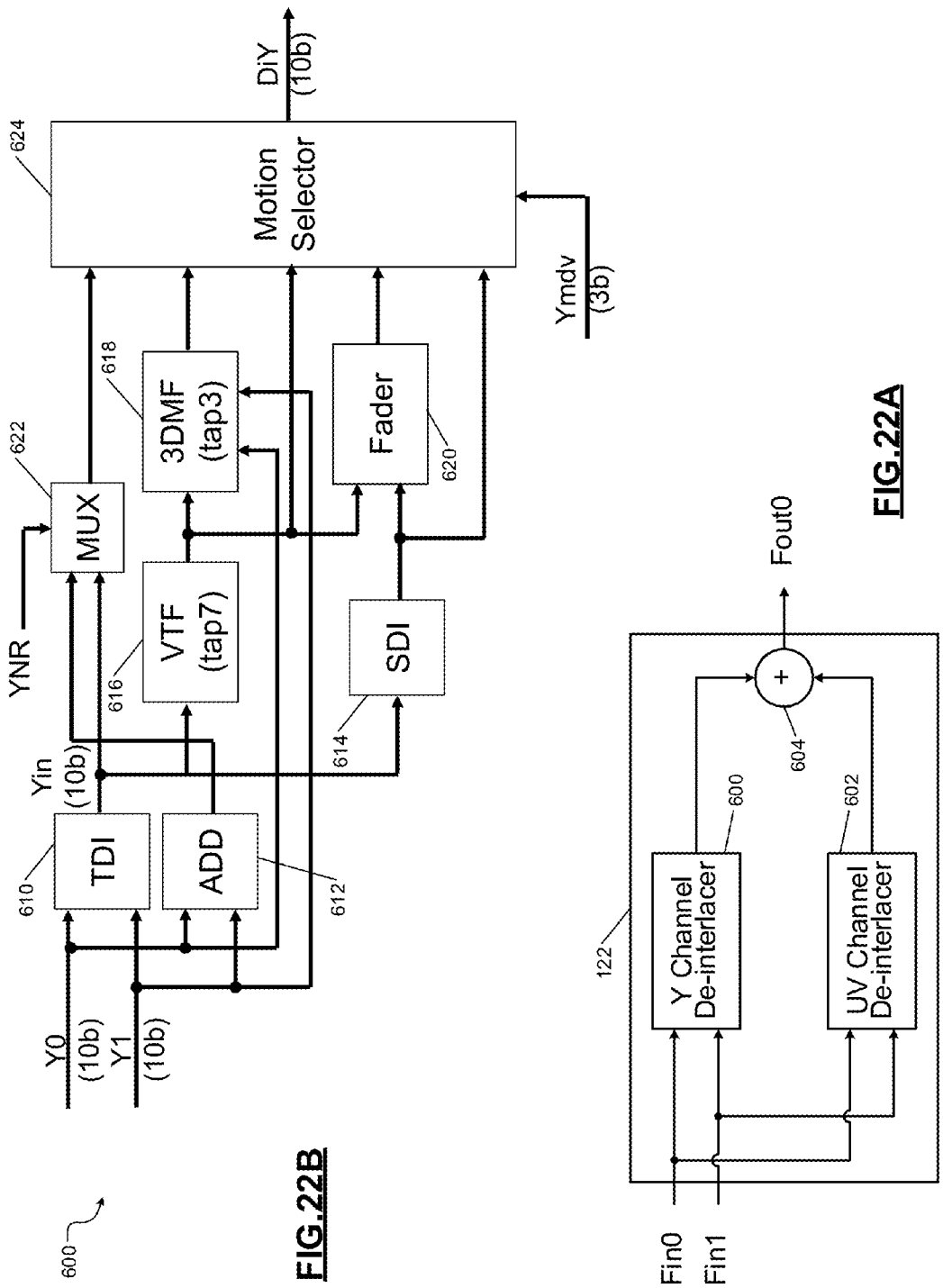
FIG. 22A is a functional block diagram of a de-interlacer used in the motion adaptive de-interlacer (MADI) of FIG. 3.
FIG. 22B is a functional block diagram of a Y channel de-interlacer used in the de-interlacer of FIG. 22A.

FIGS. 22A and 22B show an example of the de-interlacer 122 shown in FIG. 3. The de-interlacer 122 receives the interlaced frames Fin0 and Fin1 from the line buffer 104, de-interlaces the interlaced frames Fin0 and Fin1 based on the first motion indicator (Mdv) received from the motion detector 120, and generates the first output Fout0 including de-interlaced frames. In FIG. 22A, the de-interlacer 122 includes a Y channel of de-interlacer 600, a UV channel de-interlacer 602, and a combiner 604. Each of the Y and the UV channel de-interlacers 600, 602 is connected to the line buffer 104 and receives the interlaced frames Fin0 and Fin1 from the line buffer 104. Each of the Y and the UV channel de-interlacers 600, 602 is connected to the combiner 604. The Y and the UV channel de-interlacers 600, 602 respectively de-interlace Y and UV channel components of the interlaced frames Fin0 and Fin1 based on the first motion indicator (Mdv) and generate de-interlaced frames. The combiner 604 combines the interlaced frames generated by the Y and the UV channel de-interlacers 600, 602 and generates the first output Fout0 including de-interlaced frames. As explained below in detail, Y and the UV channel de-interlacers 600, 602 utilize a 5-level motion detection logic, where each motion value has a different functionality.

In FIG. 22B, an example of the Y channel de-interlacer 600 is shown. The Y channel de-interlacer 600 includes a temporal de-interlacer (TDI) 610, an average generator 612, a spatial de-interlacer (SDI) 614, a vertical temporal filter (VTF) 616, a three-dimensional temporal and spatial median filter (3DMF) 618, a blender (fader) 620, a multiplexer 622, and a selector 624. The temporal de-interlacer (TDI) 610 is connected to the vertical temporal filter (VTF) 616, the spatial de-interlacer (SDI) 614, and the multiplexer 622. The average generator 612 is connected to the multiplexer 622. The spatial de-interlacer (SDI) 614 is connected to the blender 620 and the selector 624. The vertical temporal filter (VTF) 616 is connected to the three-dimensional temporal and spatial median filter (3DMF) 618, the blender 620, and the selector 624. The three-dimensional temporal and spatial median filter (3DMF) 618, the blender 620, and the multiplexer 622 are connected to the selector 624.

The Y channel de-interlacer 600 includes three major components: the temporal de-interlacer (TDI) 610, the spatial de-interlacer (SDI) 614, and the vertical temporal filter (VTF) 616. The transition between two components is performed seamlessly. YNR is a noise reduction enable control. When YNR is on, a tap2 frame average is performed if no motion is detected.

Each of the temporal de-interlacer (TDI) 610, the average generator 612, and the three-dimensional temporal and spatial median filter (3DMF) 618 is connected to the line buffer 104 and receives the Y channel components Y0 and Y1 from the line buffer 104. The temporal de-interlacer (TDI) 610 temporally de-interlaces a pair of interlaced fields of the Y channel components Y0 and Y1 using Weave method and generates a first output. The average generator 612 generates an average of the Y channel components and generates a second output. The spatial de-interlacer (SDI) 614 spatially de-interlaces the first output using angle adaptive single field spatial de-interlacing and generates a third output. The vertical temporal filter (VTF) 616 filters high-frequency harmonics from the first output and generates a fourth output. The three-dimensional temporal and spatial median filter (3DMF) 618 filters leakage from the fourth output using temporal and spatial filters and generates a fifth output. The blender 620 blends the third and fourth outputs and generates a sixth output. The multiplexer 622 selects the first output or the second output based on the YNR noise control signal and generates a seventh output. The selector 624 selects one of the third, fourth, fifth, sixth, and seventh outputs as an output of the Y channel de-interlacer 600 based on the first motion indicator (Ymdv) received from the Y channel motion detector 130.

FIG. 23 shows an example of logic used by the temporal de-interlacer (TDI) 610. The temporal de-interlacing is performed between previous field 2 and 1 based on line ID as shown.

FIGS. 24A and 24B show an example of the vertical temporal filter (VTF) 616. An ideal VT filter has a diamond shaped frequency response as shown in FIG. 24A, which prevents human eyes from seeing high-frequency harmonics. The vertical temporal filter (VTF) 616, however, is not ideal and therefore may leak, which can cause feathering or flicker, also called VTF artifacts. An example of a structure of a 7tap vertical temporal filter (VTF) 616 is shown in FIG. 24B. The 7tap vertical temporal filter (VTF) 616 and its coefficients can be mathematically expressed in terms of the following equation: Out=SUM(ln(i)*Coef(i)), where i=0 to 6; and Coef(i)={1, −5, 8, 10, 8, −5, 1}.

FIGS. 25A-25C show an example of the three-dimensional temporal and spatial median filter (3DMF) 618. The 3DMF 618 is used to prevent feathering and flicker generated by VTF "leak" when motion value is small but not zero. A tap3 temporal median filter (TMF) is first applied to the output of the vertical temporal filter (VTF) 616. Then a spatial tap5 median filter (SMF) is applied, along with an impulse detector used for noise reduction.

In FIG. 25A, the three-dimensional temporal and spatial median filter (3DMF) 618 includes a temporal median filter (TMF) 630, a buffer 632, an impulse detector 634, and a spatial median filter (SMF) 636. The temporal median filter (TMF) 630 is connected to the buffer 632. The buffer is connected to the impulse detector 634 and the spatial median filter (SMF) 636. The impulse detector 634 is connected to the spatial median filter (SMF) 636.

The temporal median filter (TMF) 630 receives Y channel components Y0 and Y1 and the fourth output of the vertical temporal filter (VTF) 616. The temporal median filter (TMF) 630 an eighth output. The buffer 632 stores the output of the temporal median filter (TMF) 630. The impulse detector 634 detects noise in the eighth output. The spatial median filter (SMF) 636 filters the eighth output and generates a ninth output based on the noise detected in the eighth output. FIGS. 25B and 25C respectively show examples of the logic used by the impulse detector 634 and the spatial median filter (SMF) 636.

Figure 26:
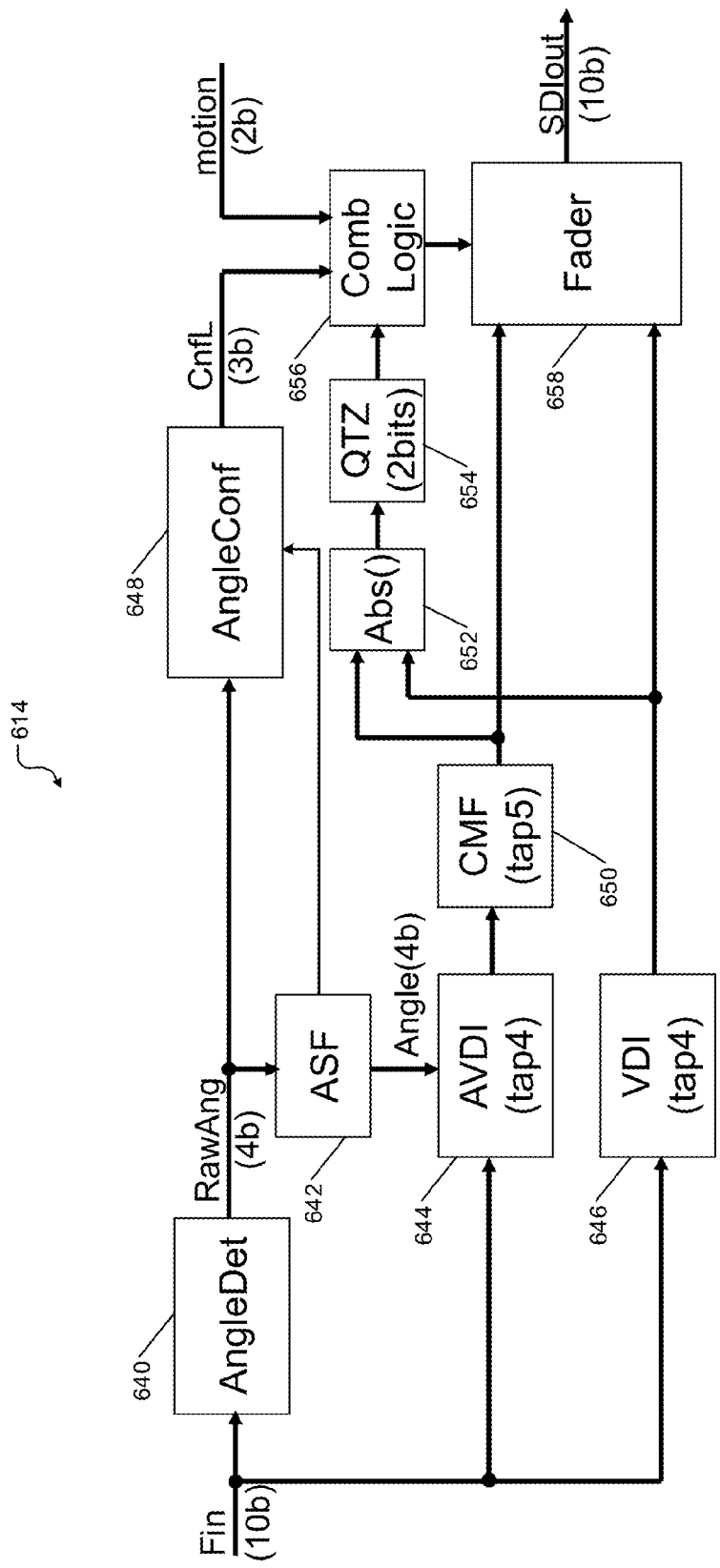
FIG. 26 is a functional block diagram of spatial de-interlacer (SDI) used in the Y channel de-interlacer of FIG. 22B.

FIG. 26 shows an example of the spatial de-interlacer (SDI) 614. The spatial de-interlacer (SDI) 614 is a single-field angle adaptive spatial de-interlacer used to reduce edge jaggedness when line doubling is performed. The spatial de-interlacer (SDI) 614 includes an angle detector 640, and angle stretch filter (ASF) 642, an adaptive vertical interpolator (AVDI) 644, a vertical interpolator (VDI) 646, a confidence level estimator 648, a classified median filter (CMF) 650, an absolute value generator 652, a quantizer 654, a combiner 656, and a fader 658.

The angle detector 640 is connected to the angle stretch filter (ASF) 642 and the confidence level estimator 648. The angle stretch filter (ASF) 642 is connected to the adaptive vertical interpolator (AVDI) 644. The adaptive vertical interpolator (AVDI) 644 is connected to the classified median filter (CMF) 650. Each of the angle detector 640, the adaptive vertical interpolator (AVDI) 644, and the vertical interpolator (VDI) 646 receives the input received by the spatial de-interlacer (SDI) 614. The classified median filter (CMF) 650 and the vertical interpolator (VDI) 646 are connected to the fader 658. The classified median filter (CMF) 650 and the vertical interpolator (VDI) 646 are connected to the absolute value generator 652. The absolute value generator 652 is connected to the quantizer 654. The quantizer 654 and the confidence level estimator 648 are connected to the combiner 656. The combiner 656 is connected to the fader 658.

The components of the spatial de-interlacer (SDI) 614 are explained below in further detail with reference to FIGS. 27-35. Briefly, the angle detector 640 detects angles in vertical, rising, and falling angle regions of a field and generates a raw angle value. The angle stretch filter (ASF) 642 smooths the raw angle value and generates a filtered angle value. The adaptive vertical interpolator (AVDI) 644 interpolates pixels of the field based on the filtered angle value and generates a first interpolated output. The vertical interpolator (VDI) 646 interpolates the pixels of the field and generates a second interpolated output. The classified median filter (CMF) 650 filters interpolation artifacts from the first interpolated output.

The absolute value generator 652 generates an absolute value based on the outputs of the classified median filter (CMF) 650 and the vertical interpolator (VDI) 646. The quantizer 654 quantizes the absolute value generated by the absolute value generator 652. An edge detector (described below) detects horizontal, vertical, rising, and falling edges by processing the pixels of the field. The confidence level estimator 648 estimates a confidence level of the raw angle value based on the horizontal, vertical, rising, and falling edges and generates a confidence indicator.

A motion detector provides a motion indication. For example, the motion detector can be any motion detector including but not limited to the motion detector 120 shown in FIG. 3. The combiner 656 combines the outputs of the quantizer 654, the confidence level estimator 648, and the motion detector to generate a control signal. Based on the control signal, the fader 658 outputs the output of the classified median filter (CMF) 650 or the vertical interpolator (VDI) 646 as the output of the spatial de-interlacer (SDI) 614. The fader 658 is similar to the first and second blenders 134, 136 shown in FIG. 4 and is therefore not described.

Figure 27:
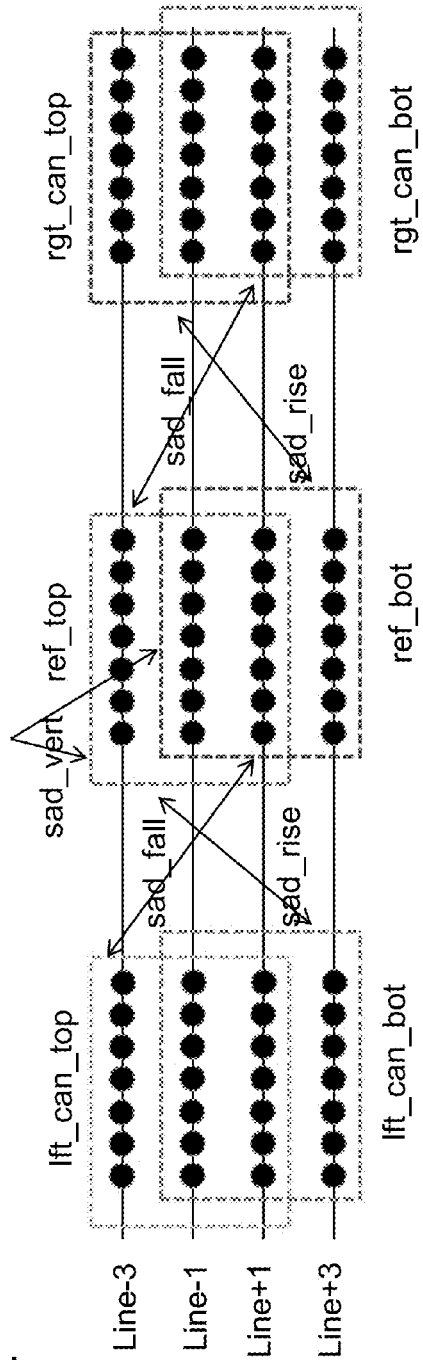
FIGS. 27 and 28 show an angle detector used in the spatial de-interlacer (SDI) of FIG. 26.
Figure 28:
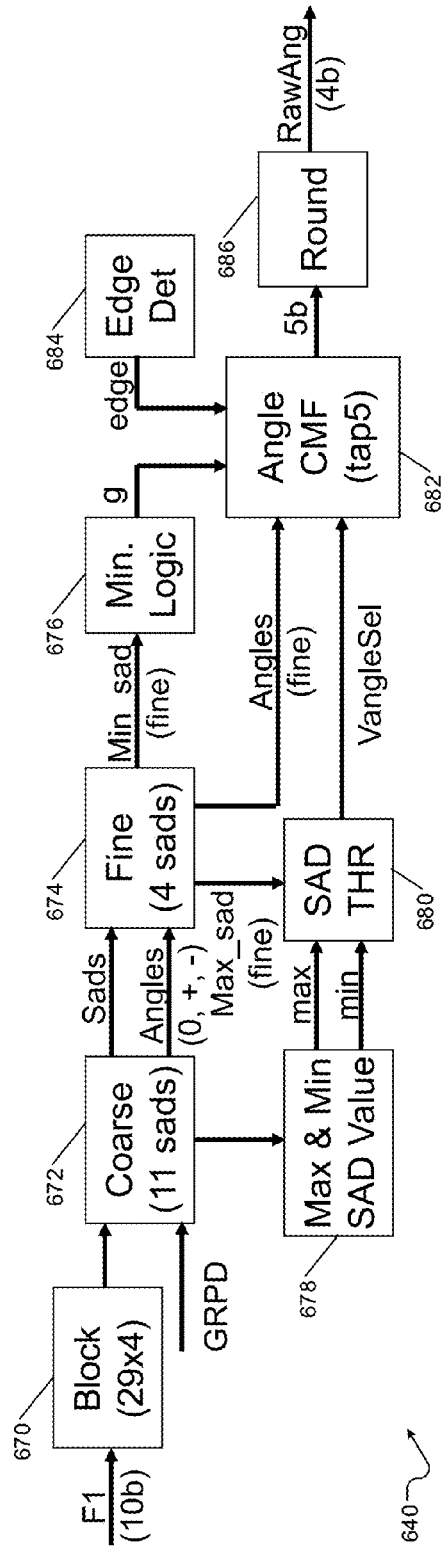

FIGS. 27 and 28 show an example of the angle detector 640. In FIG. 27, angle searching and block matching is shown. For example, the angle detector 640 may use block matching with a block size (7×3) and a searching window (+/−11 pixels). This is equivalent to +/−1/6 the lowest angle value. Unlike traditional symmetrical angle searching, the angle detector 640 uses asymmetrical angle searching, which includes reference and candidate blocks (denoted by "can" and "ref") as shown in FIG. 27. The sum of absolute difference (SAD) value calculations performed for angle detection average top and bottom pixel absolute difference values in opposite direction. The angle detector 640 is described below in further detail.

In FIG. 28, the angle detector 640 includes a buffer 670; first and second SAD modules 672, 674; a minima module 676; a maxima and minima module 678; a threshold comparator 680; an angle classified median filter (CMF) 682; an edge detector 684; and a rounding module 686. The buffer 670 is connected to the first SAD module 672. The first SAD module 672 is connected to the second SAD module 674 and the maxima and minima module 678. The second SAD module 674 is connected to the minima module 676, the threshold comparator 680, and the angle classified median filter (CMF) 682. The second SAD module 674, the minima module 676, the threshold comparator 680, and the edge detector module 684 are connected to the angle classified median filter (CMF) 682. The angle classified median filter (CMF) 682 is connected to the rounding module 686. The components of the angle detector 640 are described below in detail with references to FIGS. 29-32.

The following annotations are used in FIG. 28. Coarse SAD Search (3 region SAD Calculation): 0, +/−2, +/−4, +/−6, +/−8, +1-10 pixels. 0 Angle: calculated by vertical SAD. + Angle: calculated by rising angle SADs. − Angle: calculated by falling angle SADs. Fine SAD Search: rising/falling angle+/−1pixel. Min. Logic: the minimum logic determines the type of local minima using the 3 region SADs. Angle CMF: the classified median filter uses previous and current angle values to resolve the uncertainty of angle detection. GRPD: global repeated pattern indicator from the IFA 124 shown in FIG. 3. When GRPD is high, the Coarse SAD Search is limited by a smaller range of angle values.

The buffer 670 buffers a block of pixels received by the angle detector 640. The first SAD module 672 performs coarse sum of absolute difference (SAD) calculation as follows. The coarse SAD calculation is divided into 3 angle regions: vertical, rising, and falling angle regions. The vertical angle SAD is the one with "0" angle. The rising angle SAD is the one with "+" angle. The falling angle SAD is the one with "−". The minimum of the rising and falling SADs define the rising coarse angle and the falling coarse angle. These three coarse angles along with their SAD values are used to determine the winning angle value.

The second SAD module 674 performs fine sum of absolute difference (SAD) calculation as follows. The winners of each rising and falling regions are fine tuned into better angle position by adding+/−1 pixel around the original coarse angle values. The SAD values from the three regions are used by the minima module 676 to determine the type of local minima. The maximum values of the three SADs at rising and falling regions are compared to a threshold to determine if the angle is validated to be a vertical angle. A smaller SAD value has a higher confidence level and is therefore preferred.

FIG. 29 shows an example of the logic used by the threshold comparator 680. The threshold comparator 680 operates as follows. The threshold comparator 680 utilizes the maximum and minimum SAD values from coarse SAD calculations and adjusts the threshold value based on the maximum and minimum SAD values. An example of the threshold adjustments is shown in FIG. 29, where thr_gain is the user programmable register value.

FIG. 30 shows an example output of the minima module 676. The minima module 676 operates as follows. The minimum SAD values from the three regions are compared with a threshold to determine the type of local minima of the angle detection if the SAD values are very close. A table in FIG. 30 shows the output of the minima module 676 and corresponding angle certainty (or uncertainty).

Figure 31A:
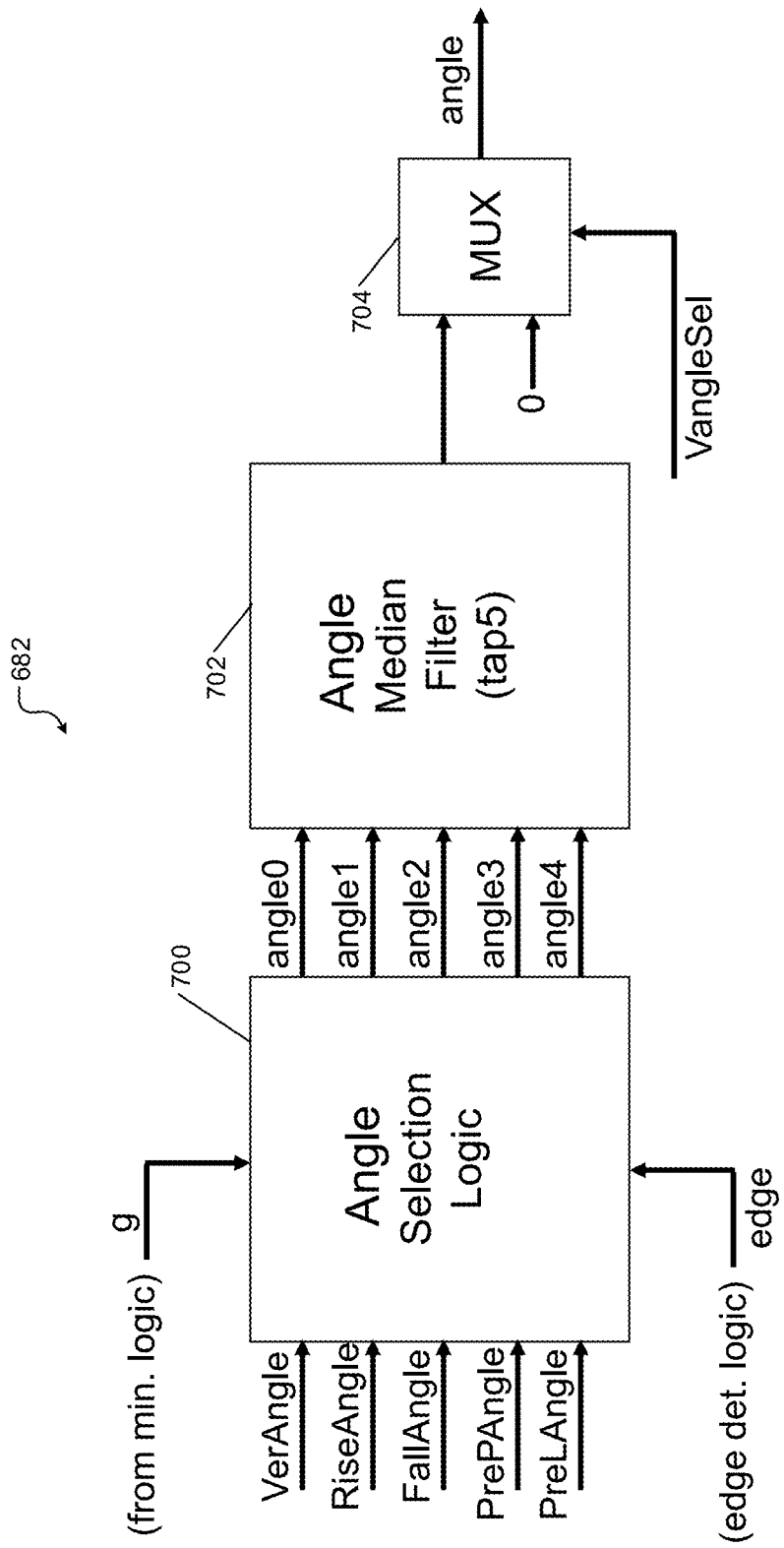
FIG. 31A is a functional block diagram of an angle classified median filter (CMF) used in the angle detector of FIG. 28.

FIGS. 31A and 31B show an example of the angle classified median filter (CMF) 682. In FIG. 31A, the angle CMF 682 includes an angle selector 700, an angle median filter 702, and a multiplexer 704. Angle selector 700 is connected to the angle median filter 702. The angle median filter 702 is connected to the multiplexer 704. The angle selector receives the output of the minima module 676 and the output of the edge detector 684. The multiplexer is controlled by the output of the threshold comparator 680. The annotations used in FIG. 31A include: PrePAngle: angle value at previous pixel, and PreLAngle: angle value at previous line.

The angle classified median filter (CMF) 682 operates as follows. The angle CMF 682 resolves any angle uncertainty using previous and current angle values. The angle selector 700 generates five more likely angle values (angle0-angle4) from the output of the minima module 676. As an example of the logic used by the angle selector 700, FIG. 31B shows a C-model when g=3, where rising and falling angles are in uncertainty. The angle median filter 702 filters the output of the angle selector 700. The multiplexer 704 selects the output of the angle median filter 702 or outputs 0 as the angle value based on the signal VangleSel received from the threshold comparator 680. The rounding module 686 rounds off the output of the multiplexer 704 to generate the raw angle output by the angle detector 640.

Figure 32:
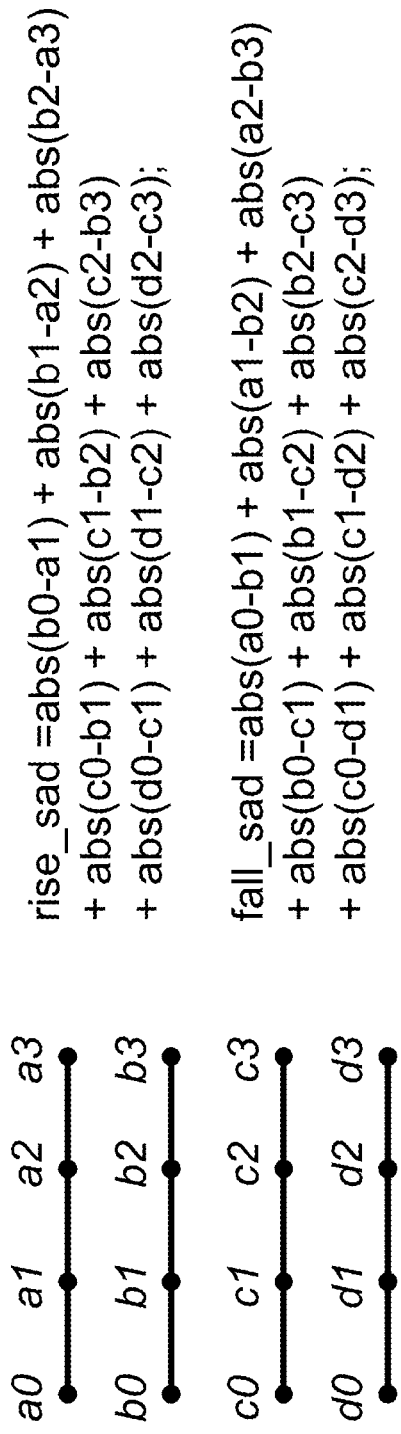
FIG. 32 shows an edge detector used in the angle detector of FIG. 28.

FIG. 32 shows the operation of the edge detector 684. The edge detector 684 determines horizontal line (edge), vertical line (edge), rising edge, and falling edge. Horizontal and vertical line detections are described with references to FIGS. 16A-17B, where the data to the detector is Y instead of absolute motion value. Rising and falling edge detections use 45 degree SAD calculations inside a (4×4) window. The details of the edge detection operation performed by the edge detector 684 are shown in FIG. 32, where a0-d3 denote pixel positions in the (4×4) window.

Figure 33:
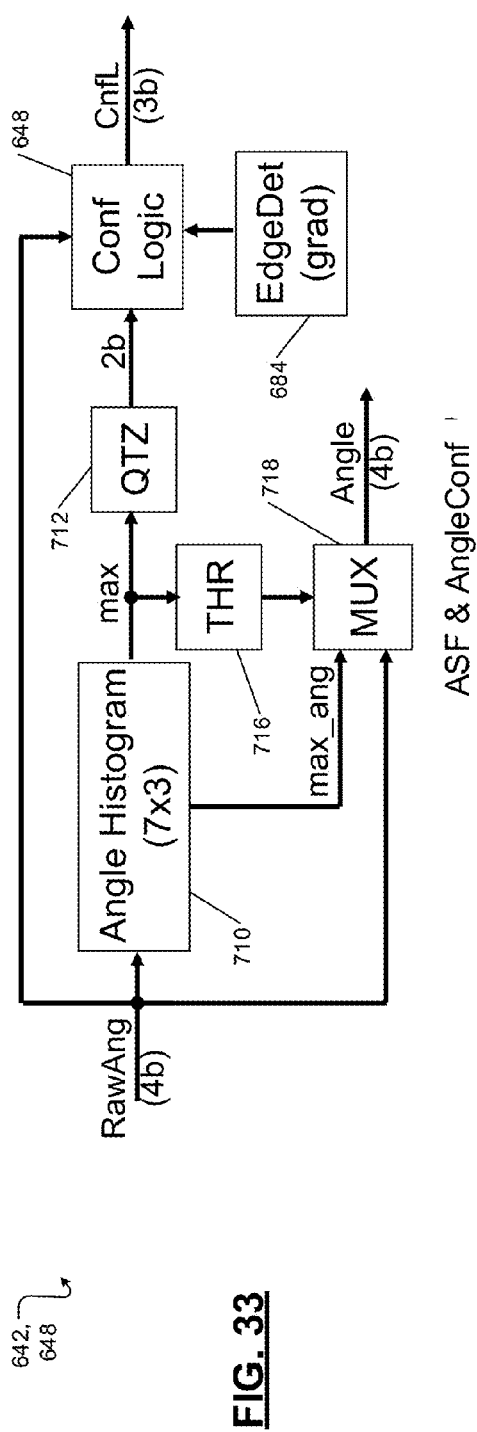
FIG. 33 is a functional block diagram of an angle stretch filter (ASF) and a confidence level estimator used in the angle detector of FIG. 28.

FIGS. 33 and 34 show an example implementation of the angle stretch filter (ASF) 642 and the confidence level estimator 648 of the spatial de-interlacer (SDI) 614 shown in FIG. 26. In FIG. 33, the angle stretch filter (ASF) 642 and the confidence level estimator 648 include a histogram module 710, a quantizer 712, the confidence level estimator 648, the edge detector 684, a threshold comparator 716, and a multiplexer 718. The histogram module 710 is connected to the quantizer 712, the threshold comparator 716, and the multiplexer 718. The quantizer 712 is connected to the confidence level estimator 648. The edge detector 684 is connected to the confidence level estimator 648. The threshold comparator 716 is connected to the histogram module 710, the quantizer 712, and the multiplexer 718. Each of the histogram module 710, the confidence level estimator 648, and the multiplexer 718 receives the raw angle generated by the angle detector 640.

The raw angle value generated by angle detector 640 may not be smooth enough for line interpolation. The angle stretch filter (ASF) 642 is used to replace some isolated false angle detections by its most consistent neighbor angle value. The confidence level estimator 648 estimates the confidence level of the new angle. The histogram module 710 is shared by both the angle stretch filter (ASF) 642 and the confidence level estimator 648. The angle value with a maximum histogram value will replace the original angle value if the histogram value is greater than or equal to a user-defined threshold value. The comparison is made by the threshold comparator 716 that controls the multiplexer 718. The multiplexer 718 outputs the raw angle or the angle value with the maximum histogram value depending on the comparison made by the threshold comparator 716. The histogram value is quantized to 2 bits by the quantizer 712, and the quantized histogram value is input to the confidence level estimator 648 together with the edge information generated by the edge detector 684, which is described with reference to FIG. 32. The confidence level estimator 648 generates a confidence level about the raw angle based on the quantized histogram value and the edge information. FIG. 34 shows an example of a portion of a C-model used by the confidence level estimator 648.

Figure 35:
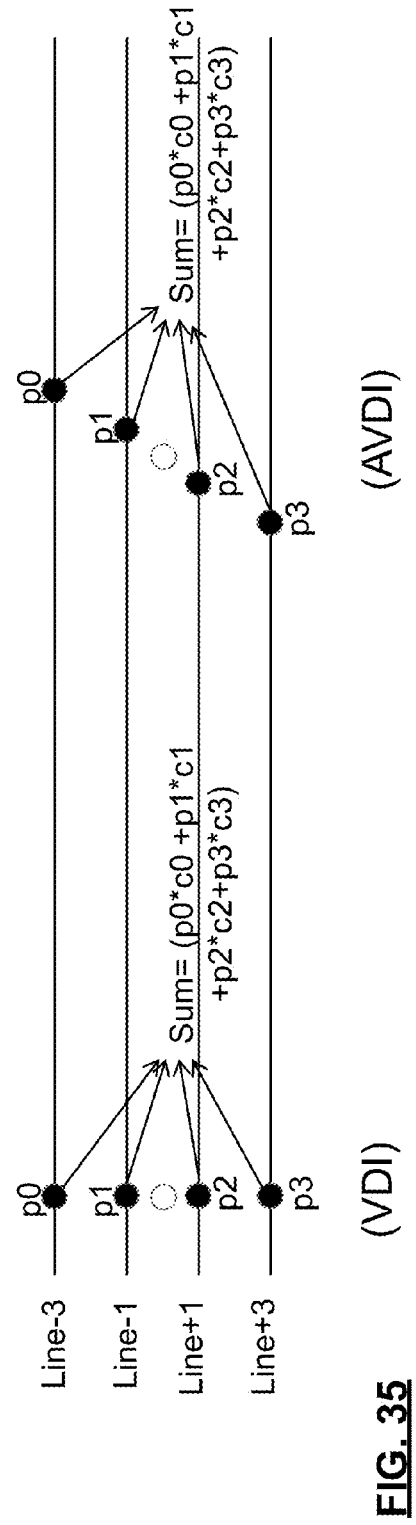
FIG. 35 shows an adaptive vertical interpolator (AVDI) and a vertical interpolator (VDI) of the spatial de-interlacer (SDI) of FIG. 26.

FIG. 35 shows an example of the adaptive vertical interpolator (AVDI) 644 and the vertical interpolator (VDI) 646 of the spatial de-interlacer (SDI) 614 shown in FIG. 26. In the example shown, the adaptive vertical interpolator (AVDI) 644 and the vertical interpolator (VDI) 646 both use tap4 vertical interpolation. The input pixels to the vertical interpolator (VDI) 646 are purely from 4 vertical lines. In contrast, the input pixels to the adaptive vertical interpolator (AVDI) 644 are adaptive to the angle value as shown in FIG. 35.

Figure 36:
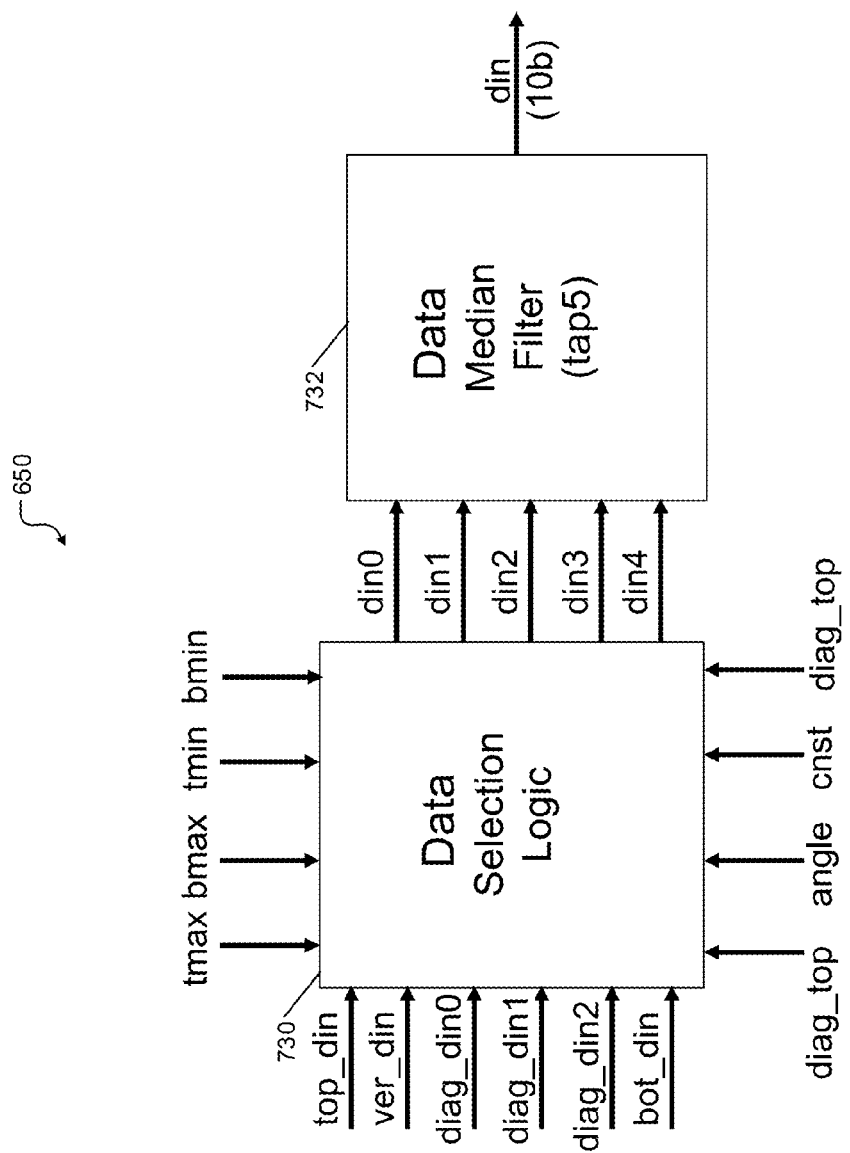
FIG. 36 is a functional block diagram of a classified median filter (CMF) used in the spatial de-interlacer (SDI) of FIG. 26.

FIG. 36 shows an example of the classified median filter (CMF) 650 of the spatial de-interlacer (SDI) 614 shown in FIG. 26. The CMF 650 includes a selector 730 and a median filter 732 connected to each other. The following annotations are used in FIG. 36: top_din: top-line pixel, bot_din: bottom-line pixel, ver_din: vertical interpolated pixel, diag_din0: full-angle adaptive interpolated pixel, diag_din1: half-angle adaptive interpolated pixel, diag_din2: 45-degree angle adaptive interpolated pixel, diag_top: diagonal top-line data, diag_bot: diagonal bottom-line data, tmax: top-line 3-pixel maximum value, bmax: bottom-line 3 pixel maximum value, tmin: top-line 3-pixel minimum value, and bmin: bottom-line 3 pixel minimum value.

The classified median filter (CMF) 650 reduces interpolation artifacts due to false angle value detections. The CMF 650 is similar to the angle CMF 682 used by the angle detector 640 in the angle processing. The selection logic of the CMF 650, however, is different than the selection logic of the angle CMF 682. Examples of operations performed by the CMF 650 include the following:

Calculate the vertical interpolated data named "ver_din"; Calculate the full-angle adaptive interpolated data named "diag_din0"; Calculate the half-angle adaptive interpolated data named "diag_din1"; Calculate the 45 degree angle adaptive interpolated data named "diag_din2"; Calculate maximum and minimum values of top and bottom line three pixels; Create the upper-bound and low-bound interpolated data thresholds; Upper-bound and low-bound thresholds use the top/bottom line maximum and minimum values plus and minus some user-defined offsets; The offsets are subjected contrast and angle adaptation; diag_din0 is first checked to see if (low_bound<=diag_din0<=upper_bound). If yes, use the following median filter: med[0]=top_din, med[1]= diag_din0; med[2]=bot_din; med[3]=diag_top_din0; med [4]=diag_bot_din0; OUT=MEDIAN5(med); If diag_din0 is not satisfied the bounding condition; diag_din1 is checked. If diag_din1 is also not satisfied, diag_din2 is checked and the same processing is followed; If all of them are not satisfied, then OUT=MEDIAN3(top_din, bot_din, diag_din0).

Figure 37:
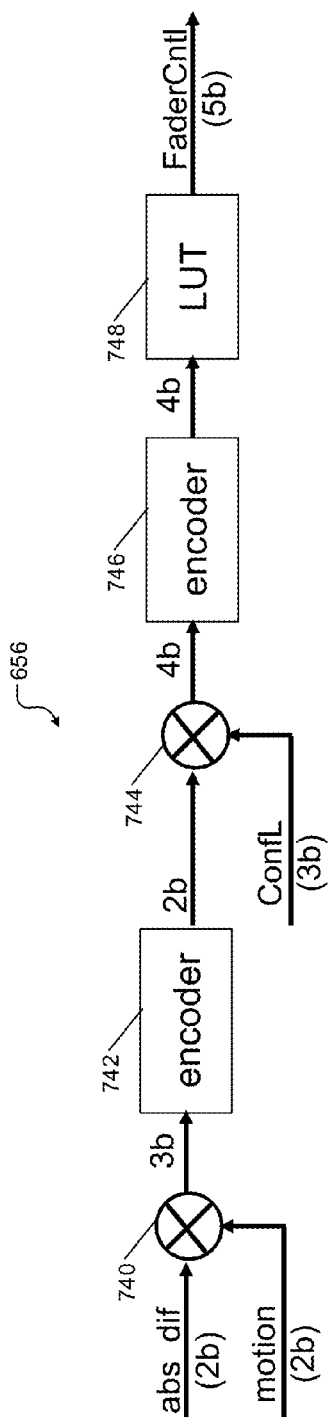
FIG. 37 is a functional block diagram of a combiner used in the spatial de-interlacer (SDI) of FIG. 26.

FIG. 37 shows an example of the combiner 656 that controls the fader 658 of the spatial de-interlacer (SDI) 614 shown in FIG. 26. The combiner 656 includes first and second mixers 740, 744; first and second encoders 742, 746; and a lookup table (LUT) 748. The first mixer 740 is connected to the encoder 742. The first encoder 742 is connected to the second mixer 744. The second mixer 744 is connected to the second encoder 746. The second encoder 746 is connected to the lookup table 748. The first mixer 740 receives the motion indication provided by a motion detector and an output of the quantizer 654. The first encoder 742 encodes the output of the first mixer 740. The second mixer 744 receives the output of the first encoder 742 and the output of the confidence level estimator 648. The second encoder 746 encodes the output of the second mixer 744. The lookup table 748 stores the output of the second encoder 746 and provides a control signal to control the fader 658. Thus, the combiner 656 combines the confidence level, motion level, and interpolated different level (between the AVDI 644 and the VDI 646) to generate the control signal to control the fader 658. The first and second encoders 742, 746 remove unused codes to reduce the size of LUT 748.

The UV channel de-interlacer 602 shown in FIG. 22A uses the vertical interpolation (AVDI 644 and/or the VDI 646) described with reference to the Y channel de-interlacer 600. The description of the vertical interpolation used by the UV channel de-interlacer 602 is therefore not repeated.

Figure 38:
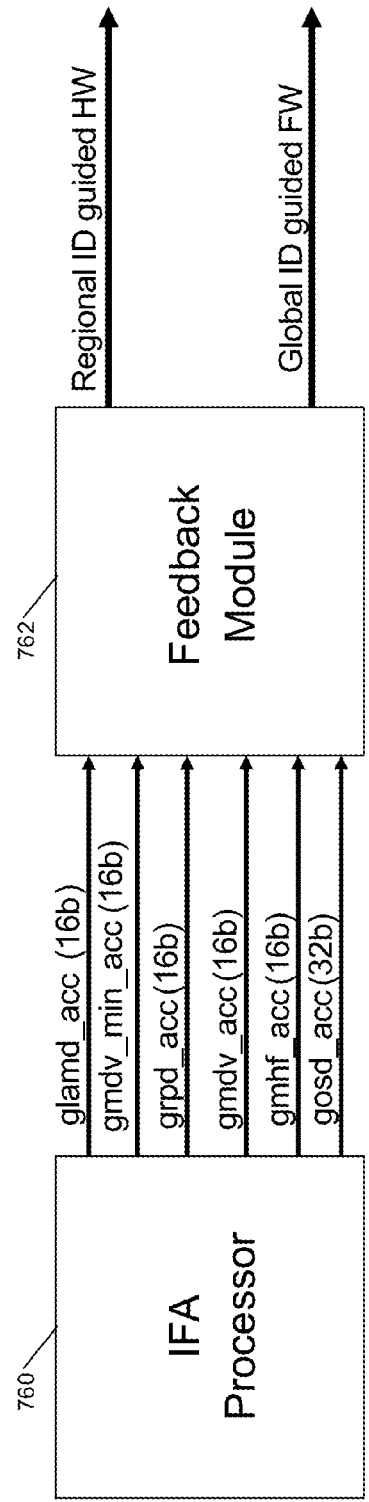
FIG. 38 is a functional block diagram of an image feature analyzer (IFA) used in the motion adaptive de-interlacer (MADI) of FIG. 3.
Figure 40:
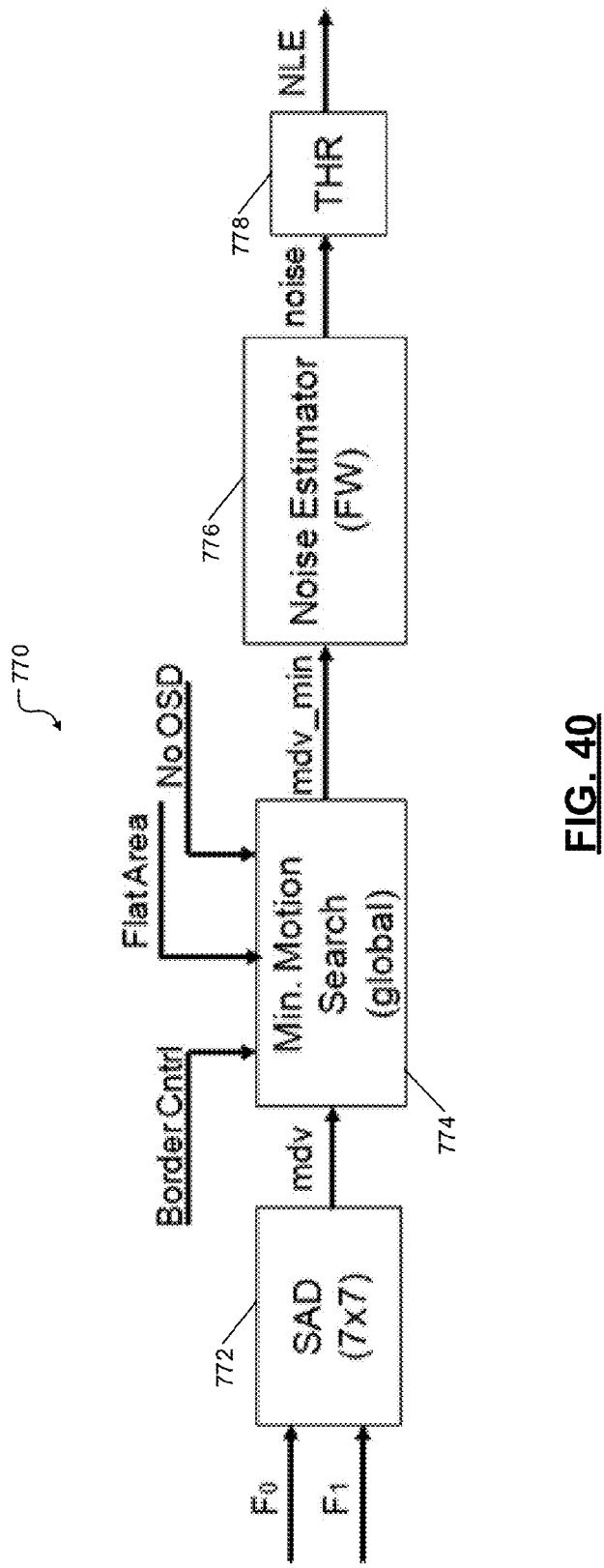
FIG. 40 is a functional block diagram of a global minimum motion detector used in the image feature analyzer (IFA) of FIG. 38.

FIGS. 38-40 show an example of the image feature analyzer (IFA) 124 shown in FIG. 3. In FIG. 38, the IFA 124 includes a processor 760 and a feedback module 762 connected to each other. The processor 760 is connected to the line buffer 104 and receives the interlaced frames Fin0 and Fin1 from the line buffer 104. The processor 760 processes the content of each of the interlaced frames Fin0 and Fin1. The feedback module 762 generates various indicators based on the processing performed by the processor 760. The indicators generated by the feedback module 762 output to the motion detector 120 and the de-interlacer 122 and are used to control operations of the motion detector 120 and the de-interlacer 122 as shown in FIG. 3.

The following annotations are used in FIG. 38: glamd_acc: global lamd count accumulation value, grpd_acc: global rpd count accumulation value, gmdv_acc: maximum number of motion pixels in an 7×7 array searched in a frame, gmdv_min_acc: minimum motion value in an 7×7 array searched in a frame, gmhf_acc: global high frequency count accumulation value, and gosd_acc: global SOSD count accumulation value.

The image feature analyzer (IFA) 124 increases the reliability of the de-interlacing performed by the motion-adaptive de-interlacer (MADI) 106 shown in FIG. 3 based on global or regional content analysis of the interlaced frames. The IFA 124 performs a global (frame level) analysis of the interlaced frames on frame by frame basis. The IFA 124 can be implemented using a combination of hardware, firmware, and software (e.g., the processor 760 and the feedback module 762), which may include accumulators, registers, data packaging/un-packaging logic for memory read/write operations, detectors, filters, and so on. FIG. 39 shows an example of global (based on an entire frame) indicators generated by the IFA 124.

FIG. 40 shows an example of a global minimum motion detector 770 included in the image feature analyzer (IFA) 124. The global minimum motion detector 770 includes a sum of absolute difference (SAD) module 772, a search module 774, a noise estimator 776, and a threshold comparator 778. The buffer 772 is connected to the search module 774. The search module 774 is connected to the noise estimator 776. The noise estimator 776 is connected to the threshold comparator 778.

The SAD module 772 is connected to the line buffer 104, receives the interlaced frames Fin0 and Fin1 from the line buffer 104, and generates SAD values based on the interlaced frames Fin0 and Fin1. The search module 774 performs minimum motion search for each frame and generates a minimum motion detection value based on the SAD values and various inputs. The various inputs include a border control signal that indicates border areas to be excluded from the motion search, a flat area signal indicating areas of low contrast, and an on-screen display (OSD) signal indicating areas with no OSD. The search module 774 generates a minimum motion detection signal for each frame. The noise estimator 776 estimates noise in the output of the search module 774. The threshold comparator and 78 compares the noise to a threshold and generates a noise level estimate (NLE). The noise level estimate can be used to adapt motion detection performed by the motion detector 120 shown in FIG. 3 (e.g., see FIG. 21 showing NLE used by the first and second quantizers 138, 140 of the motion detector 120 shown in FIG. 4).

FIGS. 41-57 show the advanced film mode detection (AFD) 108 shown in FIG. 1. The AFD 108 detects motion between fields of the interlaced frames Fin0 and Fin1 using field-based processing, detects a film mode of the interlaced frames Fin0 and Fin1 based on the detected motion, de-interlaces the interlaced frames Fin0 and Fin1 based on the detected motion and the detected film mode, and generates de-interlaced frames (Fout1 shown in FIG. 1). Additionally, the AFD 108 generates a control signal based on the detected motion and the detected film mode that is used to blend the de-interlaced frames output by the motion adaptive de-interlacing (MADI) 106 (Fout0 shown in FIG. 1) and the advanced film mode detection (AFD) 108 (Fout1 shown in FIG. 1) to generate final de-interlaced frames for rendering on a non-interlaced display (Fout shown in FIG. 1).

Figure 42:
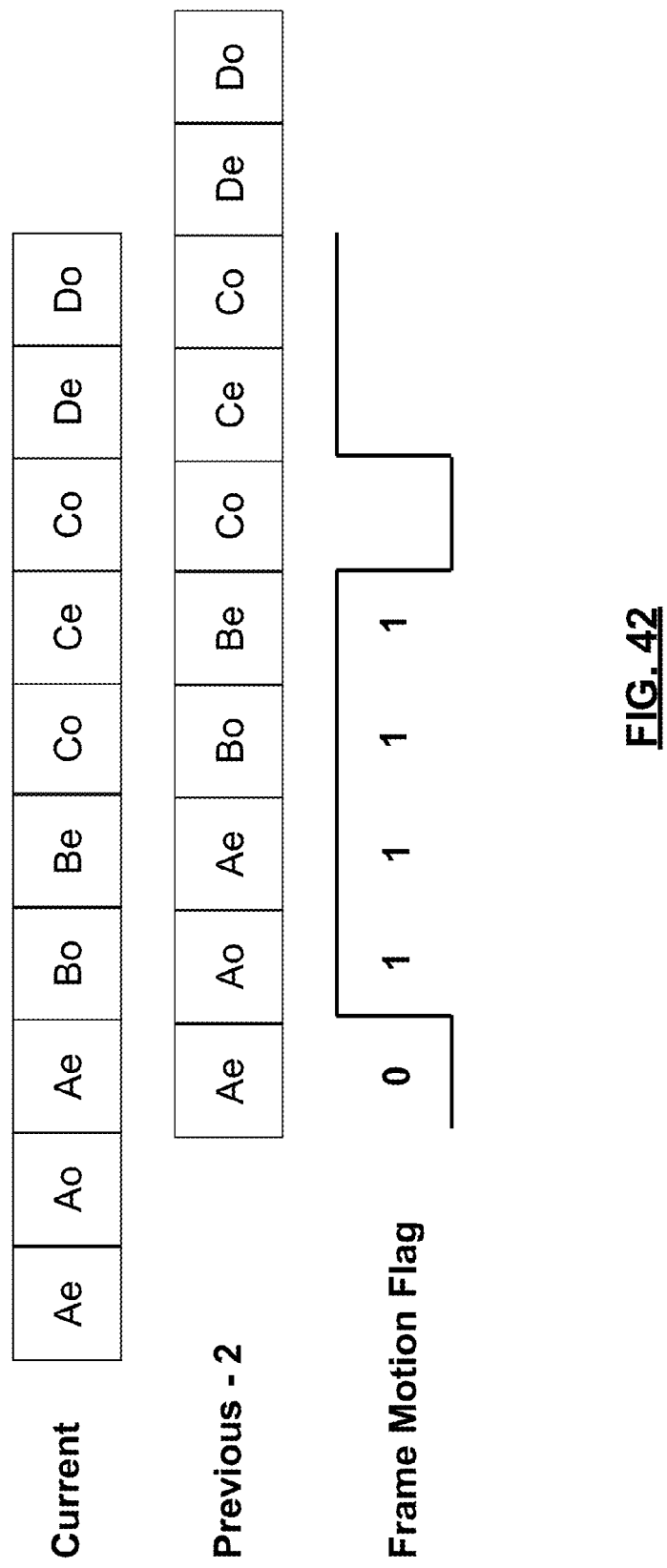
FIGS. 42 and 43 respectively show detection of 3:2 and 2:2 pulldowns.
Figure 43:
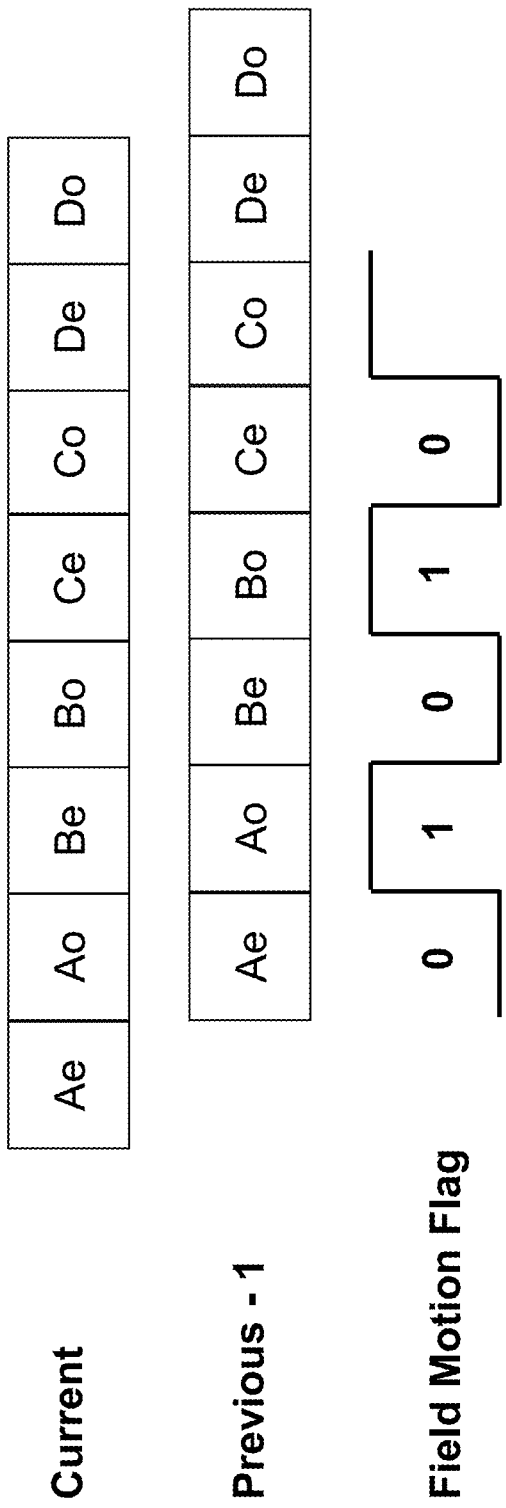

Before describing the architecture of the advanced film mode detection (AFD) 108, some concepts that will help in understanding the architecture are explained with references to FIGS. 41-43. Film and graphic materials are primarily shown at 24 or 30 Hz in a progressive fashion. Some film material is shown in 25 Hz progressive fashion as well. In order for films to be broadcasted through air and viewed on a TV set, a conversion process is required. This is typically called telecine, or a 3:2 pulldown conversion (where 24 Hz material is converted to 60 Hz), or 2:2 pulldown conversion (where 30 Hz material is converted to 60 Hz, and 25 Hz material is converted to 50 Hz).

FIG. 41 shows 3:2 standard video formats both in interlaced and progressive scans, where "o" and "e" respectively mean odd and even. In case of interlaced scan, the first film frame is shown over three consecutive images. The second film frame is displayed over two consecutive images. Similarly, in the form of progressive scan, the first two film frames are shown over three consecutive images. The second two film frames are also displayed over three consecutive images. For 2:2 pulldown, a similar conversion process is involved. Each film frame is shown for two consecutive images (interlaced) or is copied into one image (progressive).

FIG. 42 shows detection of 3:2 pulldown. If a current interlaced image is compared to the one in previous 2, a 0,1,1,1,1 pattern can be detected, where a 0 indicates no motion (global), and a 1 indicates some motion.

The terms previous 1 and previous 2 mean the following. Previous −1, also called previous 1, is defined as the field number with one field interval delay (NTSC=1/60 Sec.) from the current field in the time domain. For example, if current field is f2, then previous 1 is f1, if the time sequence is defined as 0, 1, 2, 3, . . . . Similar explanation follows for Previous −2.

FIG. 43 shows detection of 2:2 pulldown. The detection of 2:2 pulldown can be implemented in a similar manner using field comparison as in detection of 3:2 pulldown. If a current interlaced image is compared to the one in previous 1, a pattern 0,1,0,1,0 can be detected. The detection of 2:2 pulldown, however, is less reliable than detection of 3:2 pulldown. The reliability issue is due to the fact that for interlaced material, comparing consecutive images involves comparing data from different spatial locations (odd lines are compared to even lines).

To overcome this issue using field based motion detection, the advanced film mode detection (AFD) 108 utilizes a simple horizontal motion estimation (HME) to determine 0/1 field motion flag. The AFD 108 provides a significant improvement over the traditional method using field motion detection.

Figure 44:
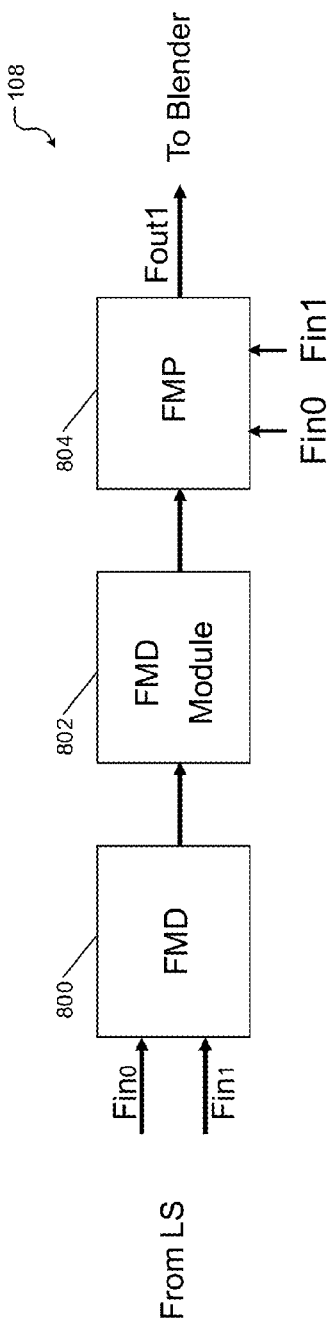
FIG. 44 is a functional block diagram of an advanced film mode detector (AFD) used in the de-interlacing system of FIG. 1.

FIG. 44 shows advanced film mode detection (AFD) 108. The AFD 108 includes a film mode motion detector (FMD) 800, an FMD module 802, and a film mode processor (FMP) 804. The film mode motion detector (FMD) 800 is connected to the FMD module 802. The FMD module 802 is connected to the film mode processor (FMP) 804. The FMD 800 and the FMP 804 are connected to the line buffer 104 and receive the interlaced frames Fin0 and Fin1 from the line buffer 104. The detailed operations of the FMD 800, the FMD module 802, and the FMP 804 are described below with references to FIGS. 45-57.

Briefly, the advanced film mode detection (AFD) 108 utilizes a combination of hardware (HW) and firmware (FW) solutions. The film mode motion detector (FMD) 800 includes a tap2 vertical de-interlacer (VDI) for 4 fields, a horizontal motion estimation (HME) both for fields 1/0 and fields 1/2, an 8 (2×4) region regional motion vector histogram accumulator (RMVA), two line bases static detectors, a block based low-contrast detector, and the film mode processor (FMP) 804 including Weave's switching logic, field-based motion detection logic, line based MV classification logic, and data output blending control logic, etc. The film mode motion detector (FMD) module 802 includes a global motion analyzer, cadence decision logic, and film mode lock and phase control logic, etc. These and other aspects of the advanced film mode detection (AFD) 108 are explained below in detail.

Figure 45:
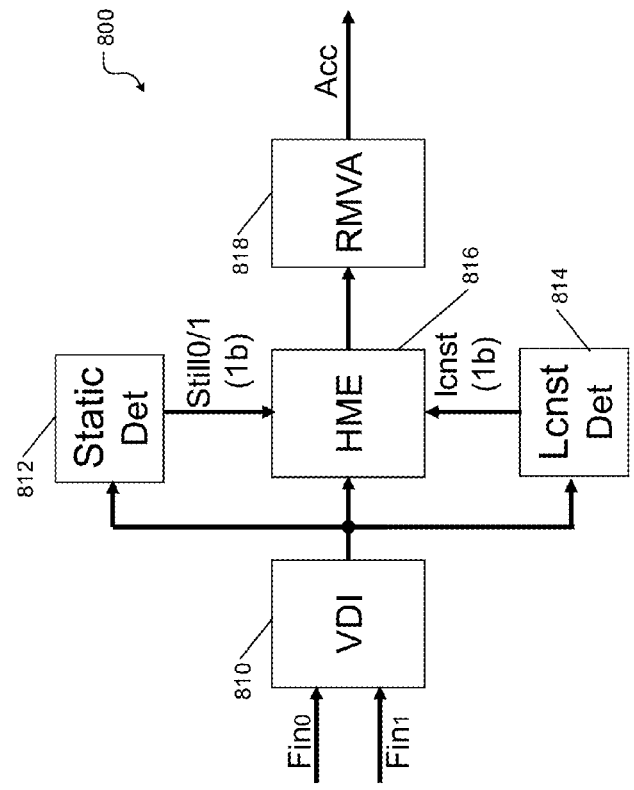
FIG. 45 is a functional block diagram of a film mode motion detector (FMD) used in the advanced film mode detector (AFD) of FIG. 44.

FIG. 45 shows the film mode motion detector (FMD) 800. The FMD 800 includes a vertical interpolator (also called vertical de-interlacer or VDI) 810, a static detector 812, a low contrast detector 814, a horizontal motion estimator (HME) 816, and a regional motion vector histogram accumulator (RMVA) 818. The vertical interpolator (VDI) 810 is connected to each of the static detector 812, the low contrast detector 814, and the horizontal motion estimator (HME) 816. The static detector 812 and the low contrast detector 814 are connected to the horizontal motion estimator (HME) 816. The horizontal motion estimator (HME) 816 is connected to the regional motion vector histogram accumulator (RMVA) 818. The detailed operations of the vertical interpolator (VDI) 810, the static detector 812, the low contrast detector 814, and the horizontal motion estimator (HME) 816 are described below with references to FIGS. 46A-50B.

Briefly, the vertical interpolator (VDI) 810 is connected to the line buffer 104, receives the interlaced frames Fin0 and Fin1 from the line buffer 104, interpolates the interlaced frames Fin0 and Fin1, and generates a plurality of interpolated fields (F0-F3 shown in FIG. 46). The static detector 812 compares motion in the plurality of interpolated fields, determines whether a field is repeated, and generates a plurality of static line indicators. The low contrast detector 814 detects a low contrast region in the plurality of interpolated fields and generates a low contrast indicator. The horizontal motion estimator (HME) 816 estimates motion in the plurality of interpolated fields, determines whether two adjacent ones of the plurality of interpolated fields belong to a single frame based on the plurality of static line indicators and the low contrast indicator, and generates a motion indicator (the second motion indicator) including a plurality of motion vectors indicating the estimated motion.

Two frames of video inputs (8bits) from the line buffer 104 are interpolated by vertical line doubling performed using vertical tap2 interpolators (VDI) to generate four single field spatial Bob's progressive outputs (F0-F3 shown in FIG. 46). The fields F0-F3 are used to generate motion vectors (by HME), static line indicators (by motion comparison), and low-contrast indicator (by edge comparison). The motion vectors are accumulated through 8 regional histogram accumulators (RMVA) for further processing by the film mode motion detector (FMD) module 802.

Figures 46A, 46B:
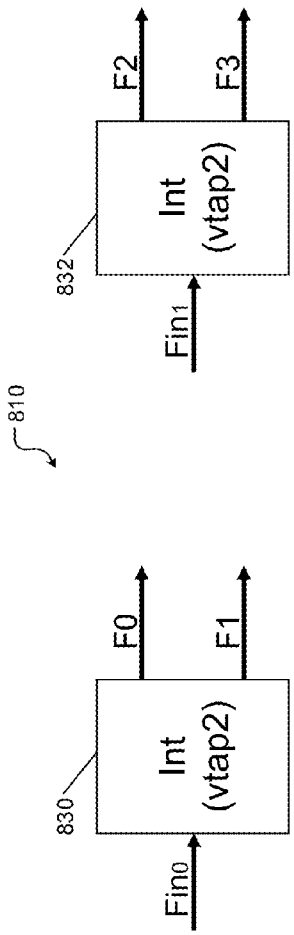
FIGS. 46A and 46B respectively show a vertical interpolator (VDI) used in the film mode motion detector (FMD) of FIG. 45 and the logic for the vertical interpolator (VDI).

FIGS. 46A and 46B show an example of the vertical interpolator (VDI) 810. In FIG. 46A, the vertical interpolator (VDI) 810 includes first and second interpolators 830, 832. The first and second interpolators 830, 832 are connected to the line buffer 104 and respectively receive the interlaced frames Fin0 and Fin1 from the line buffer 104. The first interpolator 830 interpolates the interlaced frame Fin0 and generates the interpolated fields F0 and F1. The second interpolator 832 interpolates the interlaced frame Fin1 and generates the interpolated fields F2 and F3. The interpolated fields F0-F3 are vertical interpolations of fields f0-f4 in the interlaced frames Fin0 and Fin1. FIG. 46B shows an example of the logic used by the vertical interpolator (VDI) 810 to interpolate the interlaced frames Fin0 and Fin1 and to generate the interpolated fields F0-F3.

Figure 47:
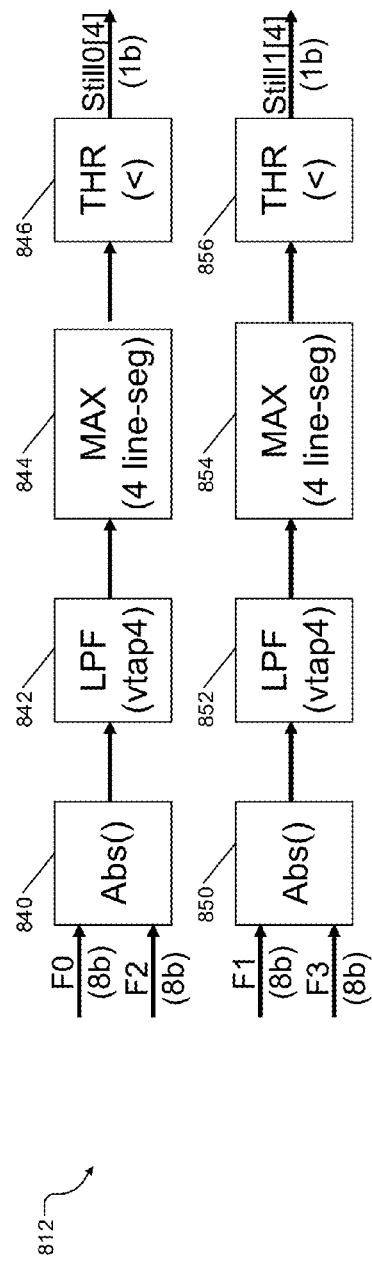
FIG. 47 is a functional block diagram of a static detector used in the film mode motion detector (FMD) of FIG. 45.

FIG. 47 shows an example of the static detector 812. The static detector 812 includes first and second absolute value generators 840, 850; first and second low-pass filters 842, 852; first and second maximum value selectors 844, 854; and first and second threshold comparators 846, 856. The first absolute value generator 840 is connected to the first low-pass filter 842. The first low-pass filter 842 is connected to the first maximum value selector 844. The first maximum value selector 844 is connected to the first threshold detector 846. The second absolute value generator 850 is connected to the second low-pass filter 852. The second low-pass filter 852 is connected to the second maximum value selector 854. The second maximum value selector 854 is connected to the second threshold comparator 856.

The static detector 812 determines whether pixels in a local area such as a whole line are in motion. The determination that the pixels in the local area are static (i.e., not in motion) is a sufficient but not necessary condition for two adjacent fields to belong to a same progressive frame. The static detector 812 determines if any fields are repeated during the 3:2 pull-down format conversions. The lines are divided into 4 horizontal segments as shown in FIG. 47.

The first absolute value generator 840, the first low-pass filter 842, the first maximum value selector 844, and the first threshold comparator 846 process two alternate interpolated fields (F0 and F2). The second absolute value generator 850, the second low-pass filter 852, the second maximum value selector 854, and the second threshold comparator 856 process two different alternate interpolated fields (F1 and F3).

The first absolute value generator 840 generates first absolute motion values based on the interpolated fields F0 and F2. The first low-pass filter 842 filters the first absolute maximum values generated by the first absolute value generator 840 and generates first filtered absolute motion values. The first threshold comparator 846 compares the first filtered absolute motion values to a threshold and generates a first still signal indicating whether pixels in the interpolated fields F0 and F2 are static (i.e., still) or are in motion.

The second absolute value generator 850 generates second absolute motion values based on the interpolated fields F1 and F3. The second low-pass filter 852 filters the second absolute maximum values generated by the second absolute value generator 850 and generates second filtered absolute motion values. The second threshold comparator 856 compares the second filtered absolute motion values to a threshold and generates a second still signal indicating whether pixels in the interpolated fields F0 and F2 are static (i.e., still) or are in motion.

Figure 48:
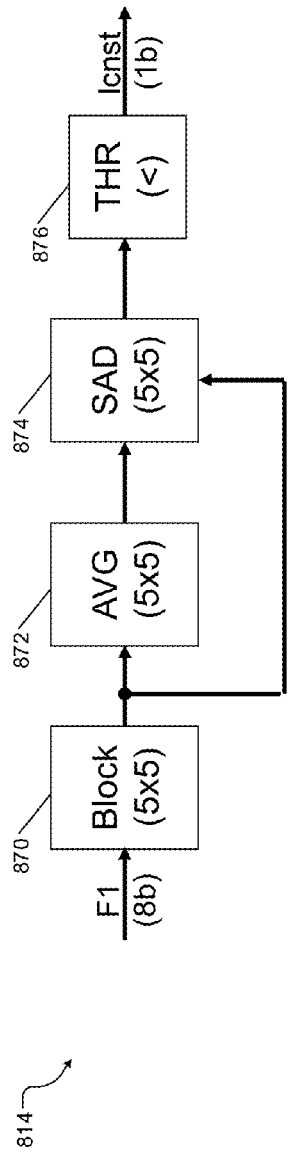
FIG. 48 is a functional block diagram of a low contrast detector used in the film mode motion detector (FMD) of FIG. 45.

FIG. 48 shows an example of the low contrast detector 814. The low contrast detector 814 includes a buffer 870, an average generator 872, a sum of absolute difference (SAD) module 874, and a threshold comparator 876. The buffer 870 is connected to the average generator 872 and the SAD module 874. The average generator 872 is connected to the SAD module 874. The SAD module 874 is connected to the threshold comparator 876.

The low contrast detector 814 processes data from a field F1 to generate 5×5 edge deviation value that is compared to a threshold to generate a low contrast indicator (lcnst). The low contrast detector 814 generates the low contrast indicator (lcnst) by processing a block of pixels in one interpolated field where the motion vectors generated by the horizontal motion estimator (HME) 816 may be unreliable or nonexistent. The low contrast indicator (lcnst) is used to specify a flat area (i.e., an area with pixels having low contrast or texture), where a motion vector (MV) may not exist or is less reliable. The HME 816 uses the low contrast indicator (lcnst) to generate a more reliable motion vector for a flat area.

The buffer 870 stores a block of pixels from one of the interpolated fields F1. The average generator 872 generates average motion values for the pixels. The SAD module 874 generates sum of absolute difference (SAD) values for the pixels based on inputs from the buffer 870 and the average generator 872. The threshold comparator 876 compares the SAD values to a threshold and generates the low contrast indicator (lcnst) based on the comparison.

Figure 49:
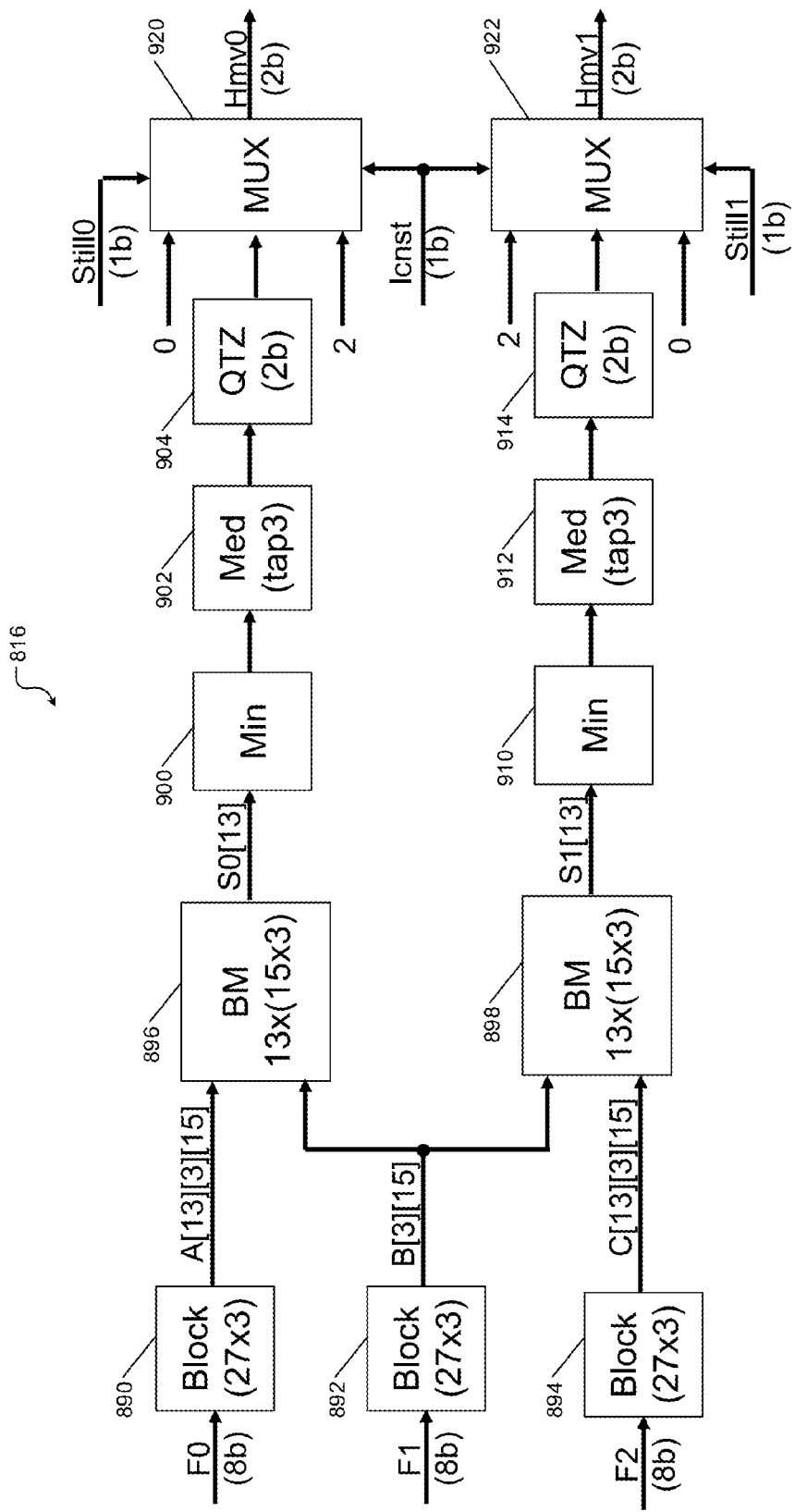
FIG. 49 is a functional block diagram of a horizontal motion estimator (HME) used in the film mode motion detector (FMD) of FIG. 45.

FIG. 49 shows an example of the horizontal motion estimator (HME) 816. The HME 816 determines if two adjacent fields have no displacement, which is the necessary and sufficient condition for the two fields to belong to the same progressive frame.

The HME 816 includes first, second, and third buffers 890, 892, 894; first and second matching modules 896, 898; first and second minima modules 900, 910; first and second median filters 902, 912; first and second quantizers 904, 914; and first and second multiplexers 920, 922. The first and third buffers 890, 894 are respectively connected to the first and second matching modules 896, 898. The second buffer 892 is connected to both first and second matching modules 896, 898. The first and second matching modules 896, 898 are respectively connected to the first and second minima modules 900, 910. The first and second minima modules 900, 910 are respectively connected to the first and second median filters 902, 912. The first and second median filters 902, 912 respectively connected to the first and second quantizers 904, 914. The first and second quantizers 904, 914 of respectively connected to the first and second multiplexers 920, 922.

The first, second, and third buffers 890, 892, 894 respectively receive the interpolated fields F0, F1, and F2. The field F1 is used to generate a reference block, and the fields F0 and F2 are used to generate two candidate blocks. The search range is +/−6 pixels, and the block size is 15×3. The first matching module 896 performs block matching between fields F0 and F1. The first minima module 900 generates a first minima from the output of the first matching module 896. The first median filter 902 filters the output of the first minima module 900. The first quantizer 904 quantizes the output of the first median filter 902 and generates a first quantized output. The first quantized output is input to the first multiplexer 920.

The second matching module 898 performs block matching between fields F1 and F2. The second minima module 910 generates a second minima from the output of the second matching module 898. The second median filter 912 filters the output of the second minima module 910. The second quantizer 914 quantizes the output of the second median filter 912 and generates a second quantized output. The second quantized output is input to the second multiplexer 922.

The first and second multiplexers 920, 922 respectively receive the first and second still signals from the static detector 812. Additionally, the first and second multiplexers 920, 922 receive the low contrast indicator (lcnst) from the low contrast detector 814. Based on the first and second quantized outputs, the first and second still signals, and the low contrast indicator, the first and second multiplexers 920, 922 respectively generate first and second motion vectors (Hmv0 and Hmv1) respectively indicating horizontal motion estimates for fields F0 and F1 and for fields F1 and F2. Each of the first and second motion vectors Hmv0 and Hmv1 has 2 bits. For each of the first and second motion vectors Hmv0 and Hmv1, values 0, 1, and 2 are respectively called a zero vector (ZV), a non-zero vector (NZV), and no-vector, with value 3 being don't care.

Figures 50A, 50B:
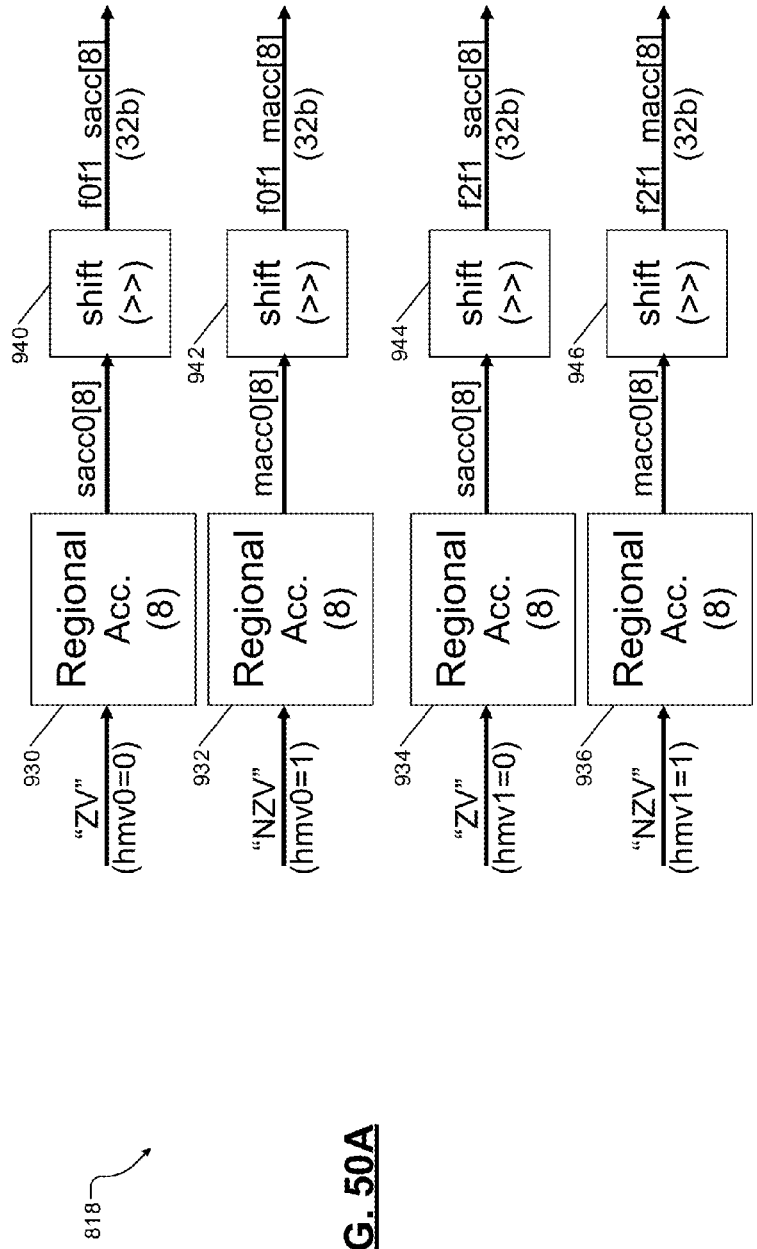
FIGS. 50A and 50B respectively show a regional motion vector histogram accumulator (RMVA) used in the film mode motion detector (FMD) of FIG. 45.

FIGS. 50A and 50B show an example of the regional motion vector histogram accumulator (RMVA) 818. The RMVA 818 informs the system 100 of the progressive or interlaced nature of video content in different image regions (i.e., blocks of pixels) so that the system 100 can decide whether to mix of MADI/AFD outputs. The RMVA 818 accumulates the "zero" and "non-zero" motion vectors histograms from the HME 816 for 8 non-overlapping image regions as shown in FIGS. 50A and 50B.

In FIG. 50A, the regional motion vector histogram accumulator (RMVA) 818 includes first through fourth accumulators 930-936 respectively connected to first through fourth shift modules 940-946. The first and third accumulators 930, 934 respectively accumulate the zero vectors (ZV) from the first and second motion vectors Hmv0 and Hmv1 output by the HME 816. The second and fourth accumulators 932, 936 respectively accumulate the nonzero vectors (NZV) from the first and second motion vectors Hmv0 and Hmv1 output by the HME 816. The first through fourth shift modules 940-946 respectively shift or adjust the magnitudes of the outputs of the first through fourth accumulators 930-936. The first shift module 940 outputs a static vector histogram between fields F0 and F1. The second shift module 942 outputs a motion vector histogram between fields F0 and F1. The third shift module 944 outputs a static vector histogram between fields F2 and F1. The fourth shift module 946 outputs a motion vector histogram between fields F2 and F1.

Figure 51:
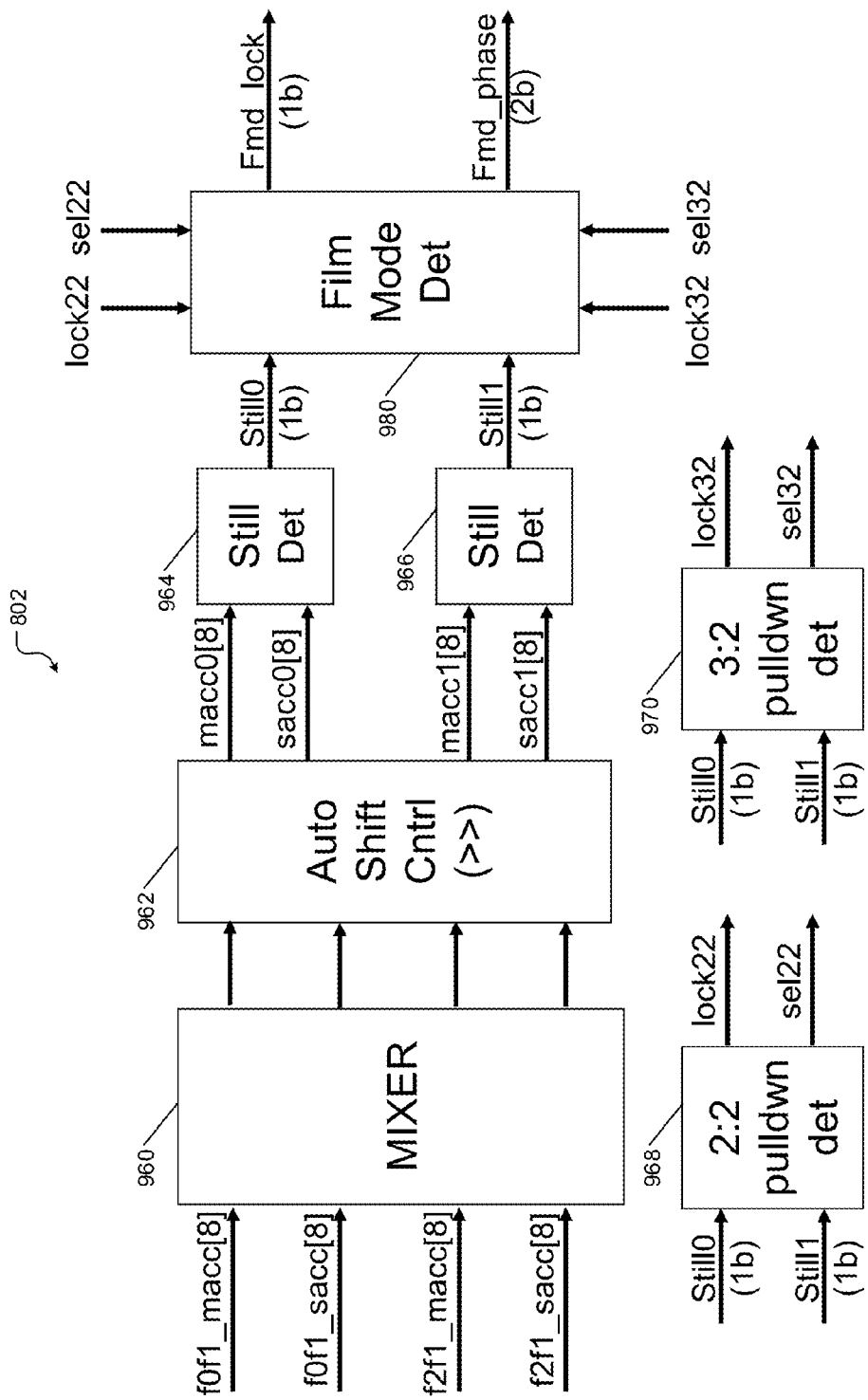
FIG. 51 is a functional block diagram of a film mode motion detector (FMD) module used in the advanced film mode detector (AFD) of FIG. 44.

FIG. 51 shows an example of the film mode motion detector (FMD) module 802 of FIG. 44. The FMD module 802 includes a software based film mode detection engine and logic generation. The FMD module 802 uses global motion/still information (histogram) from the regional motion vector histogram accumulator (RMVA) 818 to determine the following: If incoming video in the interlaced format is of progressive nature by generating a film or progressive mode flag; If yes, then provide a guideline or phase to inform the system how to jam two of three fields (e.g., F0F1 or F2F1). Since most film contents are 3:2 or 2:2 cadence, the FMD module 802 includes 3:2 and 2:2 cadence detections. The cadence detections enhance performance but are not necessary.

The film mode motion detector (FMD) module 802 includes a mixer 960; a shift control module 962; first and second still detectors 964, 966; first and second cadence detectors 968, 970; and a film mode detector 980. The mixer 960 is connected to the shift control module 962. The shift control module 962 is connected to the first and second still detectors 964, 966. The first and second still detectors 964, 966 are connected to the first and second cadence detectors 968, 970 and the film mode detector 980. The first and second cadence detectors 968, 970 are connected to the film mode detector 980.

The film mode motion detector (FMD) module 802 is connected to the regional motion vector histogram accumulator (RMVA) 818, receives the motion/static histograms from RMVA 818, and determines if the input video images are film, graphics, or other progressive sources. The FMD module 802 also decides how to generate the progressive output by informing the film mode processor (FMP) 804 how to jam two adjacent fields using Weave's method.

The mixer 960 is connected to the regional motion vector histogram accumulator (RMVA) 818 and receives the motion/static histograms from RMVA 818. The mixer 960 mixes 8 regional accumulator values between top and bottom accumulator values in order to weight scrolling text from bottom to top. The shift control module 962 generates accumulated motion values macc0 and macc1 respectively based on motion vector histogram between fields F0 and F1 and motion vector histogram between fields F2 and F1. The shift control module 962 generates accumulated static values sacc0 and sacc1 respectively based on static vector histogram between fields F0 and F1 and static vector histogram between fields F2 and F1. The shift control module 962 adjusts magnitudes of the outputs of the mixer 960 to force majority of accumulated motion values macc[8] to 0.

The first and second still detectors 964, 966 compare the outputs (accumulated motion values macc[8] and accumulates static values sacc[8]) of the shift control module 962 and the only significant difference between them is used to generate first and second still indicators still0 and still1. The first still detector 964 compares the accumulated motion values macc0 to the accumulated static values sacc0 corresponding to the fields F0 and F1 and generates the first still indicator still0. The first still indicator still0 indicates whether the fields F0 and F1 belong to the same progressive frame. The second still detector 966 compares the accumulated motion values macc1 to the accumulated static values sacc1 corresponding to the fields F2 and F1 and generates the second still indicator still1. The second still indicator still1 indicates whether the fields F2 and F1 belong to the same progressive frame.

Figure 52A:
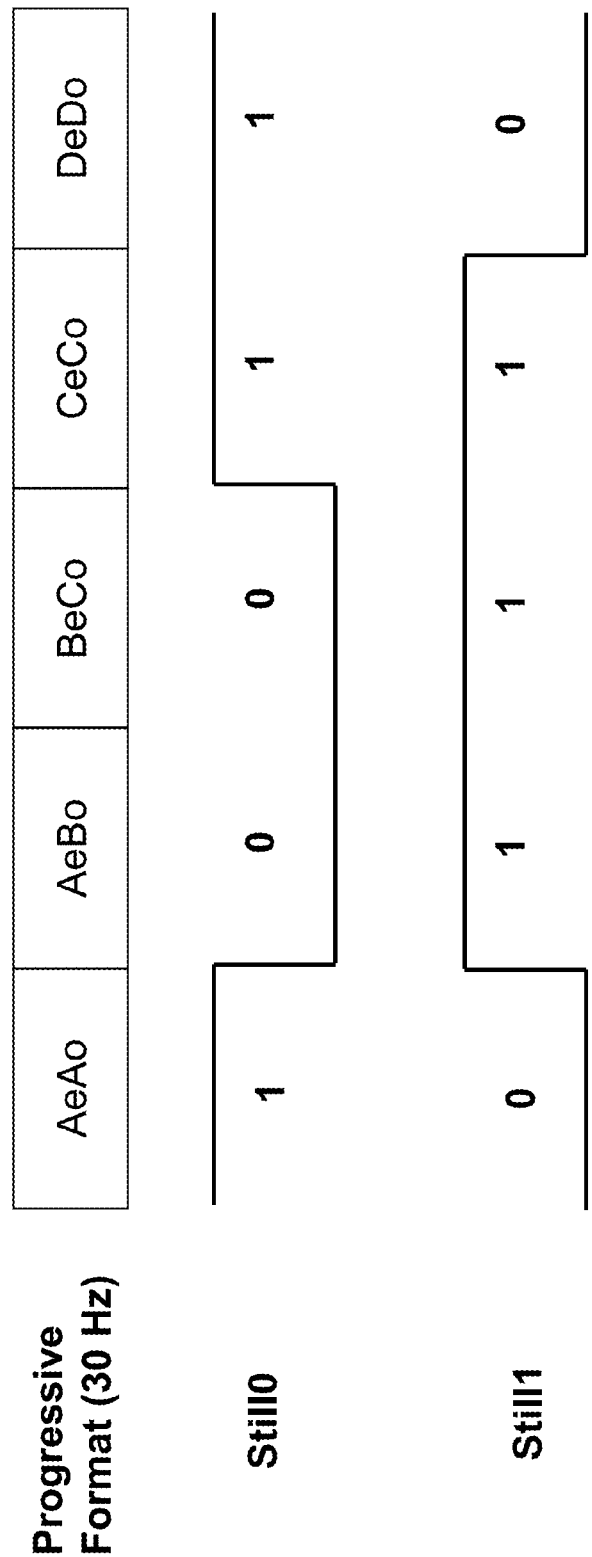

The first and second still indicators still0 and still1 are used to drive the first and second cadence detectors 968, 970 to generate 2:2, 3:2, or other cadence control signals (e.g., lock22 and sel22 for 2:2 cadence; lock32 and sel32 for 3:2 cadence). The first and second cadence detectors 968, 970 detect 2:2 or 3:2 cadence based on the two still indicators still0 and still1. The first cadence detector 968 generates the first cadence control signals lock22 and sel22 if 2:2 cadence is detected. The second cadence detector 970 generates the second cadence control signals lock32 and sel32 if 3:2 cadence is detected. FIGS. 52A and 52B respectively show examples of 3:2 and 2:2 pulldown still patterns.

The film mode detector 980 detects the film mode based on the first and second still indicators still0 and still1 and the first and second cadence control signals. The film mode detector 980 outputs two control signals based on the detected film mode: a film mode lock signal and a film mode phase signal. These two signals are used by the film mode processor (FMP) 804 to generate the de-interlaced output Fout1 of the advanced film mode detector (AFD) 108 and to generate the control signal used by the blender 110 to blend the de-interlaced outputs Fout0 and Fout1 of the motion adaptive de-interlacing (MADI) 106 and the advanced film mode detector (AFD) 108 as shown in FIGS. 1 and 53.

Figure 53:
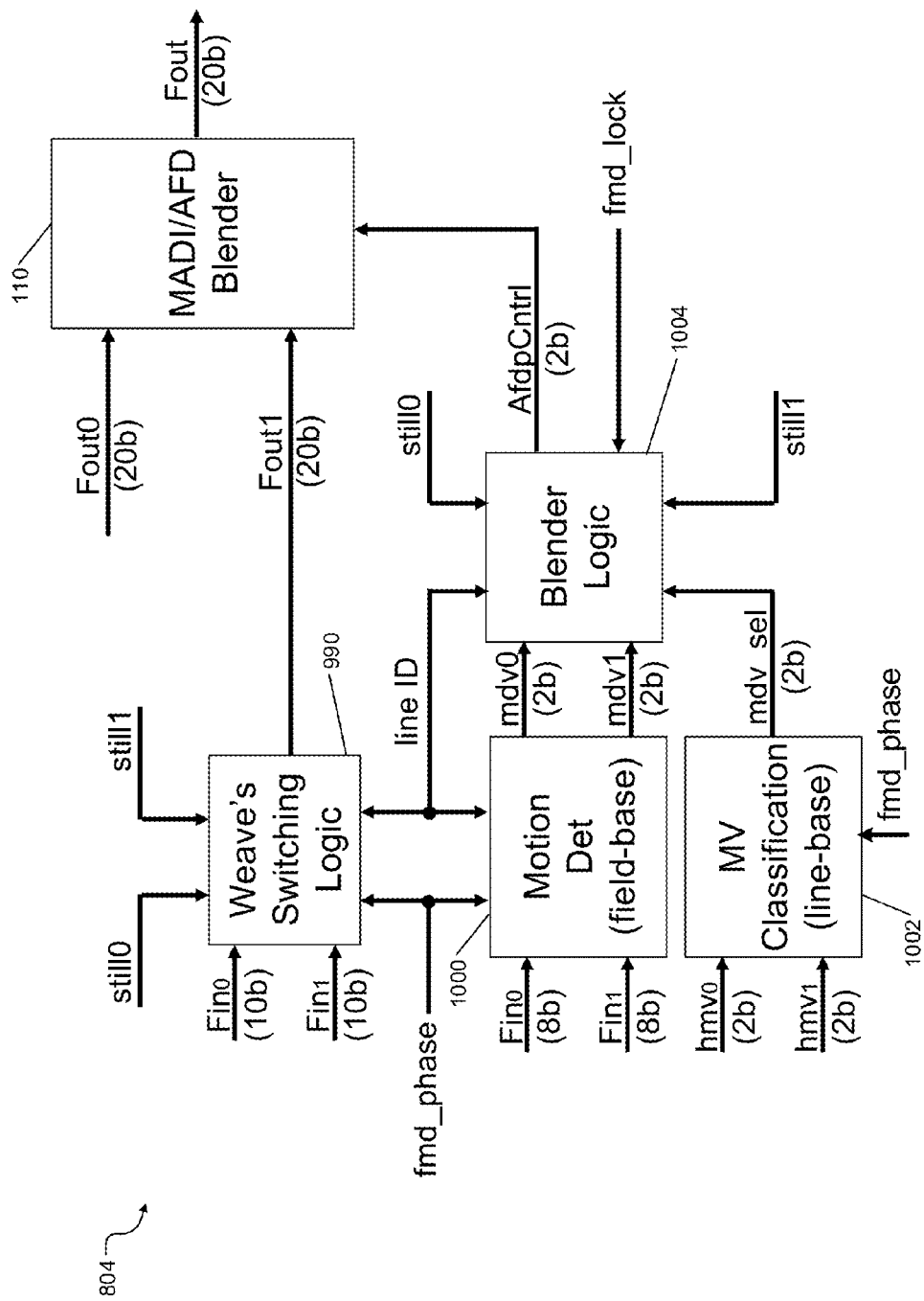
FIG. 53 is a functional block diagram of a film mode processor (FMP) used in the advanced film mode detector (AFD) of FIG. 44.

FIG. 53 shows an example of the film mode processor (FMP) 804 of FIG. 44 and the blender 110 of FIG. 1. The FMP 804 generates fully de-interlaced output Fout1 by jamming two out of three field inputs using Weave's method. To fix film/video mixed contents such as scrolling text or moving logo, etc., some local patching logic is used, including field based motion detection, line based motion vector classification, and MADI/AFD blending logic as described below.

The film mode processor (FMP) 804 includes a de-interlacer 990, a motion detector 1000, a motion vector classifier 1002, and a blender 1004. The de-interlacer 990 is connected to the motion detector 1000 and the blender 1004. The motion detector 1000 and the motion vector classifier 1002 are connected to the blender 1004. The de-interlacer 990 and the blender 1004 are connected to the blender 110.

The de-interlacer 990 is connected to the line buffer 104 and receives the interlaced frames Fin0 and Fin1 from the line buffer 104. The de-interlacer 990 is connected to the first and second still detectors 964, 966 and receives the first and second still indicators still0 and still1 from the first and second still detectors 964, 966. The de-interlacer 990 is connected to the film mode detector 980 and receives the film mode phase signal from the film mode detector 980. The de-interlacer 990 receives a line ID generated by the motion detector 1000 (explained below with reference to FIG. 54). Based on the inputs received, the de-interlacer 990 de-interlaces the interlaced frames Fin0 and Fin1 received from the line buffer 104, generates the de-interlaced output Fout1 of the AFD 108, and outputs the de-interlaced output Fout1 of the AFD 108 to the blender 110 of the system 100. FIG. 56 shows an example of the logic used by the de-interlacer 990.

The motion detector 1000 is connected to the line buffer 104 and receives the interlaced frames Fin0 and Fin1 from the line buffer 104. The motion detector 1000 is connected to the film mode detector 980 and receives the film mode phase signal from the film mode detector 980. Based on the inputs received, the motion detector 1000 performs field-based motion detection, generates motion vectors mdv0 and mdv1, and outputs the motion vectors mdv0 and mdv1 to the blender 1004.

The motion vector classifier 1002 is connected to the horizontal motion estimator (HME) 816 shown in FIG. 45 and receives the motion vectors hmv0 and hmv1 from the HME 816. The motion vector classifier 1002 is connected to the film mode detector 980 and receives the film mode phase signal from the film mode detector 980. Based on the inputs received, the motion vector classifier 1002 processes the motion vectors received from the HME 816 using a line-based processing (explained below with reference to FIGS. 55A and 55B), generates a control signal mdv_sel, and outputs the control signal mdv_sel to the blender 1004.

The blender 1004 receives the motion vectors mdv0 and mdv1 and the line ID from the motion detector 1000 and the control signal mdv_sel from the motion vector classifier 1002. The blender 1004 is connected to the film mode detector 980 and receives the film mode lock signal from the film mode detector 980. The blender 1004 is connected to the first and second still detectors 964, 966 and receives the first and second still indicators still0 and still1 from the first and second still detectors 964, 966. Based on the inputs received, the blender 1004 blends the motion vectors mdv0 and mdv1, generates a control signal AfdpCntrl, and outputs the control signal AfdpCntrl to the blender 110 of the system 100. The blender 110 blends the first and second interlaced outputs Fout0 and Fout1 of the motion adaptive de-interlacing (MADI) 106 and the advanced film mode detector (AFD) 108 based on the control signal AfdpCntrl. The control signal AfdpCntrl informs the blender 110 in what proportion, if any, to mix the first and second interlaced outputs Fout0 and Fout1.

Figure 54:
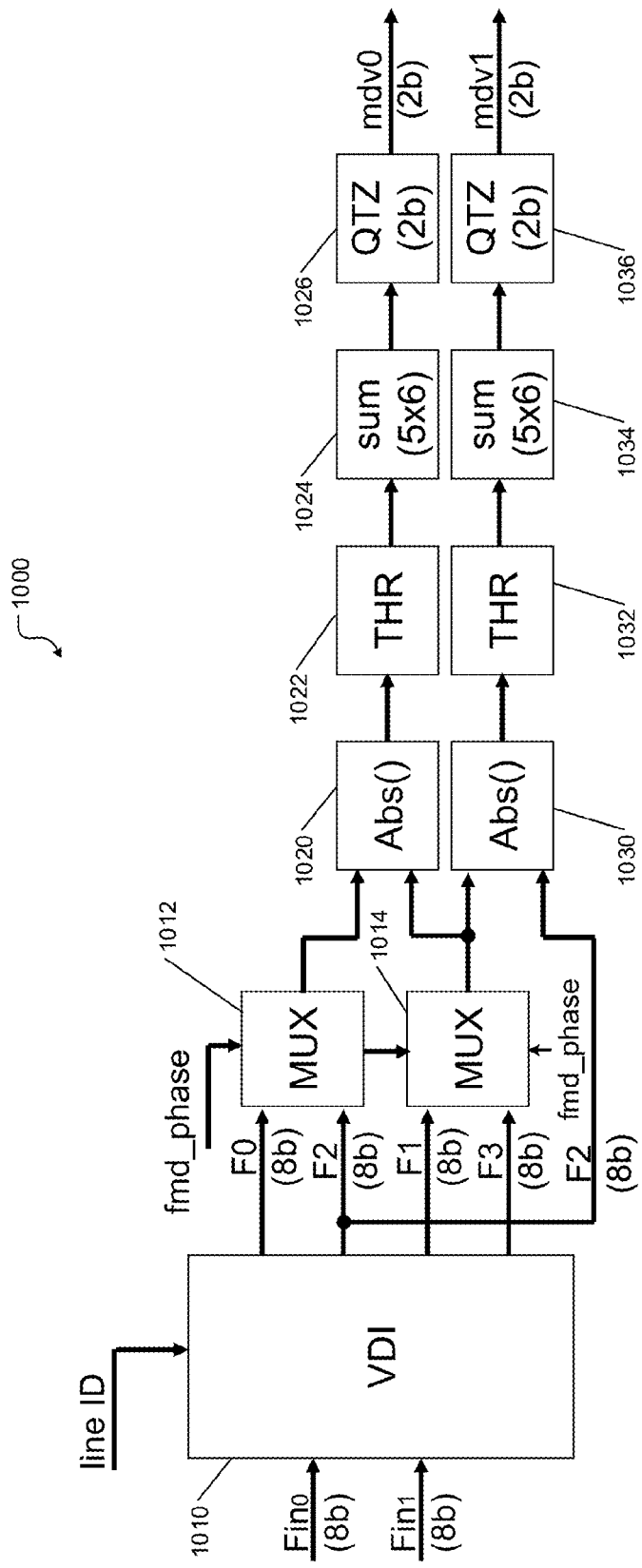
FIG. 54 is a functional block diagram of a motion detector used in the film mode processor (FMP) of FIG. 53.

FIG. 54 shows an example of the motion detector 1000. The motion detector 1000 includes a vertical interpolator (also called vertical de-interlacer or VDI) 1010; first and second multiplexers 1012, 1014; first and second absolute value generators 1020, 1030; first and second threshold comparators 1022, 1032; first and second summing modules 1024, 1034; and first and second quantizers 1026, 1036.

The vertical interpolator (VDI) 1010 is connected to the first and second multiplexers 1012, 1014. The first and second multiplexers 1012, 1014 are respectively connected to the first and second absolute value generators 1020, 1030. Additionally, an output of the VDI 1010 and the second multiplexer 1014 are connected to the second absolute value generator 1030. The first and second absolute value generators 1020, 1030 are respectively connected to the first and second threshold comparators 1022, 1032. The first and second threshold comparators 1022, 1032 are respectively connected to the first and second summing modules 1024, 1034. The first and second summing modules 1024, 1034 are respectively connected to the first and second quantizers 1026, 1036.

The motion detector 1000 is designed to fix mixed contents between film and video such as moving logo or vertical scrolling text, etc. Two progressive input frame images are first de-interlaced using the vertical interpolator (VDI) 1010 to generate four single field progressive fields F0-F3. Based on Weave's phase of a film mode, a motion difference between two fields is created at each pixel by a threshold value. A sum of motion pixels in a 5×6 block is used to generate 2 bit motion vectors.

The vertical interpolator (VDI) 1010 is connected to the line buffer 104 and receives the interlaced frames Fin0 and Fin1 from the line buffer 104. The vertical interpolator (VDI) 1010 is similar to the vertical interpolator (VDI) 810 shown and described with references to FIGS. 45 and 46A-46B and is therefore not described again. The vertical interpolator (VDI) 1010 generates the four interpolated fields F0-F3 similar to those generated by the vertical interpolator (VDI) 810.

The first and second multiplexers 1012, 1014 are connected to the film mode detector 980 and receive the film mode phase signal from the film mode detector 910. The first multiplexer 1012 multiplexes the interpolated fields F0 and F2 and generates a first output. The second multiplexer 1014 multiplexes the interpolated fields F1 and F3 and generates a second output. The first absolute value generator 1020 generates a first absolute value based on the first and second outputs of the first and second multiplexers 1012, 1014. The second absolute value generator 1030 generates a second absolute value based on the second output of the second multiplexer 1014 and the interpolated field F2 received from the vertical interpolator (VDI) 1010. The first and second threshold comparators 1022, 1032 respectively compare the first and second absolute values to a threshold. The first and second summing modules 1024, 1034 generate first and second sums based on the first and second threshold values for an array of pixels (e.g., 5×6). The first and second quantizers 1026, 1036 respectively quantize the first and second sums and generate the first and second motion vectors mdv0 and mdv1 of the motion detector 1000.

Figures 55A, 55B:
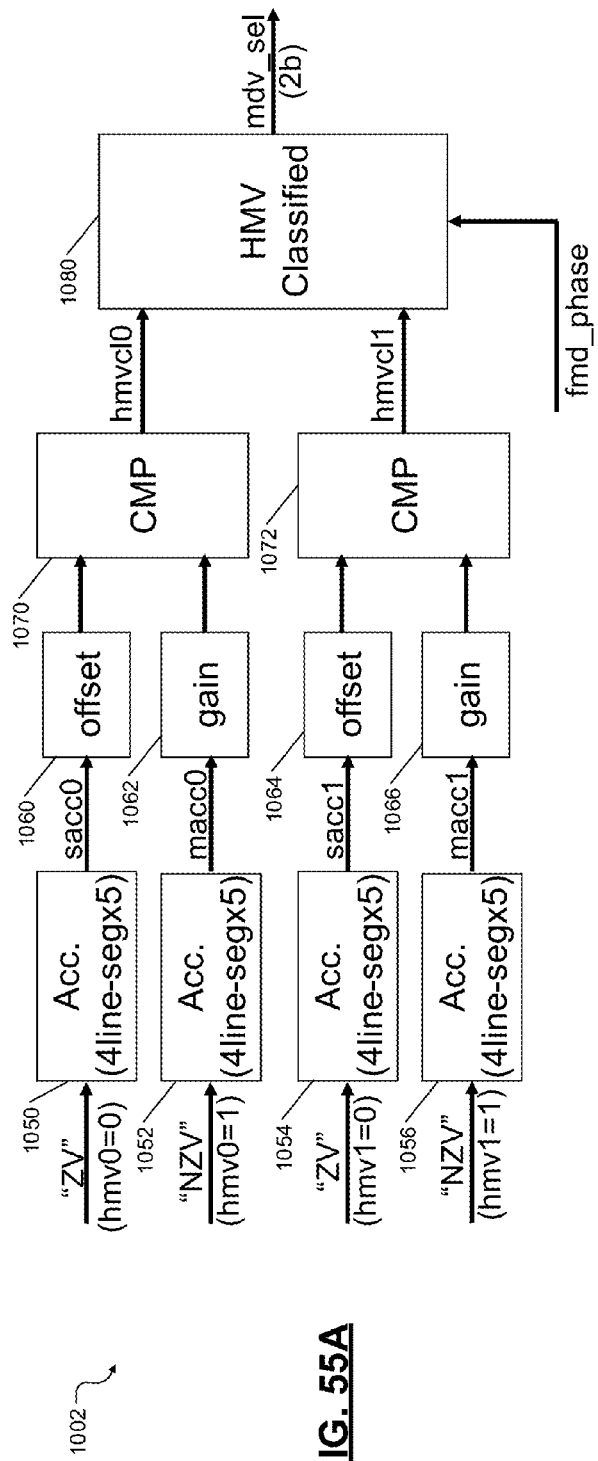
FIGS. 55A and 55B respectively show a motion vector classifier used in the film mode processor (FMP) of FIG. 53 and the logic for the motion vector classifier.

FIGS. 55A and 55B show an example of the motion vector classifier 1002. The motion vector classifier 1002 includes first through fourth accumulators 1050-1056; first and second offset modules 1060, 1064; first and second gain modules 1062, 1066; first and second comparators 1070, 1072; and a combiner 1080. The first and third accumulators 1050, 1054 are respectively connected to the first and second offset modules 1060, 1064. The second and fourth accumulators 1052, 1056 are respectively connected to the first and second gain modules 1062, 1066. The first offset and gain modules 1060, 1062 are connected to the first comparator 1070. The second offset and gain modules 1064, 1066 are connected to the second comparator 1072. The first and third comparators 1070, 1072 are connected to the combiner 1080.

The motion vector classifier 1002 is designed to fix artifacts due to horizontally scrolling text (video) overlaid into film contents. The motion vectors hmv0 and hmv1 from the motion detector 100 are accumulated over four segment lines in order to generate the histograms for "ZV" and "NZV". Then the histograms are compared and quantized to form hmv confidence levels hmvcl0 and hmvcl1. The confidence levels hmvcl0 and hmvcl1 are combined and classified based on the fmd_phase to detect any potentially scrolling text. FIG. 55B shows an example of the logic used by the motion vector classifier 1002.

In FIG. 55A, the first and third accumulators 1050, 1054 respectively accumulate the zero vectors (ZV) from the first and second motion vectors Hmv0 and Hmv1 output by the HME 816. The second and fourth accumulators 1052, 1056 respectively accumulate the nonzero vectors (NZV) from the first and second motion vectors Hmv0 and Hmv1 output by the HME 816. The first and third accumulators 1050, 1054 respectively generate accumulated static values sacc0 and sacc1. The second and fourth accumulators 1052, 1056 respectively generate accumulated motion values macc0 and macc1. The first and second offset modules 1060, 1064 respectively offset the accumulated static values sacc0 and sacc1 and generate first and second offset outputs. The first and second gain modules 1062, 1066 respectively scale the accumulated motion values macc0 and macc1 and generate first and second scaled outputs. The first comparator 1070 compares the first offset and scaled outputs and generates a first confidence level Hmvcl0 for the motion vector Hmv0. The second comparator 1072 compares the second offset and scaled outputs and generates a second confidence level Hmvcl1 for the motion vector Hmv1. The combiner 1080 combines the first and second confidence levels Hmvcl0 and Hmvcl1 based on the film mode phase signal from the film mode detector 1080 to generate the control signal control signal mdv_sel, which is output to the blender 1004. FIG. 57 shows an example of the logic used by the blender 1004.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

What is claimed is:

1. A system comprising:
a motion adaptive de-interlacer configured to determine a first output by de-interlacing a plurality of interlaced frames based on at least a first motion indicator indicating motion between fields of the plurality of interlaced frames;
a film mode detector configured to determine a second output based on a film mode detected based on at least a second motion indicator indicating motion between fields of the plurality of interlaced frames, the film mode detector further configured to output a control signal based on the second motion indicator and the film mode; and
a combiner configured to combine the first output and the second output based on the control signal,
wherein the motion adaptive de-interlacer comprises:
a motion detector configured to receive the plurality of interlaced frames and to generate the first motion indicator;
a de-interlacer configured to receive the plurality of interlaced frames and to generate the first output by de-interlacing the plurality of frames based on the first motion indicator; and
an image feature analyzer configured to analyze content of each of the plurality of frames and to control the motion detector and the de-interlacer based on the analyzed content; and
wherein the motion detector further comprises:
a first blender configured to blend a first motion vector and a second motion vector respectively indicating motion detected in first channel components and second channel components of the plurality of interlaced frames based on a first control input and to generate a first blended output;
a second blender configured to blend the first motion vector and the second motion vector based on a second control input and to generate a second blended output;
a first quantizer configured to quantize the first blended output; and
a second quantizer configured to quantize the second blended output,
wherein the motion detector is further configured to generate the first motion indicator based on the first and second quantized outputs.

2. The system of claim 1, wherein the motion detector is configure to select at least one of a Large Area Motion Detector (LAMD), a Large Area Static Detector (LASD), a Static On-screen Display Detector (SOSD), and a Low Contrast/Texture Detector (LCND) based on the first motion indicator.

3. The system of claim 2, wherein:
the Large Area Motion Detector (LAMD) is configured to detect motion in a group of pixels in first channel components of the plurality of interlaced frames and to generate a first motion information indicating whether the motion in the group of pixels is in horizontal direction, vertical direction, or in horizontal and vertical directions;
the Large Area Static Detector (LASD) is configured to detect static pixels in a group of pixels in the first channel components and to generate a second motion information indicating detection of static pixels in the group of pixels; and
the Static On-screen Display Detector (SOSD) is configured to detect static on screen display in a group of pixels in the first channel components and to generate a third motion information indicating detection of static on screen display in the group of pixels.

4. The system of claim 3, further comprising:
a first filter configured to stretch the motion detected in a group of pixels in the first channel components in horizontal direction, vertical direction, or in horizontal and vertical directions based on the first motion information; and
a second filter configured to cancel noise from a group of pixels in the first channel components based on one or more of the second motion information and the third motion information.

5. The system of claim 4, wherein:
the first filter is further configured to apply different weight and gain values to the pixels in the horizontal direction, vertical direction, or in horizontal and vertical directions; and
the second filter is further configured to cancel the noise by processing the pixels using an absolute sum of values technique instead of using sum of absolute values technique and by applying different gain for the second motion information than for the third motion information.

6. The system of claim 3, wherein the Large Area Motion Detector (LAMD) comprises:
a horizontal motion detector configured to detect horizontal motion in the group of pixels and to generate a horizontal motion value by comparing motion values of pixels on opposite sides of a pixel along a horizontal axis;
a vertical motion detector configured to detect vertical motion in the group of pixels and to generate a vertical motion value by comparing motion values of pixels on opposite sides of a pixel along a vertical axis; and
a two dimensional motion detector configured to detect motion in horizontal and vertical directions and to generate a two dimensional motion value based on a first sum of motion values of pixels in horizontal direction and a second sum of motion values of pixels in vertical direction,
wherein the Large Area Motion Detector (LAMD) is further configured to generate the first motion information based on one of the horizontal motion value, the vertical motion value, and the two dimensional motion value.

7. The system of claim 3, wherein the Large Area Static Detector (LASD) is further configured to detect a number of static pixels by comparing motion values of pixels in the group of pixels to a first motion value threshold and to generate the second motion information by comparing a total number of pixels static pixels to a second threshold.

8. The system of claim 3, wherein the Static On-screen Display Detector (SOSD) is further configured to detect motion values including absolute value, direction, and sign for horizontal and vertical sets of pixels in the first channel components of each of the plurality of frames and to generate the third motion information based on the motion values.

9. The system of claim 3, wherein:
the Low Contrast/Texture Detector (LCND) is configured to detect texture of a group of pixels in the first channel components and to generate a fourth motion information indicating the texture of the group of pixels; and
a gain controller configured to adjust output of at least one of the Large Area Motion Detector (LAMD), the Large Area Static Detector (LASD), the Static On-screen Display Detector (SOSD) based on the fourth motion information,
wherein the motion detector is further configured to generate the first motion indicator based on an output of the gain controller.

10. The system of claim 9, wherein the Low Contrast/Texture Detector (LCND) is further configured to generate the fourth motion information based on a horizontal gradient value generated by adding pixel delays and a vertical gradient value generated by adding line delays.

11. The system of claim 1, wherein the first and second quantizers are configured to adjust the first and second blended outputs based on a noise level indication received from the image feature analyzer.

12. A system comprising:
a motion adaptive de-interlacer configured to determine a first output by de-interlacing a plurality of interlaced frames based on at least a first motion indicator indicating motion between fields of the plurality of interlaced frames;
a film mode detector configured to determine a second output based on a film mode detected based on at least a second motion indicator indicating motion between fields of the plurality of interlaced frames, the film mode detector further configured to output a control signal based on the second motion indicator and the film mode; and
a combiner configured to combine the first output and the second output based on the control signal,
wherein the motion adaptive de-interlacer comprises:
a motion detector configured to receive the plurality of interlaced frames and to generate the first motion indicator;
a de-interlacer configured to receive the plurality of interlaced frames and to generate the first output by de-interlacing the plurality of frames based on the first motion indicator; and
an image feature analyzer configured to analyze content of each of the plurality of frames and to control the motion detector and the de-interlacer based on the analyzed content;

wherein the de-interlacer comprises:
a first channel de-interlacer configured to de-interlace first channel components of the plurality of interlaced frames based on the first motion indicator; and
a second channel de-interlacer configured to de-interlace second channel components of the plurality of interlaced frames based on the first motion indicator,
wherein the de-interlacer is further configured to generate the first output based on outputs of the first and second channel de-interlacers; and
wherein the first channel de-interlacer comprises:
a temporal de-interlacer configured to temporally de-interlace a pair of interlaced fields of the first channel components using Weave method and to generate a first temporal output;
an average generator configured to generate an average of the first channel components and to generate a second averaged output;
a spatial de-interlacer configured to spatially de-interlace the first temporal output using angle adaptive single field spatial de-interlacing and to generate a third output;
a vertical temporal filter configured to filter high-frequency harmonics from the first temporal output and to generate a fourth output;
a three dimensional median filter configured to filter leakage from the fourth output using temporal and spatial filters and to generate a fifth output;
a blender configured to blend the third and fourth outputs and to generate a sixth output;
a multiplexer configured to select the first temporal output or the second averaged output based on a noise control signal and to generate a seventh output; and
a selector configured to select one of the third, fourth, fifth, sixth, and seventh outputs as an output of the first channel de-interlacer based on the first motion indicator.

13. The system of claim 12, wherein the three dimensional median filter is further configured to remove feathering and flicker due to leakage in the fourth output, the three dimensional median filter comprising:
a temporal median filter configured to filter the first channel components and the fourth output and to generate an eighth output;
an impulse detector configured to detect noise in the eighth output; and
a spatial median filter configured to filter the eighth output and to generate a ninth output based on the noise detected in the eighth output.

14. The system of claim 12, wherein the spatial de-interlacer comprises:
an angle detector configured to detect angles in vertical, rising, and falling angle regions of a field and to generate a raw angle value;
an angle stretch filter configured to smooth the raw angle value and to generate a filtered angle value;
an adaptive vertical interpolator configured to interpolate pixels of the field based on the filtered angle value and to generate a first interpolated output;
a vertical interpolator configured to interpolate the pixels of the field and to generate a second interpolated output;
an interpolation median filter configured to filter interpolation artifacts from the first interpolated output;
an edge detector configured to detect horizontal, vertical, rising, and falling edges by processing the pixels of the field; and a confidence level estimator configured to estimate a confidence level of the raw angle value based on the horizontal, vertical, rising, and falling edges;

wherein the spatial de-interlacer is configured to generate the third output based on the first and second interpolated outputs and based on the confidence level and the first motion indicator.

15. A system comprising:

a motion adaptive de-interlacer configured to determine a first output by de-interlacing a plurality of interlaced frames based on at least a first motion indicator indicating motion between fields of the plurality of interlaced frames;

a film mode detector configured to determine a second output based on a film mode detected based on at least a second motion indicator indicating motion between fields of the plurality of interlaced frames, the film mode detector further configured to output a control signal based on the second motion indicator and the film mode; and a combiner configured to combine the first output and the second output based on the control signal, wherein the film mode detector comprises:

a vertical interpolator configured to interpolate the plurality of interlaced frames and to generate a plurality of interpolated fields;

a static line detector configured to compare motion in the plurality of interpolated fields, determine whether a field is repeated, and generate a plurality of static line indicators;

a low contrast detector configured to detect a low contrast region in the plurality of interpolated fields and to generate a low contrast indicator; and a horizontal motion estimator configured to estimate motion in the plurality of interpolated fields, to determine whether two adjacent ones of the plurality of interpolated fields belong to a single frame based on the plurality of static line indicators and the low contrast indicator, and to generate the second motion indicator including a plurality of motion vectors indicating the estimated motion.

16. The system of claim 15, wherein:

the motion adaptive de-interlacer is further configured to generate the first motion indicator based on a frame-based processing of the plurality of interlaced frames; and the film mode detector is further configured to generate the second motion indicator based on a field-based processing of the plurality of interlaced frames.

17. The system of claim 15, wherein the motion adaptive de-interlacer comprises:

a motion detector configured to receive the plurality of interlaced frames and to generate the first motion indicator;

a de-interlacer configured to receive the plurality of interlaced frames and to generate the first output by de-interlacing the plurality of frames based on the first motion indicator; and an image feature analyzer configured to analyze content of each of the plurality of frames and to control the motion detector and the de-interlacer based on the analyzed content.

18. The system of claim 17, wherein the motion detector comprises a motion detection filter comprising:

a low pass filter configured to filter first channel components of the plurality of interlaced frames and to generate a first filtered output;

a temporal stretch filter configured to separate pixels corresponding to odd and even lines from the first channel components, process motion values of pixels corresponding to the odd and even lines, and generate a second filtered output;

a high pass filter configured to filter the first channel components and to generate a third filtered output;

a motion line detector configured to detect motion in the pixels along a horizontal or vertical line; and a gain controller configured to apply a first gain to the first or second filtered output in response to the motion being along the vertical line, to apply a second gain to the third output in response to the motion being along the horizontal line, and to generate a scaled motion value;

wherein the motion detector is further configured to generate the first motion indicator based on the scaled motion value.

19. The system of claim 18, wherein the motion line detector is further configured to:

generate horizontal and vertical gradient values by processing horizontal and vertical pixels in the first channel components;

scale the horizontal and vertical gradient values by applying different gains to the horizontal and vertical gradient values;

compare the horizontal and vertical gradient values, the scaled horizontal and vertical gradient values, and horizontal and vertical threshold values to each other; and detect the motion along the horizontal or vertical line based on the comparisons.

20. The system of claim 18, wherein the motion detector further comprises:

a detector configured to detect texture of a group of pixels in the first channel components and to generate a motion information indicating the texture of the group of pixels; and a gain adjuster configured to adjust the scaled motion value based on the motion information, wherein the motion detector is further configured to generate the first motion indicator based on an output of the gain adjuster.

21. The system of claim 17, wherein the motion detector further comprises:

a first motion detection filter configured to detect a first motion value associated with a first portion of second channel components of the plurality of interlaced frames;

a second motion detection filter configured to detect a second motion value associated with a second portion of the second channel components;

a detector configured to detect texture of a group of pixels in the second channel components and to generate a motion information indicating the texture of the group of pixels; and a gain adjuster configured to adjust one of the first and second motion values based on the motion information, wherein the motion detector is further configured to generate the first motion indicator based on an output of the gain adjuster.

22. The system of claim 21, wherein each of the first and second motion detection filters comprises:

a low pass filter configured to filter the second channel components and to generate a first filtered output;

a temporal stretch filter configured to separate pixels corresponding to odd and even lines from the second channel components, process motion values of pixels corresponding to the odd and even lines, and generate a second filtered output; and a gain controller configured to apply a gain to the first or second filtered output and to generate a scaled motion value;

wherein the scaled motion values of the first and second motion detection filters respectively correspond to the first and second motion values of the first and second motion detection filters.

23. The system of claim 17, wherein the de-interlacer comprises:

a first channel de-interlacer configured to de-interlace first channel components of the plurality of interlaced frames based on the first motion indicator; and a second channel de-interlacer configured to de-interlace second channel components of the plurality of interlaced frames based on the first motion indicator, wherein the de-interlacer is further configured to generate the first output based on outputs of the first and second channel de-interlacers.

24. The system of claim 17, wherein the image feature analyzer is further configured to:

generate a high frequency indicator used by the motion detector to set one or more thresholds to detect motion and by the de-interlacer to minimize interpolation artifacts;

detect a repeated pattern and generate a repeated pattern indicator used by the de-interlacer in angle detection;

generate an on screen display indicator used by the motion detector to reliably detect motion or static pixels based on whether the on screen display is static or scrolling text as indicated by the on screen display indicator;

generate a noise level indicator used by the motion detector to detect motion; and generate a plurality of frame-based motion indicators used by the motion detector to detect motion.

25. The system of claim 15, wherein the static line detector is further configured to generate each of the plurality of static line indicators based on different pairs of the plurality of interpolated fields.

26. The system of claim 15, wherein the low contrast detector is further configured to generate the low contrast indicator by processing a block of pixels in one of the plurality of interpolated fields where the plurality of motion vectors generated by the horizontal motion estimator is unreliable or nonexistent.

27. The system of claim 15, wherein the horizontal motion estimator is further configured to estimate the motion by processing first and second fields of the plurality of interpolated fields to generate a first motion vector of the plurality of motion vectors and by processing second and third fields of the plurality of interpolated fields to generate a second motion vector of the plurality of motion vectors.

28. The system of claim 15, wherein the horizontal motion estimator comprises:

a first matching module configured to perform block matching for first and second fields of the plurality of interpolated fields and to generate first outputs;

a second matching module configured to perform block matching for second and third fields of the plurality of interpolated fields and to generate second outputs;

first and second minima modules configured to respectively generate first and second minima values based on the first and second outputs;

first and second median filters configured to respectively filter the first and second minima values;

first and second quantizers configured to respectively quantize the filtered first and second minima values; and first and second multiplexers configured to respectively receive the filtered first and second minima values and to generate the plurality of motion vectors based on the filtered first and second minima values, the plurality of static line indicators, and the low contrast indicator.

29. The system of claim 15, further comprising:

a plurality of histogram accumulators configured to accumulate the plurality of motion vectors for a plurality of pixel blocks, to generate static vector histograms for first and second fields and for second and third fields of the plurality of interpolated fields, and to generate motion vector histograms for the first and second fields and for the second and third fields of the plurality of interpolated fields, wherein the film mode detector is further configured to detect the film mode and to generate the control signal based on the static and motion vector histograms.

30. The system of claim 15, further comprising a processor configured to process the plurality of motion vectors and to detect the film mode by determining whether the plurality of interlaced frames is from a source of progressive frames including film and graphics, and by detecting cadence of the plurality of interlaced frames.

31. The system of claim 30, further comprising a de-interlacer configured to generate the second output by de-interlacing the plurality of interlaced frames using Weave method based on the second motion indicator and the film mode.

32. The system of claim 30, further comprising:

a motion detector configured to detect motion between fields of the plurality of interlaced frames based on the film mode;

a classifier configured to classify the plurality of motion vectors generated by the horizontal motion estimator based on the film mode; and a blender configured to blend outputs of the motion detector and the classifier based on the film mode and to generate the control signal.

33. The system of claim 30, wherein the processor comprises:

a mixer configured to mix the plurality of motion vectors;

a still detector configured to generate a plurality of still indicators based on an output of the mixer;

a cadence detector configured to detect the cadence based on the plurality of still indicators; and a mode detector configured to detect the film mode based on the plurality of still indicators and the cadence, and to generate a film mode lock signal and a film mode phase signal.

34. The system of claim 33, further comprising a de-interlacer configured to generate the second output by de-interlacing the plurality of interlaced frames using Weave method based on the plurality of still indicators and the film mode phase signal.

35. The system of claim 33, further comprising:

a motion detector configured to detect motion between fields of the plurality of interlaced frames based on the film mode phase signal;

a classifier configured to classify the plurality of motion vectors generated by the horizontal motion estimator based on the film mode phase signal; and a blender configured to blend outputs of the motion detector and the classifier based on the film mode lock signal and to generate the control signal.

36. The system of claim 35, wherein the motion detector comprises:
a vertical interpolator configured to interpolate the plurality of interlaced frames and to generate a plurality of interpolated fields,
wherein the motion detector is further configured to generate a plurality of motion values by processing different pairs of the plurality of interpolated fields selected based on the film mode phase signal.

37. The system of claim 36, wherein the classifier is further configured to generate a plurality of confidence levels for the plurality of motion vectors generated by the horizontal motion estimator and to combine the plurality of confidence levels based on the film mode phase signal.

38. The system of claim 37, wherein the blender is further configured to blend the plurality of motion values and the combined confidence level based on the film mode phase signal and the plurality of still indicators to generate the control signal.

* * * * *

UNITED STATES PATENT AND TRADEMARK OFFICE
CERTIFICATE OF CORRECTION

| | |
|---|---|
| PATENT NO. | : 9,918,041 B1 |
| APPLICATION NO. | : 15/135931 |
| DATED | : March 13, 2018 |
| INVENTOR(S) | : Chang Q. Zhang and Dam Le Quang |

It is certified that error appears in the above-identified patent and that said Letters Patent is hereby corrected as shown below:

On the Title Page

In Item (71), delete "Marvell International Ltd., Hamilton (BM)" and insert -- SYNAPTICS INCORPORATED, San Jose, CA (US); SYNAPTICS LLC, Zug (CH) --, therefor.

Signed and Sealed this
Seventeenth Day of April, 2018

Andrei Iancu
*Director of the United States Patent and Trademark Office*